United States Patent [19]

Yamanouchi et al.

[11] Patent Number: 6,027,805
[45] Date of Patent: Feb. 22, 2000

[54] FINE POLYMER PARTICLES HAVING HETEROGENEOUS PHASE STRUCTURE

[75] Inventors: Junichi Yamanouchi; Hidetoshi Watanabe; Kunio Ishigaki; Seiichi Yamamoto; Kouta Fukui, all of Minami-Ashigara, Japan

[73] Assignee: Fuji Photo Film Co., Ltd., Kanagawa, Japan

[21] Appl. No.: 09/103,936

[22] Filed: Jun. 25, 1998

Related U.S. Application Data

[62] Division of application No. 08/960,123, Oct. 27, 1997, Pat. No. 5,804,357, which is a continuation of application No. 08/569,500, Dec. 8, 1995, abandoned.

[30] Foreign Application Priority Data

| Dec. 9, 1994 | [JP] | Japan | 6-306389 |
| Jan. 12, 1995 | [JP] | Japan | 7-3296 |
| Feb. 13, 1995 | [JP] | Japan | 7-24320 |

[51] Int. Cl.[7] .............. G03C 1/053; G03C 5/26; G08F 279/00
[52] U.S. Cl. ............... 428/402.2; 428/402.22; 428/402.24; 427/213.31; 427/213.36
[58] Field of Search .......... 428/402.2, 402.22, 428/402.24; 427/213.31, 213.36

[56] References Cited

U.S. PATENT DOCUMENTS

| H1016 | 1/1992 | Hatakeyama et al. | 430/535 |
| 3,615,523 | 10/1971 | Difley et al. | 430/481 |
| 3,865,591 | 2/1975 | Katz | 430/437 |
| 4,011,201 | 3/1977 | Ponticello | 260/65 |
| 4,444,870 | 4/1984 | Hirano et al. | 430/381 |
| 4,759,983 | 7/1988 | Knutson et al. | 428/343 |
| 4,933,267 | 6/1990 | Ishigaki et al. | 430/501 |
| 4,977,071 | 12/1990 | Kanetake et al. | 430/534 |
| 5,116,901 | 5/1992 | Biale | 524/457 |
| 5,194,367 | 3/1993 | Yamada et al. | 430/363 |
| 5,244,773 | 9/1993 | Muramatsu et al. | 430/264 |
| 5,260,178 | 11/1993 | Harada et al. | 430/508 |
| 5,352,563 | 10/1994 | Kawasaki et al. | 430/264 |
| 5,368,984 | 11/1994 | Yoshida | 430/264 |
| 5,374,498 | 12/1994 | Fujita et al. | 430/264 |
| 5,464,730 | 11/1995 | Okutsu et al. | 430/399 |
| 5,474,878 | 12/1995 | Sakuma | 430/401 |
| 5,506,092 | 4/1996 | Ishikawa et al. | 430/399 |
| 5,508,153 | 4/1996 | Ishikawa et al. | 430/445 |
| 5,543,287 | 8/1996 | Arai | . |
| 5,561,034 | 10/1996 | Desie et al. | 430/536 |
| 5,569,575 | 10/1996 | Yamashita | 430/399 |
| 5,587,276 | 12/1996 | Katoh | 430/440 |

FOREIGN PATENT DOCUMENTS

| 0196551 | 10/1986 | European Pat. Off. . |
| 343642 | 11/1989 | European Pat. Off. . |
| 0492847 | 7/1992 | European Pat. Off. . |
| 0501666 | 9/1992 | European Pat. Off. . |
| 0573142 | 12/1993 | European Pat. Off. . |
| 699952A1 | 3/1996 | European Pat. Off. . |
| 3516466 | 11/1986 | Germany . |
| 4-253784 | 9/1992 | Japan . |
| 5-194914 | 8/1993 | Japan . |
| 5-278248 | 11/1993 | Japan . |
| 5-295302 | 11/1993 | Japan . |
| 1185216 | 3/1970 | United Kingdom . |
| WO9316133 | 8/1993 | WIPO . |

*Primary Examiner*—Nathan M. Nutter
*Attorney, Agent, or Firm*—Sughrue, Mion, Zinn, Macpeak & Seas, PLLC

[57] ABSTRACT

Latex polymer of fine particles having a heterogeneous phase structure which comprises a core of a polymer having repeating units derived from a conjugated diene monomer and a shell of a polymer having repeating units derived from at least one ethylenically unsaturated monomer carrying an active methylene group; a silver halide photographic light-sensitive material comprises a core/shell latex polymer whose shell consists of a polymer having repeating units of an ethylenically unsaturated monomer represented by the formula: $CH_2=C(R^1)-L-X$ (wherein $R^1$ represents H, alkyl or halogen, L represents a single bond or a bivalent coupling group, X represents an active methylene group, provided that L is bonded to X in the form of alkylene; and a method for forming images on a silver halide light-sensitive material which comprises exposing the material which comprises at least one light-sensitive silver halide emulsion layer and at least one hydrophilic colloidal layer either of which comprises a latex polymer having active methylene groups and developing the exposed material with a developer which comprises a dihydroxybenzene developing agent and an auxiliary developing agent showing superadditivity, the pH increase observed when adding 0.1 mole/l developer of NaOH to the developer $\leq 0.25$; $9.5 \leq$ initial pH of the developer $\leq 11.0$; the amount of the developer supplemented $\leq 225$ ml/ml².

3 Claims, 2 Drawing Sheets

0.1 μm   (×100.000)

0.1 μm       (×100.000)

FINE POLYMER PARTICLES HAVING HETEROGENEOUS PHASE STRUCTURE

This is a divisional of application Ser. No. 08/960,123 filed Oct. 27, 1997 and now U.S. Pat. No. 5,804,357, which is a continuation of application Ser. No. 08/569,500 filed Dec. 8, 1995, now abandoned, the disclosure of which is incorporated herein by reference.

TITLE OF THE INVENTION

Fine Polymer Particles Having Heterogeneous Phase Structure, Silver Halide Photographic Light-Sensitive Material Containing the Fine Polymer Particles and Image-Forming Method.

BACKGROUND OF THE INVENTION

The present invention relates to a latex polymer of fine particles useful in applications such as silver halide photographic light-sensitive materials, paints and varnishes and adhesives.

The present invention also relates to a silver halide photographic light-sensitive material and more specifically to a silver halide photographic light-sensitive material containing a novel latex polymer. More specifically, the present invention relates to a silver halide photographic light-sensitive material improved in physical properties of films without impairing photographic properties, through the use of the latex polymer.

The present invention further relates to a method for forming images on a silver halide photographic light-sensitive material which permits the formation of high contrast images at a pH of less than 11.0 and more particularly to an image-forming method which requires only a small amount of developer to be supplemented.

As the active methylene group can react with amino groups, isocyanates and melamines to form covalent bonds, there have long been proposed various applications of polymers having reactive groups on the side chains thereof which are formed through homopolymerization of ethylenically unsaturated monomers carrying active methylene groups or copolymerization thereof with various other ethylenically unsaturated monomers.

On the one hand, gelatin is generally and widely used as a binder in the hydrophilic colloidal layer constituting the photographic light-sensitive material. Gelatin is a binder having quite excellent characteristic properties. For instance, it has high swelling and gelling abilities and can easily be crosslinked with a variety of film-hardening agent.

On the other hand, if gelatin is used as an ingredient for forming the hydrophilic colloidal layer, it can not always impart satisfactory physical properties to the resulting film. For instance, it suffers from problems such as deformation due to plastication of the film under high humidity conditions, extension of the film due to absorption of moisture or brittleness of the film under low humidity conditions.

In order to eliminate such drawbacks of the gelatin film, there have been proposed many attempts to improve of, for instance, the dimensional stability against humidity, scratch resistance, brittleness and drying characteristics of hydrophilic colloidal films by incorporating a latex polymer into the hydrophilic colloidal layers such as silver halide emulsion layers, protective layers, backing layers and intermediate layers.

For instance, U.S. Pat. Nos. 2,763,625 and 2,852,382, Japanese Un-Examined Patent Publication (hereinafter referred to as "J.P. KOKAI") Nos. Sho 62-115152, Hei 5-66512 and Hei 5-80449 and Japanese Examined Patent Publication (hereinafter referred to as "J.P. KOKOKU") Nos. Sho 60-15935, Hei 4-64058 and Hei 5-45014 disclose the use of latex polymeres derived from a variety of monomers represented by alkyl acrylates and alkyl methacrylate in gelatin-containing hydrophilic colloidal layers.

The use of the latex of this type is effective in the improvement of some characteristic properties of the gelatin film, but the resulting gelatin film is insufficient in the strength under, in particular, high humidity conditions or water-containing state. Incidentally, it has been known that such problems can be solved by incorporating, into the latex, active methylene groups reactive with gelatin or coexisting film-hardening agents, through copolymerization.

For instance, J.P. KOKOKU Nos. Sho 45-5819 and Sho 46-22507 and J.P. KOKAI No. Sho 50-73625 disclose that, in photographic light-sensitive materials, the wear resistance and hardness of a latex-containing gelatin film (in particular, these properties thereof in wet conditions) are improved by incorporating, into a gelatin film, a latex polymer obtained by copolymerizing a monomer carrying an active methylene group such as 2-acetoacetoxyethyl methacrylate or 2-cyanoacetoxyethyl methacrylate with a monomer such as an alkyl acrylate.

However, more than a certain amount of the active methylene-containing monomer must be copolymerized for preparing the foregoing latex used for improving the wear resistance and hardness of the gelatin film to a desired level.

Moreover, if the ratio of the latex to gelatin increases or the absolute quantity of gelatin is reduced, the strength of the resulting gelatin film in a wet state is considerably reduced. As a result, the amount of the active methylene-containing monomer to be copolymerized must be further increased or any gelatin film having a desired strength cannot be obtained by simply increasing the amount of the active methylene-containing monomer.

The reduction in the coated amount of gelatin has become an important subject in recent photographic light-sensitive materials, from the viewpoint of obtaining high quality images, requirements for highly improved physical properties of films and speeding up of the processing of the materials. In the field of phototype process, for instance, there has intensively been desired for the improvement in the dimensional stability of the photographic light-sensitive material by reducing the amount of gelatin to be used in the material or for the reduction of the amount of processing solutions to be supplemented by reducing the amount of the processing solutions carried over by the material during processing.

Therefore, these films having low gelatin contents and gelatin films comprising a large amount of such a latex suffer from problems such that the film strength is sometimes insufficiently improved through the incorporation of a latex conventionally obtained by simply copolymerizing an active methylene-containing monomer and that the production cost of such a latex polymer increases due to the use of a large amount of an active methylene-containing monomer having a relatively complicated structure. Accordingly, there has been desired for further improvement.

Moreover, J.P. KOKAI No. Hei 5-295302, European Patent Laid-Open (hereinafter referred to as "EPLO") No. 501666, International Un-Examined Patent Publication (hereinafter referred to as "KOHYO") No. 93-16133 disclose that copolymers of active methylene-containing monomers exhibit excellent properties as latexes for use in paints and varnishes such as water resistance, resistance to saline solutions and resistance to alkalis and J.P. KOKAI Nos. Hei 4-253784, Hei 5-194914 and Hei 5-287248, EPLO No. 573142 or the like disclose that latex copolymeres of active methylene-containing monomers exhibit excellent properties as latexes for use in adhesives such as adhesion strength and water resistance.

Toshihiko NAKAMICHI, Coloring Materials, 1992, 65, pp. 511–525 discloses that the copolymers of active methylene-containing monomers form three-dimensionally crosslinked films if they are used in combination with various additives and it can be appreciated that the effects of the copolymers of active methylene-containing monomers on the foregoing fields of paints and varnishes and adhesives are accomplished by the crosslinking reaction.

In these fields, however, there has also been desired for the development of materials which can impart more excellent properties to the resulting product while using the same amount of an active methylene-containing monomer, from both quality and economical standpoints.

On the other hand, as examples of latex polymeres having core/shell dual structures, J.P. KOKAI No. Sho 58-42044 discloses silver halide color photographic light-sensitive materials comprising core/shell latexes whose shell portion consists of a polymer containing coupler units capable of forming a dye through coupling with an oxidized developing agent and also discloses pivaloylacetanilide type or benzoylacetanilide type couplers as specific examples of yellow couplers.

However, the core/shell latex polymeres disclosed in this patent suffer from the following problems:

(i) The rate of the core comprising a non-dye-forming monomer is very low (at most 10%, among the compounds listed). Therefore, the concentration of the active methylene moieties on the shell side through the formation of a core/shell structure does not ensure the foregoing various merits so much. The foregoing rate of the core portion is quite insufficient while taking into consideration the fact that it is effective for, for instance, reducing the thickness of light-sensitive materials to increase the content of coupler monomer units as high as possible, in the field of polymer couplers.

(ii) The reactivity of a compound having an active methylene structure which is sterically complicated beyond a certain level such as pivaloylacetoanilide or benzoylacetoanilide is not necessarily sufficient and must be further improved from the viewpoint of, for instance, the effect of improving the strength of gelatin films.

In addition, this patent does not disclose the use of a conjugated diene monomer as a material for the core particles and the usefulness thereof.

On the other hand, in the field of recent graphic arts, the printing process is apt to be complicated as the color printing has widely been employed. There has been increased a demand for reducing the appointed date of delivery since much importance has been attracted to the immediate availability of information.

In compliance with such a demand, there has been proposed a method in which a film for plate-making by printing is processed with a developer undergoing only a small variation in pH to stabilize the developing process and to thus stabilize the precision of the overall plate-making process. It has been known that any change in the quality of photographs can be reduced by minimizing the variation in pH of the developer. For instance, J.P. KOKOKU No. Hei 3-5730 discloses a method for stabilizing the quality of photographs by improving the buffering ability of the developer.

However, if the buffering ability of the developer is improved by increasing a salt concentration, the hydrophilic colloidal layer is not sufficiently swollen and accordingly, this process does not provide photographs showing high contrast. Moreover, in the light-sensitive material whose hydrophilic colloidal layer comprises a dye or a pigment, a problem arises, such as severe remaining color stain.

It has been known that the developer is supplied in the form of a solid processing agent. For instance, J.P. KOKAI No. Sho 61-259921 discloses a method for improving the stability of a solid processing agent as a developer.

SUMMARY OF THE INVENTION

An object of the present invention is to provide a latex polymer comprising an active methylene monomer having a novel structure.

Another object of the present invention is to provide a latex polymer effectively used in gelatin/latex composite films excellent in the film strength, paints and varnishes excellent in water resistance and adhesion strength and adhesive compositions.

A still another object of the present invention is to provide a silver halide photographic light-sensitive material comprising a novel latex polymer.

A further object of the present invention is to provide a silver halide photographic light-sensitive material which permits the solution of the problems concerning strength and brittleness of the gelatin film through the use of the foregoing latex without impairing the photographic properties of the material.

A still further object of the present invention is to provide a silver halide photographic light-sensitive material which permits the formation of a film having sufficient strength even if the amount of gelatin used is low, which is excellent in the dimensional stability and which also permits the reduction of the amounts of processing solutions to be supplemented during processing the materials.

It is also an object of the present invention to provide a method for forming images on a silver halide monochromatic photographic light-sensitive material, which permits the formation of a negative image having sufficiently high contrast even by a stable developer having a pH of less than 11.0, which can provide photographs showing only a small quality change although the amount of the developer supplemented is small and which can always provide photographs showing stable quality.

According to a first aspect of the present invention, there is provided a latex polymer of fine particles having a heterogeneous phase structure which comprises a core consisting of a polymer having repeating units derived from a conjugated diene monomer and a shell consisting of a polymer having repeating units derived from at least one ethylenically unsaturated monomer carrying an active methylene group.

In a preferred embodiment of the latex polymer of fine particles having a heterogeneous phase structure according to the first aspect of the present invention, the weight ratio of the core polymer to the shell polymer ranges from 20/80 to 95/5. In another preferred embodiment of the latex polymer of fine particles having a heterogeneous phase structure of the present invention, the ethylenically unsaturated monomer carrying an active methylene group is a monomer represented by the following general formula (I):

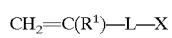

wherein $R^1$ represents a hydrogen atom, an alkyl group having 1 to 4 carbon atoms or a halogen atom; L represents a single bond or a bivalent coupling group; X represents an active methylene group selected from the group consisting of $R^2COCH_2COO-$, $NC-CH_2COO-$, $R^2COCH_2CO-$, $NC-CH_2CO-$ (wherein $R^2$ represents a substituted or unsubstituted alkyl group having 1 to 12 carbon atoms, a substituted or unsubstituted aryl or aryloxy group having 6 to 20 carbon atoms, an alkoxy group having 1 to 12 carbon atoms, an amino group or a substituted amino group having 1 to 12 carbon atoms) and $R^9-CO-CH_2CON(R^6)-$ (wherein $R^6$ represents a hydrogen atom or a substituted or unsubstituted alkyl group having 1 to 6 carbon atoms and $R^9$ represents a substituted or unsubstituted, primary or secondary alkyl group having 1 to 12 carbon atoms, an alkoxy group having 1 to 12 carbon atoms, an amino group or a substituted amino group having 1 to 12 carbon atoms), provided that if L is not a single bond, L is bonded to X in the form of an alkylene, aralkylene or arylene.

According to a second aspect of the present invention, there is also provided a silver halide photographic light-sensitive material comprising a core/shell latex polymer whose shell consists of a polymer having repeating units derived from an ethylenically unsaturated monomer represented by the foregoing general formula (I).

According to a third aspect of the present invention, there is also provided a method for forming images on a silver halide monochromatic photographic light-sensitive material which comprises exposing, to light, a silver halide photographic light-sensitive material comprising, on the same surface of a substrate, at least one light-sensitive silver halide emulsion layer and at least one protective layer, and then developing the exposed light-sensitive material with a developer, wherein the silver halide emulsion layer and/or at least one of other hydrophilic colloidal layers comprise a latex polymer having active methylene groups; the developer comprises a dihydroxybenzene type developing agent and an auxiliary developing agent showing superadditivity; the pH increase observed when sodium hydroxide is added to the developer in an amount of 0.1 mole per liter of the developer is not more than 0.25; the initial pH value of the developer ranges from 9.5 to 11.0; and the amount of the developer supplemented is not more than 225 ml/m².

In the specification and the claims of the present application, the words "latex polymer" have the same meaning as "polymer latex".

DESCRIPTION OF PREFERRED EMBODIMENTS

Figure 1:
FIG. 1 is an electron micrograph of the polymer P-17 of the present invention.

The present invention will hereinafter be described in more detail.

First of all, the polymer latex of fine particles of the present invention will hereinafter be described in more detail.

The latex polymer of the present invention is one having a core/shell heterogeneous phase structure and the core consists of a polymer having repeating units derived from a conjugated diene monomer.

Examples of preferred monomers having conjugated diene structures include 1,3-butadiene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene and 2-cyano-1,3-butadiene. Among these, particularly preferred are 1,3-butadiene, isoprene and 2-chloro-1,3-butadiene.

Moreover, the polymer constituting the core of the latex of the present invention may be a copolymer of the foregoing conjugated diene monomer with other monomers. Examples of such other monomers include ethylene, propylene, 1-butene, isobutene, styrene, α-methylstyrene, divinylbenzene, vinyl ketone, monoethylenically unsaturated hydrocarbon (alkene) esters of aliphatic acids (such as vinyl acetate and allyl acetate), esters of ethylenically unsaturated mono- or dicarboxylic acids (such as methyl methacrylate, ethyl methacrylate, n-butyl methacrylate, n-hexyl methacrylate, cyclohexyl methacrylate, benzyl methacrylate, n-butyl acrylate, n-hexyl acrylate, 2-ethylhexyl acrylate, t-butyl methacrylate, dodecyl methacrylate, 2-hydroxyethyl acrylate, 2-hydroxyethyl methacrylate, 2-hydroxypropyl methacrylate and ethylene glycol dimethacrylate), amides of ethylenically unsaturated mono- or dicarboxylic acids (such as t-butyl acrylamide and t-butyl methacrylamide) and monoethylenically unsaturated compounds (such as acrylonitrile and methacrylonitrile).

Among these, particularly preferred are ethylene, propylene, styrene, α-methylstyrene, esters of (meth)acrylic acids and (meth)acrylonitriles.

The foregoing monomers having conjugated diene structures and other copolymerizable monomers may, respectively, be used alone or in combination.

The unsaturated structures introduced into the core polymer through the polymerization of the monomer having a conjugated diene structure may comprise, as has been well known in this art, cis-1,4-bonds, trans-1,4-bonds or trans-1,2-bonds.

As has been described above, the core polymer may be a homopolymer derived from a monomer having a diene structure or a copolymer thereof with other hydrophobic monomer. In case of copolymers, they may be so-called random copolymers obtained by copolymerizing these monomers in any ratio or block copolymers.

Polymers of such conjugated diene monomers and methods for synthesizing the same are detailed in, for instance, "Gosei Kobunshi (Synthetic Polymers) II", 1975, pp. 171–308, edited by Shunsuke MURAHASHI et al., Published by Asakura Shoten.

Preferred specific examples of the foregoing core polymers are styrene-butadiene copolymers (in general referred to as "SBR" and divided into solution polymerized SBR's and emulsion polymerized SBR's; examples of solution polymerized SBR's include random polymers as well as the foregoing block copolymer such as butadiene-styrene block copolymers and styrene-butadiene-styrene block copolymers), butadiene homopolymers (such as rubbers of cis-1,4-butadiene, trans-1,2-butadiene or those comprising these monomers and/or trans-1,4-butadiene structures), isoprene homopolymers (which may have the same steric structures as described above in connection with the butadiene polymers), styrene-isoprene copolymers (random and block copolymers), ethylene-propylene-diene copolymers (examples of diene monomers may be 1,4-hexadiene, dicyclopentadiene and ethylidene norbornene), acrylonitrile-butadiene copolymers, chloroprene copolymers, isobutylene-isoprene copolymers, butadiene-acrylic acid ester copolymers (examples of acrylates are ethyl acrylate and butyl acrylate) and butadiene-acrylic acid ester-acrylonitrile copolymers (the same acrylates listed above may be used as the acrylate components).

The glass transition temperature (Tg) of these core polymers is in general not more than 50° C., in particular, not more than 20° C.

The content of the conjugated diene monomer component present in the core polymer is not limited to a specific range, but preferably ranges from 10 to 100% by weight.

In particularly preferred embodiment, the core polymer is in the form of a dispersion (latex) of a homopolymer (such as those of butadiene and isoprene) derived from a monomer having a diene structure or a copolymer thereof (such as the SBR's listed above), which is prepared by the emulsion polymerization.

In such a dispersion, the core polymer is dispersed therein in the form of fine particles. It is not preferred to use such a dispersion of particles having an extremely large particle size since the particle size of the polymer greatly affects physical properties of the film prepared after mixing with gelatin, the dispersion stability of the particles per se and the film-forming properties thereof.

Furthermore, the core constituting the latex of the present invention is specifically a polymer consisting of repeating units derived from one or at least two polymerizable monomers selected from various kinds of ethylenically unsaturated monomers, in addition to the foregoing conjugated diene monomers.

Such monomers usable herein may be acrylic acid esters, methacrylic acid esters, vinyl esters, olefins, dienes, acrylamides, methacrylamides, vinyl ethers, dienes and other various ethylenically unsaturated monomers and it is also preferred to use monomers having at least two ethylenically unsaturated groups.

More specifically, examples of acrylic acid esters are methyl acrylate, ethyl acrylate, n-propyl acrylate, isopropyl acrylate, n-butyl acrylate, isobutyl acrylate, sec-butyl acrylate, tert-butyl acrylate, amyl acrylate, hexyl acrylate, 2-ethylhexyl acrylate, octyl acrylate, tert-octyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-isopropoxy acrylate, 2-butoxyethyl acrylate, 2-(2-methoxyethoxy)ethyl acrylate, 2-(2-butoxyethoxy) ethyl acrylate, ω-methoxypolyethylene glycol acrylate (added molar amount n=9), 1-bromo-2-methoxyethyl acrylate and 1,1-dichloro-2-ethoxyethyl acrylate.

Specific examples of methacrylic acid esters are methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, hexyl methacrylate, cyclohexyl methacrylate, benzyl methacrylate, chlorobenzyl methacrylate, octyl methacrylate, stearyl methacrylate, N-ethyl-N-phenylaminoethyl methacrylate, 2-(3-phenylpropyloxy)ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 3-methoxybutyl methacrylate, 2-acetoxyethyl methacrylate, 2-ethoxyethyl methacrylate, 2-isopropoxyethyl methacrylate, 2-butoxyethyl methacrylate, 2-(2-methoxyethoxy)ethyl methacrylate, 2-(2-butoxyethoxy) ethyl methacrylate and allyl methacrylate.

Examples of vinyl esters are vinyl acetate, vinyl propionate, vinyl butyrate, vinyl isobutyrate, vinyl caproate, vinyl chloroacetate, vinyl methoxyacetate, vinyl phenylacetate, vinyl benzoate and vinyl salicylate.

In addition to the foregoing monomers, examples of monomers usable for preparing the core polymers further include acrylamides such as acrylamide, ethyl acrylamide, t-butyl acrylamide, cyclohexyl acrylamide, benzyl acrylamide, hydroxymethyl acrylamide, phenyl acrylamide, dimethyl acrylamide, diethyl acrylamide and diacetone acrylamide; methacrylamides such as methacrylamide, ethyl mathacrylamide, t-butyl methacrylamide, benzyl methacrylamide, hydroxymethyl methacrylamide, phenyl methacrylamide and dimethyl methacrylamide; olefins such as ethylene, propylene, 1-butene, 1-pentene, vinyl chloride and vinylidene chloride; styrenes such as styrene, methylstyrene, ethylstyrene, chloromethylstyrene, methoxystyrene, acetoxystyrene, chlorostyrene, dichlorostyrene, bromostyrene and methyl vinylbenzoate; vinyl ethers such as methyl vinyl ether, butyl vinyl ether, hexyl vinyl ether and methoxyethyl vinyl ether; and other monomers such as butyl crotonate, hexyl crotonate, dimethyl itaconate, dimethyl maleate, dibutyl maleate, diethyl fumarate, dimethyl fumarate, methyl vinyl ketone, phenyl vinyl ketone, methoxyethyl vinyl ketone, N-vinyl pyrrolidone, acrylonitrile, methacrylonitrile, methylene malonitrile, vinylidene chloride, acrylic acid, methacrylic acid, itaconic acid, maleic acid, maleic anhydride, vinylsulfonic acid, 2-acrylamido-2-methylpropanesulfonic acid and styrenesulfonic acid.

Moreover, monomers each carrying at least two copolymerizable ethylenically unsaturated groups may likewise be used to prepare the core of the latex of the present invention.

Examples of such monomers are divinylbenzene, ethylene glycol diacrylate, ethylene glycol dimethacrylate, diethylene glycol diacrylate, diethylene glycol dimethacrylate, triethylene glycol diacrylate, triethylene glycol dimethacrylate, trivinylcyclohexane, trimethylolpropane triacrylate, trimethylolpropane trimethacrylate, pentaerythritol triacrylate, pentaerythritol trimethacrylate, pentaerythritol tetraacrylate and pentaerythritol tetramethacrylate.

The foregoing monomers may be used alone or at least two of them may be copolymerized. Among the monomers listed above, preferably used are acrylic acid esters, methacrylic acid esters, vinyl esters, conjugated dienes, styrenes and monomers carrying at least two ethylenically unsaturated groups, from the viewpoint of easiness of polymerization and easy formation of the core/shell structure.

In a particularly preferred embodiment, the core polymer is prepared by the emulsion polymerization and is present in an aqueous medium in the form of a dispersion (latex) of fine particles.

In such a dispersion, the core polymer is dispersed therein in the form of fine particles.

It is not preferred to use such a dispersion having an extremely large particle size since the particle size of the polymer greatly affects physical properties of the film prepared after mixing with gelatin, the dispersion stability of the particles per se and the film-forming properties thereof.

As has been discussed above, the number-average particle size of the core polymer is not more than 1.0 µm, preferably not more than 0.7 µm and particularly preferably not more than 0.5 µm. Moreover, it is preferably not less than 0.00001 µm.

The shell portion of the core/shell latex of the present invention will hereinafter be described in detail.

The shell portion consists of a polymer having repeating units derived from an ethylenically unsaturated monomer (active ethylene monomer) carrying at least one kind of active methylene group.

In the present invention, the active methylene monomer is a monomer represented by the following general formula (I):

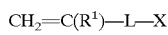
$CH_2=C(R^1)—L—X$ wherein $R^1$ represents a hydrogen atom, an alkyl group having 1 to 4 carbon atoms or a halogen atom; L represents a single bond or a bivalent coupling group; X represents an active methylene group selected from the group consisting of $R^2COCH_2COO—$, $NC—CH_2COO—$, $R^2COCH_2CO—$, $NC—CH_2CO—$ (wherein $R^2$ represents a substituted or unsubstituted alkyl group having 1 to 12 carbon atoms, a substituted or unsubstituted aryl or aryloxy group having 6 to 20 carbon atoms, an alkoxy group having 1 to 12 carbon atoms, an amino group or a substituted amino group having 1 to 12 carbon atoms) and $R^9—CO—CH_2CON(R^6)—$ (wherein $R^6$ represents a hydrogen atom or a substituted or unsubstituted alkyl group having 1 to 6 carbon atoms and $R^9$ represents a substituted or unsubstituted, primary or secondary alkyl group having 1 to 12 carbon atoms, an alkoxy group having 1 to 12 carbon atoms, an amino group or a substituted amino group having 1 to 12 carbon atoms), provided that if L is not a single bond, L is bonded to X in the form of an alkylene, aralkylene or arylene.

The substituent $R^1$ preferably represents a hydrogen atom, a methyl, ethyl, n-propyl or n-butyl group or a chlorine or bromine atom, in particular, a hydrogen atom, a methyl group or a chlorine atom.

L represents a single bond or a bivalent coupling group such as a coupling group represented by the following formula:

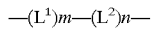
$—(L^1)m—(L^2)n—$ wherein $L^1$ represents $—CON(R^3)—$ ($R^3$ represents a hydrogen atom, an alkyl group having 1 to 4 carbon atoms or a substituted alkyl group having 1 to 6 carbon atoms), $—COO—$, $—NHCO—$, $—OCO—$, or a group represented by the following formula:

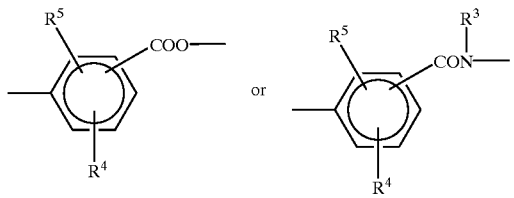

($R^4$ and $R^5$ each independently represents a hydrogen atom, a hydroxyl group, a halogen atom or a substituted or unsubstituted alkyl, alkoxy, acyloxy or aryloxy group and $R^3$ is identical to that defined above); $L^2$ represents a coupling group connecting the group $L^1$ to X; m is 0 or 1 and n is 0 or 1. The coupling groups represented by $L^2$ are, for instance, those represented by the following general formula:

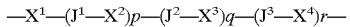
$—X^1—(J^1—X^2)p—(J^2—X^3)q—(J^3—X^4)r—$

Wherein $J^1$, $J^2$ and $J^3$ may be the same or different and each represents $—CO—$, $—SO_2—$, $—CON(R^6)—$ ($R^6$ represents a hydrogen atom, an alkyl group (having 1 to 6 carbon atoms), a substituted alkyl group (having 1 to 6 carbon atoms)), $—SO_2N(R^6)—$ ($R^6$ is identical to that defined above), $—N(R^6)—R^7—$ ($R^6$ is identical to that defined above and $R^7$ is an alkylene group having 1 to about 4 carbon atoms), $—N(R^6)—R^7—N(R^8)—$ ($R^6$ and $R^7$ are identical to those defined above and $R^8$ represents a hydrogen atom, an alkyl group (having 1 to 6 carbon atoms) or a substituted alkyl group (having 1 to 6 carbon atoms)), $—O—$, $—S—$, $—N(R^6)—CO—N(R^8)—$ ($R^6$ and $R^8$ are identical to those defined above respectively), $—N(R^6)—SO_2—N(R^8)—$ ($R^6$ and $R^8$ are identical to those defined above respectively), $—COO—$, $—OCO—$, $—N(R^6)CO_2—$ ($R^6$ is identical to that defined above) or $—N(R^6)CO—$ ($R^6$ is identical to that defined above); p, q and r each represents 0 or 1; $X^1$, $X^2$, $X^3$ and $X^4$ may be the same or different and each represents a substituted or unsubstituted alkylene group having 1 to 10 carbon atoms, an aralkylene group having 7 to 20 carbon atoms or a phenylene group having 6 to 20 carbon atoms and the alkylene group may be linear or branched ones. Specific examples of the alkylene groups include methylene, methylmethylene, dimethylmethylene, methoxymethylene, dimethylene, trimethylene, tetramethylene, pentamethylene, hexamethylene and decylmethylene; the aralkylene group includes, for instance, benzylidene; and the phenylene group includes, for instance, p-phenylene, m-phenylene, methylphenylene and chlorophenylene groups.

X represents a monovalent group carrying an active methylene group such as $R^2COCH_2COO—$, $NCCH_2COO—$, $R^2COCH_2CO—$, $NCCH_2CO—$, $R^9—CO—CH_2CON(R^6)—$.

In this respect, $R^6$ is identical to that defined above; $R^2$ is a substituted or unsubstituted alkyl group having 1 to 12 carbon atoms (such as methyl, ethyl, n-propyl, n-butyl, t-butyl, n-nonyl, 2-methoxyethyl, 4-phenoxybutyl, benzyl and 2-methanesulfonamidoethyl groups), a substituted or unsubstituted aryl group having 6 to 20 carbon atoms (such as phenyl, p-methylphenyl, p-methoxyphenyl and o-chlorophenyl groups), an alkoxy group having 1 to 12 carbon atoms (such as methoxy, ethoxy, methoxyethoxy and n-butoxy groups), a cycloalkyloxy group (such as cyclohexyloxy group), a substituted or unsubstituted aryloxy group having 6 to 20 carbon atoms (such as phenoxy, p-methylphenoxy, o-chlorophenoxy and p-cyanophenoxyl groups), an amino group or a substituted amino group hating 1 to 12 carbon atoms (such as methylamino, ethylamino, dimethylamino, butylamino and dichlorophenylamino groups).

Among the foregoing substituents, particularly preferred $R^2$ groups are substituted or unsubstituted, primary or secondary alkyl groups having 1 to 12 carbon atoms.

$R^9$ represents a substituted or unsubstituted, primary or secondary alkyl group having 1 to 12 carbon atoms, an alkoxy group having 1 to 12 carbon atoms, an amino group or a substituted amino group having 1 to 12 carbon atoms. Specific examples thereof are those listed above in connection with the substituent $R^2$. Particularly preferred $R^9$ groups are substituted or unsubstituted, primary or secondary alkyl groups having 1 to 12 carbon atoms.

Among these active methylene groups represented by X and listed above, those showing particularly preferred effects in the present invention are $R^2COCH_2COO$—, $NCCH_2COO$—, $R^2COCH_2CO$— and $NCCH_2CO$—.

Specific examples of the monomers carrying active methylene groups from which the repeating units constituting the shell of the latex of the present invention will be listed below, but the present invention is not restricted to these specific examples.

M-1 2-acetoacetoxyethyl methacrylate;
M-2 2-acetoacetoxyethyl acrylate;
M-3 2-acetoacetoxypropyl methacrylate;
M-4 2-acetoacetoxypropyl acrylate;
M-5 2-acetoacetamidoethyl methacrylate;
M-6 2-acetoacetamidoethyl acrylate;
M-7 2-cyanoacetoxyethyl methacrylate;
M-8 2-cyanoacetoxyethyl acrylate;
M-9 N-(2-cyanoacetoxyethyl)acrylamide
M-10 2-propionylacetoxyethyl acrylate
M-11 N-(2-propionylacetoxyethyl)methacrylamide
M-12 N-4-(acetoacetoxybenzyl)phenyl acrylamide
M-13 ethylacryloyl acetate
M-14 acryloylmethyl acetate
M-15 N-methacryloyloxymethyl acetoacetamide
M-16 ethylmethacryloyl acetoacetate
M-17 N-allylcyanoacetamide
M-18 2-cyanoacetylethyl acrylate
M-19 N-(2-methacryloyloxymethyl)cyanoacetamide
M-20 p-(2-acetoacetyl)ethylstyrene
M-21 4-acetoacetyl-1-methacryloyl piperazine
M-22 ethyl-α-acetoacetoxy methacrylate
M-23 N-butyl-N-acryloyloxyethyl acetoacetamide
M-24 p-(2-acetoacetoxy)ethylstyrene The polymer constituting the shell of the present invention may be a copolymer of the foregoing ethylenically unsaturated monomer carrying an active methylene group with other ethylenically unsaturated monomers.

Specific examples of such other monomers are acrylic acid or salts thereof, alkyl acrylates (such as methyl acrylate, ethyl acrylate, n-butyl acrylate, n-hexyl acrylate, benzyl acrylate, 2-ethylhexyl acrylate, n-dodecyl acrylate, t-butyl acrylate, phenyl acrylate and 2-naphthyl acrylate), methacrylic acid or salts thereof, alkyl methacrylates (such as methyl methacrylate, ethyl methacrylate, 2-hydroxyethyl methacrylate, benzyl methacrylate, 2-hydroxypropyl methacrylate, phenyl methacrylate, cresyl methacrylate, 4-chlorobenzyl methacrylate, ethylene glycol dimethacrylate, n-butyl methacrylate, n-hexyl methacrylate, 2-ethylhexyl methacrylate and n-dodecyl methacrylate), vinyl esters (such as vinyl acetate, vinyl benzoate and pivaloyloxy ethylene), acrylamides (such as acrylamide, methyl acrylamide, ethyl acrylamide, propyl acrylamide, butyl acrylamide, t-butyl acrylamide, cyclohexyl acrylamide, benzyl acrylamide, hydroxymethyl acrylamide, methoxyethyl acrylamide, dimethylaminoethyl acrylamide, phenyl acrylamide, dimethyl acrylamide, diethyl acrylamide, β-cyanoethyl acrylamide, diacetone acrylamide and 2-acrylamido-2-methylpropanesulfonic acid), methacrylamides (such as methacrylamide, methyl methacrylamide, ethyl methacrylamide, propyl methacrylamide, butyl methacrylamide, t-butyl methacrylamide, cyclohexyl methacrylamide, benzyl methacrylamide, hydroxymethyl methacrylamide, methoxyethyl methacrylamide, dimethylaminoethyl methacrylamide, phenyl methacrylamide, dimethyl methacrylamide, diethyl methacrylamide and β-cyanoethyl methacrylamide), styrenes (such as styrene, methyl styrene, dimethylstyrene, trimethylstyrene, ethylstyrene, isopropylstyrene, chlorostyrene, methoxystyrene, acetoxystyrene, chlorostyrene, dichlorostyrene, bromostyrene and methyl vinylbenzoate), divinylbenzene, acrylonitrile, methacrylonitrile, N-vinylpyrrolidone, N-vinyloxazolidone, vinylidene chloride, phenyl vinyl ketone, itaconic acid, maleic acid, monoalkyl itaconates (such as monomethyl itaconate and monoethyl itaconate), monoalkyl maleates (such as monomethyl maleate and monoethyl maleate) and citraconic acid.

In the core/shell latex polymer of the present invention, the content of the monomer units carrying active methylene groups in the shell polymer may arbitrarily be changed depending on the desired characteristic properties of the shell polymer and may be in the range of from 0.1 to 100% by weight. In this respect, if the content thereof in the resulting copolymer increases, the foregoing various effects are improved, but these effects are sometimes saturated at a content of more than a certain level and preferably 0.1 to 60% by weight, in particular, 1 to 40% by weight.

In the core/shell latex polymer of the present invention, the ratio of the amount of the core polymer to that of the shell polymer may arbitrarily be changed, but the weight ratio: core/shell ranges from 10/90 to 95/5, preferably 20/80 to 95/5 and particularly preferably 30/70 to 90/10. If the rate of the core polymer is too low, the effect due to the concentration of the active methylene monomer on the shell portion is reduced, while if the rate of the shell polymer is too low, it is difficult to form a distinct core/shell structure.

The particle size of the core/shell latex polymer is not more than 1.0 μm, preferably not more than 0.7 μm, particularly preferably not more than 0.5 μm and preferably not less than 0.00001 μm, like the particle size of the core polymer particles defined above.

As has been well-known in the field of the core/shell latex-forming technique in the emulsion polymerization, the combination of a core polymer and a shell polymer whose polarity is very close to one another and which are accordingly compatible with one another does not sometimes form a desired core/shell structure. However, the conjugated diene monomer used in the core portion in the present invention has very low polarity and therefore, may form effective core/shell structures together with all of the foregoing monomers used in the shell portion. Morever, even if a monomer having polarity close to that of the core polymer is used in the shell, a desired core/shell particles can be obtained by three-dimensionally crosslinking the core polymer using a crosslinking monomer.

In the core/shell latex polymer of the present invention, either or both of the core and shell polymers may be crosslinked. The molecular weight of the polymer thus obtained is infinite. The molecular weight of the un-crosslinked polymer of the present invention varies depending on the kinds of monomers used and conditions for synthesizing the same, but ranges from 5000 to 2,000,000. The molecular weight thereof can be adjusted through the use of a chain transfer agent depending on purposes.

In addition, as has been known in the field of the radical polymerization technique, the shell polymer in the core/shell latex polymer of the invention may form a graft polymer through partial graft polymerization during the copolymerization of the conjugated diene monomer. In this case, the resulting latex polymer comprises, as a whole, a mixture of three kinds of polymers, i.e., the core polymer, the foregoing graft polymer and un-grafted shell polymer.

Examples of preferred compounds used in the core/shell latex of the present invention will be listed below, but the present invention is not restricted to these specific examples. The structures of each latex compound given below are described in the order of the core polymer structure (copolymerizable monomer and composition), the shell polymer structure (copolymerizable monomer and composition) and the ratio: core/shell. The compositional ratio for copolymerization and the core/shell ratio are expressed in terms of the ratio of weight percentages.

P-1 to 12: core=styrene/butadiene (37/63)
- P-1: shell=styrene/M-1 (98/2); core/shell=50/50
- P-2: shell=styrene/M-1 (96/4); core/shell=50/50
- P-3: shell=styrene/M-1 (92/8); core/shell=50/50
- P-4: shell=styrene/M-1 (84/16); core/shell=50/50
- P-5: shell=styrene/M-1 (68/32); core/shell=50/50
- P-6: shell=styrene/M-1 (84/16); core/shell=67/33
- P-7: shell=styrene/M-2 (84/16); core/shell=75/25
- P-8: shell=n-butyl acrylate/M-1 (96/4); core/shell=50/50
- P-9: shell=n-butyl acrylate/M-2 (92/8); core/shell=50/50
- P-10: shell=n-butyl acrylate/M-1 (84/16); core/shell=50/50
- P-11: shell=methyl acrylate/M-7 (84/16); core/shell=50/50
- P-12: shell=styrene/methyl acrylate/M-3 (21/63/16); core/shell=50/50

P-13 to 16: core=styrene/butadiene (23/77)
- P-13: shell=styrene/M-1 (92/8); core/shell=50/50
- P-14: shell=styrene/M-2 (84/16); core/shell=50/50
- P-15: shell=n-butyl acrylate/M-1 (84/16); core/shell=50/50
- P-16: shell=n-butyl acrylate/M-8/acrylic acid (80/16/4); core/shell=50/50

P-17 to 22: core=polybutadiene (100)
- P-17: shell=styrene/M-1 (84/16); core/shell=50/50
- P-18: shell=ethyl acrylate/M-7/methacrylic acid (65/15/20) core/shell=85/15
- P-19: shell=n-butyl acrylate/M-7 (84/16); core/shell=50/50
- P-20: shell=n-butyl acrylate/M-2 (84/16); core/shell=50/50
- P-21: shell=2-ethylhexyl acrylate/M-24 (84/16); core/shell=50/50
- P-22: shell=n-butyl acrylate/M-18(84/16); core/shell=50/50

P-23 to 25: core=polyisoprene (100)
- P-23: shell=styrene/acrylonitrile/M-1 (63/21/16); core/shell=90/10
- P-24: shell=methyl methacrylate/ethyl acrylate/M-2/Na 2-acrylamido-2-methylpropanesulfonate (15/65/15/5); core/shell=75/25
- P-25: shell=styrene/M-1 (84/16); core/shell=20/80

P-26 to 28: core=styrene/butadiene (49/51)
- P-26: shell=styrene/butyl acrylate/M-1 (25/60/15); core/shell=50/50
- P-27: shell=M-1 (100); core/shell=90/10
- P-28: shell=lauryl methacrylate/butyl acrylate/M-7 (30/55/15); core/shell=40/60

P-29: core=styrene/butadiene (63/37); shell=butyl acrylate/2-hydroxyethyl methacrylate/M-2 (65/15/20); core/shell=50/50

P-30: core=acrylonitrile/butadiene (50/50); shell=butyl acrylate/2-butyl methacrylate/M-1 (40/40/20); core/shell=50/50

P-31: core=acrylonitrile/styrene/butadiene (25/25/50); shell=butyl acrylate/M-1 (92/8); core/shell=50/50

P-32: core=ethyl acrylate/butadiene(40/60); shell=styrene/divinylbenzene/M-1 (79/5/16); core/shell=50/50

P-33: core=ethyl acrylate/styrene/butadiene(40/30/30); shell=ethylhexyl acrylate/M-7 (84/16); core/shell=50/50

P-35: core=styrene/butadiene (37/63); shell=styrene/M-1 (84/16); core/shell=85/15

P-36, 37: core=styrene/butadiene (22/78)
- P-36: shell=styrene/M-2 (84/16); core/shell=50/50
- P-37: shell=n-butyl acrylate/M-8 (84/16); core/shell=50/50

P-38: core=polybutadiene (100); shell=ethyl acrylate/M-7/methacrylic acid (65/15/20); core/shell=75/25

P-39: core=ethyl acrylate/butadiene(50/50); shell=styrene/divinylbenzene/M-1 (79/5/16); core/shell=50/50

P-40 to 44: core=poly(n-dodecyl methacrylate) (100)
- P-40: shell styrene/M-1 (92/8); core/shell 50/50
- P-41: shell=styrene/M-1 (84/16); core/shell=50/50
- P-42: shell=ethyl acrylate/M-1 (96/4); core/shell=50/50
- P-43: shell=ethyl acrylate/M-1 (92/8); core/shell=50/50
- P-44: shell=styrene/methyl acrylate/M-3 (21/63/16); core/shell=50/50

P-45: core=poly(n-butyl acrylate) (100); shell=styrene/M-2 (84/16); core/shell=50/50

P-46, 47: core=poly(ethylene glycol dimethacrylate/n-butyl acrylate) (10/90)
- P-46: shell=styrene/M-1 (84/16); core/shell=50/50
- P-47: shell=methyl acrylate/M-7/methacrylic acid (65/15/20); core/shell=75/25

P-48 to 51: core=poly(ethylene glycol dimethacrylate/n-butyl acrylate) (20/80)
- P-48: shell=styrene/M-1 (84/16); core/shell=50/50
- P-49: shell=styrene/M-1 (84/16); core/shell=75/25
- P-50: shell=methyl acrylate/M-8/Na 2-acrylamido-2-methylpropanesulfonate (80/15/5); core/shell=75/25
- P-51: shell=n-butyl acrylate/M-1 (84/16); core/shell=50/50

P-52 to 54: core=polyvinyl acetate (100)
- P-52: shell=styrene/M-1 (84/16); core/shell=50/50
- P-53: shell=styrene/divinylbenzene/M-24 (79/5/16); core/shell=50/50
- P-54: shell=n-dodecyl methacrylate/butyl acrylate/M-7 (30/55/15); core/shell=40/60

P-55 to 57: core=poly(divinylbenzene/2-ethylhexyl acrylate) (10/90)
- P-55: shell=methyl acrylate/M-1 (84/16); core/shell=50/50
- P-56: shell=methyl acrylate/styrene/M-1 (74/10/16); core/shell=50/50
- P-57: shell=M-1 (100); core/shell=90/10

P-58 to 60: core=poly(divinylbenzene/styrene/2-ethylhexyl acrylate) (10/23/67)
- P-58: shell=methyl acrylate/M-1 (84/16); core/shell=50/50
- P-59: shell=methyl acrylate/styrene/M-1 (74/10/16); core/shell=50/50
- P-60: shell=ethyl acrylate/2-hydroxyethyl methacrylate/M-5 (65/15/20); core/shell=85/15

P-61: core=poly(ethylene glycol dimethacrylate/vinyl palmitate/n-butyl acrylate) (20/20/60); shell=ethylene glycol dimethacrylate/styrene/n-butyl methacrylate/M-1 (5/40/40/15); core/shell=50/50

P-62: core=poly(trivinylcyclohexane/n-butyl acrylate/styrene) (10/55/35); shell=methyl acrylate/M-1/Na 2-acrylamido-2-methylpropanesulfonate (88/7/5); core/shell=70/30

P-63, 64: core=poly(divinylbenzene/styrene/methyl methacrylate) (10/45/45)
  P-63: shell=n-butyl acrylate/M-1 (84/16); core/shell=50/50
  P-64: shell=n-dodecyl acrylate/ethyl acrylate/M-21 (60/30/10); core/shell=50/50

P-65, 66: core=poly(p-vinyltoluene/n-dodecyl methacrylate) (70/30)
  P-65: shell=methyl acrylate/n-butyl methacrylate/M-2/acrylic acid (30/55/10/5); core/shell=50/50
  P-66: shell=n-butyl acrylate/M-19 (84/16); core/shell=70/30

The core/shell latex polymer of the present invention can easily be prepared by emulsion-polymerizing a monomer for forming the shell, wherein the monomer is added, in one portion or dropwise, to a core latex polymer in the form of a water dispersion obtained by emulsion polymerization.

The emulsion polymerization can in general be carried out by emulsifying a monomer in water or a mixed solvent of water and a water-miscible organic solvent (such as methanol, ethanol or acetone), preferably in the presence of at least one emulsifying agent and then carrying out emulsion polymerization in the presence of a radical initiator at a temperature generally ranging from 30 to about 100° C., preferably 40 to about 90° C. The amount of the water-miscible organic solvent ranges from 0 to 100% by volume, preferably 0 to 50% by volume based on the amount of water.

The polymerization reaction is in general carried out in the presence of a radical polymerization initiator in an amount ranging from 0.05 to 5% by weight and optionally an emulsifying agent in an amount ranging from 0.1 to 10% by weight, on the basis of the weight of the monomer to be polymerized. The polymerization initiator may be azobis compounds, peroxides, hydroperoxides and redox solvents such as potassium persulfate, ammonium persulfate, t-butyl peroctoate, benzoyl peroxide, isopropyl carbonate, 2,4-dichlorobenzyl peroxide, methyl ethyl ketone peroxide, cumene hydroperoxide, dicumyl peroxide, 2,2'-azobisisobutyrate, 2,2'-azobis(2-amidinopropane) hydrochloride and combination of potassium persulfate and sodium hydrogen sulfite.

The emulsifying agents usable herein may be anionic, cationic, amphoteric and nonionic surfactants as well as water-soluble polymers. Specific examples thereof are sodium laurate, sodium dodecylsulfate, sodium 1-octoxycarbonylmethyl-1-octoxycarbonylmethanesulfonate, sodium laurylnaphthalenesulfonate, sodium laurylbenzenesulfonate, sodium laurylphosphate, cetyltrimethylammonium chloride, dodecyltrimethyleneammonium chloride, N-2-ethylhexylpyridinium chloride, polyoxyethylene nonyl phenyl ether, polyoxyethylene sorbitan lauryl ester, sodium dodecyl diphenyl ether disulfonate, sodium 2-tetradecene-1-sulfonate, sodium 3-hydroxytetradecane-1-sulfonate, gelatin, PVA, and emulsifying agents and water-soluble polymers as disclosed in J.P. KOKOKU No. Sho 53-6190, with anionic or nonionic surfactants and water-soluble polymers being preferred among others.

When carrying out the emulsion polymerization, the monomer is preferably dropwise added to the polymerization system in order to prevent generation of heat during the polymerization and to form a more distinct core/shell structure.

Moreover, when the monomer for the shell polymer is polymerized after forming the core latex particles by the emulsion polymerization in the presence of the foregoing initiator and emulsifying agent, the polymerization of the monomer may be performed in the presence or absence of an additional emulsifying agent. The supplementary addition of an emulsifying agent is often needed from the viewpoint of ensuring the stability of the resulting latex polymer. On the contrary, the presence of an excess emulsifying agent sometimes results in the formation of particles comprising only undesired shell polymers as by-products. Therefore, the amount of the emulsifying agent supplementarily added after the formation of the core polymer is limited to the range of from 0.001 to 2% by weight on the basis of the weight of the core particles or the polymerization is preferably carried out in the absence of any supplementary emulsifying agent.

To form a latex having an effective core/shell structure, the core particles are preferably polymerized as complete as possible before the addition of the monomer for forming the shell polymer. More specifically, the degree of polymerization thereof is not less than 90%, preferably not less than 95% and particularly preferably it is substantially 100%.

The active methylene units serve as reactive groups in the improvement of the film strength of the latex polymer/gelatin composite film and various properties of paints and varnishes as well as adhesives. For this reason, the amount of the active methylene units present on the latex surface becomes an important factor which affects the quality of the latex polymer. The core/shell latex of the present invention is basically effective in that the active methylene units can be concentrated on the latex surface serving as an important site. Moreover, the core/shell latex shows an effect of unexpectedly improving the film strength of, for instance, a gelatin film in a wet condition, which cannot be predicted only on the basis of the concentration of the active methylene units present on the surface thereof. In addition, other required functions such as a film-forming ability and physical properties (for instance, control of brittleness) of the resulting film or composite film with gelatin can be imparted to the core portion independent of the shell portion by, for instance, controlling the Tg value of the entire latex.

The core/shell latex particles of the present invention can be obtained by the emulsion polymerization discussed above in the form of a water dispersion, but it is also possible to convert it into powder of fine particles while maintaining the core/shell structure thereof.

Such powdery product can be obtained by any known methods such as lyophilization; aggregation-filtration using a strong acid or a salt; or aggregation-filtration through repetition of freezing-thawing of a liquid.

Then the silver halide photographic light-sensitive material as the second aspect of the present invention will hereinafter be explained in more detail.

Gelatin is preferably used as a binder in the silver halide emulsion layer of the present invention and other hydrophilic colloidal layers, but other hydrophilic colloids may be used in combination. Examples of such hydrophilic colloids include various kinds of synthetic hydrophilic polymer materials, for instance, gelatin derivatives, graft polymers of gelatin and other polymers, proteins such as albumin and casein, cellulose derivatives such as hydroxyethyl cellulose, carboxymethyl cellulose and cellulose sulfuric acid esters, sodium alginate, sugar derivatives such as starch derivatives, and homo- and copolymers such as polyvinyl alcohol, polyvinyl alcohol partially modified with acetal, poly-N-vinylpyrrolidone, polyacrylic acid, polymethacrylic acid, polyacrylamide, polyvinyl imidazole and polyvinyl pyrazole.

Gelatin may be gelatin treated with lime and gelatin treated with an acid as well as gelatin hydrolyzates and enzyme-decomposed products of gelatin.

Examples of silver halide photographic light-sensitive materials containing the latex of the present invention specifically include X-ray sensitive light-sensitive materials, light-sensitive materials for printing, those for monochromatic photographing, color negative light-sensitive materials, color reversal light-sensitive materials and color printing paper.

In the light-sensitive materials for printing and X-ray sensitive light-sensitive materials as preferred embodiments of the present invention, a sufficient effect can be expected irrespective of the coated amount of gelatin as a binder, but the overall content of the whole hydrophilic colloidal layers on the side of the silver halide emulsion layer is preferably not more than 3.0 g/m$^2$, particularly preferably 1.0 to 2.5 g/m$^2$.

The core/shell. latex polymer of the invention is incorporated into at least one of the silver halide emulsion layer, backing layer and other hydrophilic colloid layers, in an amount ranging from 0.1 to 200% by weight, preferably 5 to 150% by weight on the basis of the amount of gelatin present in the hydrophilic colloid layer.

The silver halide emulsion used for preparing the light-sensitive material of the present invention may comprise, as silver halide components, any silver halide currently used in the silver halide emulsion such as silver bromide, silver iodobromide, silver chloride, silver chlorobromide and silver chloroiodobromide. The silver halide grains may be those prepared by the acid method, neutral method or ammonium method. The silver halide grain may be those in which silver halides are uniformly distributed throughout each grain or a core/shell grain whose surface layer has a silver halide composition differs from that of the inner portion thereof as well as those in which latent images are mainly formed on the surface of the grain or mainly formed in the inner portion. The silver halide grain usable in the invention may have any shape. An example of preferred shapes of the grain is a cube having {100} plane as the crystal surface. Alternatively, it is also possible to use, for instance, octahedron, dodecahedron and tetradecahedron which can be produced by the methods disclosed in, for instance, U.S. Pat. Nos. 4,183,756 and 4,225,666, J.P. KOKAI No. Sho 55-26589, J.P. KOKOKU No. Sho 55-42737 and J. Photogr. Sci., 21-39 (1973). Moreover, those having twin crystal planes may likewise be used in the invention. The silver halide grains used in the invention may comprise those having uniform shape or a mixture of grains having various shapes. In the present invention, a monodispersed emulsion is preferred. With regard to monodispersed silver halide grains present in the monodispersed emulsion, the rate (by weight) of silver halide grains whose particle size falls within the range: γ (average particle size) ±10% is preferably not less than 60% based on the total weight of the silver halide grains.

Metal ions may be incorporated into the interior and/or the surface of silver halide grains used in the emulsion of the present invention by adding, thereto, cadmium salts, zinc salts, lead salts, thallium salts, iridium salts or complex salts thereof, rhodium salts or complex salts thereof, or iron salts or complex salts thereof during processes for forming and/or growing the grains. In the preparation of the photographic emulsion used in the invention, the sulfur-sensitization or gold-sulfur sensotization may be used or may be used in combination with the reduction sensitization using a reducing substance or noble metal sensitization using a noble metal compound. As the light-sensitive emulsion, the foregoing emulsions may be used alone or in combination. When practicing the present invention, various stabilizers such as 4-hydroxy-6-methyl-1,3,3a,7-tetrazaindene, 5-mercapto-1-phenytetrazole and 2-mercaptobenzothiazole may be used after the foregoing chemical sensitization. Moreover, a silver halide-solubilizing agent such as thioethers and/or a crystal habit-controlling agent such as mercapto group-containing compounds or sensitizing dyes may optionally be used.

In the silver halide photographic light-sensitive material of the invention, the photographic emulsion may be spectrally sensitized with a sensitizing dye so as to make the emulsion sensitive to blue light rays having relatively long wavelengths, green light rays, red light rays or infrared light rays. Examples of such dyes to be used are cyanine dyes, merocyanine dyes, complex cyanine dyes, complex merocyanine dyes, holopolar cyanine dyes, hemicyanine dyes, styryl dyes and hemioxonol dyes. These sensitizing dyes may be used alone or in any combination. Combinations of sensitizing dyes are often used for the purpose of supersensitization. The silver halide photographic light-sensitive material of the invention may comprise, in its hydrophilic colloid layer, water-soluble dyes as filter dyes, or for various other purposes such as anti-irradiation and anti-halation. Examples of such dyes are oxonol dyes, hemioxonol dyes, styryl dyes, merocyanine dyes, cyanine dyes and azo dyes. Among these, oxonol dyes, hemioxonol dyes and merocyanine dyes are useful. Specific examples of dyes usable in the invention are those disclosed in German Patent No. 616,007, U.K. Patent Nos. 584,609 and 1,117,429, J.P. KOKOKU Nos. Sho 26-7777, Sho 39-22069 and Sho 54-38129, J.P. KOKAI Nos. Sho 48-85130, Sho 49-99620, Sho 49-114420 and Sho 49-129537, PB Report No. 74175 and Photo. Abstr., 128 ('21). These dyes are suitably used, in particular, in the bright room reversal light-sensitive material. It is also possible to use a dispersion of dye solid fine particles as disclosed in Japanese Patent Application Serial No. Hei 5-244717, pp. 23–30. If the silver halide photographic light-sensitive material of the present invention comprises a dye and/or a ultraviolet light absorber in its hydrophilic colloidal layer, they may be mordanted with, for instance, a cationic polymer.

The latex polymer of the present invention may likewise be used in color silver halide photographic light-sensitive materials.

The color photographic light-sensitive material comprises at least one of blue-sensitive, green-sensitive and red-sensitive silver halide emulsion layers on a substrate and the number of the silver halide emulsion layer, the number of light-insensitive layer and the order thereof may arbitrarily be selected. A typical example thereof is a silver halide photographic light-sensitive material which comprises a substrate and at least one light-sensitive layer comprising a plurality of silver halide emulsion layers which have substantially the same color sensitivity, but differ in the degree of sensitivity and the light-sensitive layer is a unit light-sensitive layer sensitive to either of blue light rays, green light rays and red light rays. In the multilayered silver halide color photographic light-sensitive material, the unit light-sensitive layer has such an arrangement that the red-sensitive, green-sensitive and blue-sensitive layers are formed on the substrate in this order from the side of the substrate. Alternatively, these layers may be arranged in the reverse order or may be arranged such that light-sensitive layers having the same color sensitivity sandwich a light-sensitive layer having different color sensitivity. These layers may be successively applied or may be applied, at one time, in the form of a multiple layers (so-called simultaneous multilayer-coating). These methods are currently used in this field and are not worth special mention.

A light-insensitive layer such as a variety of intermediate layers may be formed between the foregoing silver halide light-sensitive layers or as the uppermost layer or the lowermost layer.

The intermediate layer may comprise couplers and/or DIR compounds as disclosed in J.P. KOKAI Nos. Sho 61-43748, Sho 59-113438, Sho 59-113440, Sho 61-20037 and Sho 61-20038 and/or color-mixing inhibitors commonly used in this field.

A plurality of silver halide emulsion layers constituting each unit light-sensitive layer are disclosed in, for instance, German Patent No. 1,121,470, U.K. Patent No. 923,045, J.P. KOKAI Nos. Sho 57-112751, Sho 62-200350, Sho 62-206541, Sho 62-206543, Sho 56-25738, Sho 62-63936 and Sho 59-202464 and J.P. KOKOKU Nos. Sho 55-34932 and Sho 49-15495.

The color light-sensitive material may comprises various kinds of color couplers and specific examples thereof are disclosed in patents listed in Research Disclosure (RD), No. 17643, VII-C~G.

Yellow couplers preferably used in the invention are, for instance, those disclosed in U.S. Pat. Nos. 3,933,501, 4,022, 620, 4,326,024, 4,401,752 and 4,248,961, J.P. KOKOKU No. Sho 58-10739, U.K. Patent Nos. 1,425,020 and 1,476, 760, U.S. Pat. Nos. 3,973,968, 4,314,023, 4,511,649 and 5,298,383, European Patent No. 249,473A and J.P. KOKAI No. Hei 5-165171.

Magenta couplers are preferably 5-pyrazolone type and pyrazoloazole type compounds, in particular, those disclosed in, for instance, U.S. Pat. Nos. 4,310,619 and 4,351, 897, European Patent No. 73,636, U.S. Pat. Nos. 3,061,432 and 3,725,067, Research Disclosure No. 24220 (June, 1984), J.P. KOKAI No. Sho 60-33552, Research Disclosure No. 24230 (June, 1984), J.P. KOKAI Nos. Sho 60-43659, Sho 61-72238, Sho 60-35730, Sho 55-118034 and Sho 60-185951, U.S. Pat. Nos. 4,500,630, 4,540,654 and 4,556, 630 and WO(PCT) No. 88/04795.

Cyan couplers are, for instance, phenolic and naphtholic couplers and preferably those disclosed in for instance, U.S. Pat. Nos. 4,052,212, 4,146,396, 4,228,233, 4,296,200, 2,369,929, 2,801,171, 2,772,162, 2,895,826, 3,772,002, 3,758,308, 4,334,011 and 4,327,173, DEOS No. 3,329,729, European Patent Nos. 121,365A and 249,453A, U.S. Pat. Nos. 3,446,622, 4,333,999, 4,753,871, 4,451,559, 4,427, 767, 4,690,889, 4,254,212 and 4,296,199 and J.P. KOKAI Nos. Sho 61-42658 and Hei 5-341467.

Colored couplers for correcting unnecessary absorption of color-forming dyes are preferably those disclosed in Research Disclosure No. 17643, III-G, U.S. Pat. Nos. 4,163, 670, 5,266,456, 4,004,929 and 4,138,258, J.P. KOKOKU No. Sho 57-39413 and U.K. Patent No. 1,146,368.

Couplers whose color-forming dyes show appropriate diffusibility are preferably those disclosed in U.S. Pat. No. 4,366,237, U.K. Patent No. 2,125,570, European Patent No. 96,570, DEOS No. 3,234,533.

Typical examples of polymerized dye-forming couplers are disclosed in, for instance, U.S. Pat. Nos. 3,451,820, 4,080,211, 4,367,282, 4,409,320 and 4,576,910 and U.K. Patent No. 2,102,137.

Couplers which release photographically useful residues along with coupling can likewise preferably be used in the present invention. DIR couplers which release development inhibitors are preferably those disclosed in the patents listed in the foregoing RD 17643, VII-F such as J.P. KOKAI Nos. Sho 57-151944, Sho 57-154234, Sho 60-184248, Sho 63-37346 and Hei 5-113635 and U.S. Pat. No. 4,248,962.

Couplers which release nucleating agents or development accelerators in the form of images during development are preferably those disclosed in U.K. Patent Nos. 2,097,140 and 2,131,188 and J.P. KOKAI Nos. Sho 59-157638 and sho 59-170840.

In addition, examples of other couplers usable in the light-sensitive materials of the present invention include competing couplers disclosed in, for instance, U.S. Pat. No. 4,130,427; multi-equivalent couplers disclosed in, for instance, U.S. Pat. Nos. 4,283,472, 4,338,393 and 4,310, 618; DIR redox compound-releasing couplers, DIR coupler-releasing couplers, DIR coupler-releasing redox compounds or DIR redox-releasing redox compounds disclosed in, for instance, J.P. KOKAI Nos. Sho 60-185950 and Sho 62-24252; couplers releasing dyes which cause recoloring after elimination disclosed in European Patent No. 173, 302A; bleach accelerator-releasing couplers disclosed in, for instance, RD Nos. 11449 and 24241 and J.P. KOKAI No. Sho 61-201247; ligand-releasing couplers disclosed in, for instance, U.S. Pat. No. 4,553,477; and leuco dye-releasing couplers disclosed in J.P. KOKAI No. Sho 63-75747.

These couplers used in the invention may be incorporated into the light-sensitive material by various known dispersion method. Examples of high boiling point solvents used in the oil-in-water dispersion methods are those disclosed in, for instance, U.S. Pat. No. 2,322,027. Specific examples of high boiling point organic solvents whose boiling points are not less than 175° C. used in the oil-in-water dispersion methods are phthalic acid esters, esters of phosphoric acid or phosphonic acid, benzoic acid esters, amides, alcohols or phenols, aliphatic carboxylic acid esters, aniline derivatives and hydrocarbons. Moreover, auxiliary solvents usable herein are, for instance, organic solvents having a boiling point of not less than about 30° C. and preferably not less than 50° C. and not more than about 160° C. and typical examples thereof are ethyl acetate, butyl acetate, ethyl propionate, methyl ethyl ketone, cyclohexanone, 2-ethoxyethyl acetate and dimethylformamide.

Specific examples of the processes in latex-dispersing methods, effects thereof and latexes for impregnation are disclosed in, for instance, U.S. Pat. No. 4,199,363 and OLS Nos. 2,541,274 and 2,541,230.

Preferably, the color light-sensitive material has a overall film thickness of the whole hydrophilic colloid layers on the side of the emylsion layer of not more than 28 µm and a film-swelling rate $T_{1/2}$ of not more than 30 seconds. The film thickness herein means that determined at 25° C. and relative humidity of 55% (maintained for 2 days) and the film-swelling rate $T_{1/2}$ can be determined according to the method known in this art. For instance, it can be determined using a swellometer such as that disclosed in A. Green et al., Photogr. Sci. Eng., Vol. 19, No. 2, pp. 124–129. Moreover, 90% of the maximum swollen film thickness observed when the light-sensitive material is treated with a color developer at 30° C. for 3 minutes and 15 seconds is assumed to be the film thickness at saturation and $T_{1/2}$ is defined to be a time required for reaching the thickness $T_{1/2}$.

The film-swelling rate $T_{1/2}$ can be adjusted by adding a film-hardening agent to gelatin as a binder or by changing the elapsed time conditions after the application thereof. Moreover, the swelling rate preferably ranges from 150 to 400%. The swelling rate herein can be calculated from the maximum swelling film thickness observed under the aforementioned conditions according to the equation: (maximum swelling film thickness–film thickness)/(film thickness).

In the present invention, antistatic agents are preferably used. The antistatic agent is not restricted to specific ones and examples thereof include anionic polyelectrolytes such as polymers carrying carboxylic acid and carboxylate residues and/or sulfonic acid residues as disclosed in J.P. KOKAI Nos. Sho 48-22017, Sho 51-30725, Sho 51-129216 and Sho 55-95942 and J.P. KOKOKU No. Sho 46-24159; cationic polymers such as those disclosed in, for instance, J.P. KOKAI Nos. Sho 49-121523 and Sho 48-91165 and J.P. KOKOKU No. Sho 49-24582; ionic surfactants (anionic and cationic) such as compounds disclosed in, for instance, J.P. KOKAI Nos. Sho 49-85826, Sho 49-33630, Sho 48-87826 and Sho 55-70837 and J.P. KOKOKU Nos. Sho 49-11567 and Sho 49-11568.

Most preferred antistatic agents are at least one crystalline metal oxide selected from the group consisting of ZnO, $TiO_2$, $SnO_2$, $Al_2O_3$, $In_2O_3$, $SiO_2$, MgO, BaO, $MoO_3$ and $V_2O_5$; or fine particles of double oxides thereof (with, for instance, Sb, P, B, In, S, Si and/or C); or further sol-like metal oxides or fine particles of double oxides thereof.

The conductive crystalline oxides or fine particles or needle-like fillers of double oxides thereof used in the invention have a volume resistivity of not more than $10^7$ $\Omega$-cm, more preferably not more than $10^5$ $\Omega$-cm. The particle size thereof desirably ranges from 0.001 to 1.0 $\mu$m, in particular, 0.001 to 0.3 $\mu$m. To more effectively impart conductivity to the antistatic layer, it is preferred to partially coagulate primary fine particles of the conductive crystalline oxides or fine particles or fillers of double oxides thereof to a particle size ranging from 0.01 to 0.2 $\mu$m prior to practical use.

Moreover, with regard to the conductivity achieved by the formation of the antistatic layer using these materials, the electrical resistance thereof in the raw state and after processing is preferably not more than $10^{12}$ $\Omega$, more preferably not more than $10^{10}$ $\Omega$ and, in particular, not more than $10^{9.5}$ $\Omega$.

In such case, the content of the antistatic agent in the light-sensitive material preferably ranges from 5 to 500 mg/m$^2$ and particularly preferably 10 to 350 mg/m$^2$.

In addition, the amount of the binder preferably ranges from 1 to 500 mg/m$^2$, in particular, 5 to 300 mg/m$^2$. The ratio of the amount of the conductive crystalline oxides or fine particles or needle-like fillers of double oxides thereof to that of the binder preferably ranges from 1/300 to 100/1, more preferably 1/100 to 100/5.

The light-sensitive material of the present invention preferably has slipping properties. The slipping properties may be imparted to either the surface of the light-sensitive layer or the backing layer, but higher effect can be expected when imparting the properties to the backing layer. The slipping properties are preferably not more than 0.25 and not less than 0.01 as expressed in terms of the coefficient of dynamic friction. In this respect, the measured value represents that observed when the surface is moved at a rate of 60 cm/m$^2$ with respect to stainless steel spheres having a diameter of 5 mm. In this evaluation, a value of almost the same level is observed when using the surface of a light-sensitive layer as the counterpart material.

The slipping agents usable in the invention are, for instance, polyorganosiloxane as disclosed in J.P. KOKOKU No. Sho 53-292; higher fatty acid amides as disclosed in U.S. Pat. No. 4,275,146; higher fatty acid esters (esters of fatty acids having 10 to 24 carbon atoms with alcohols having 10 to 24 carbon atoms) as disclosed in J.P. KOKOKU No. Sho 58-33541, U.K. Patent No. 927,446 or J.P. KOKAI Nos. Sho 55-126238 and Sho 58-90633; metal salts of higher fatty acids as disclosed in U.S. Pat. No. 3,933,516; esters of linear higher fatty acids with linear higher alcohols as disclosed in J.P. KOKAI No. Sho 58-50534; and branched alkyl group containing higher fatty acid-higher alcohol esters as disclosed in International Publication No. 90108115.8.

Moreover, higher fatty acids and derivatives thereof and higher alcohols and derivatives thereof usable herein are, for instance, higher fatty acids and metal salts thereof; higher fatty acid esters; higher fatty acid amides; esters of higher fatty acids with polyhydric alcohols; higher aliphatic alcohols; monoalkylphosphites, dialkylphosphites, trialkylphosphites, monoalkylphosphates, dialkylphosphates and trialkylphosphates of higher aliphatic alcohols; and higher aliphatic alkylsulfonic acids and amide compounds and salts thereof.

In addition, preferably used further include, for instance, higher fatty acid-higher alcohol esters disclosed in, for instance, Japanese Patent Application Serial Nos. Hei 5-153909, Hei 5-153910 and Hei 5-345871.

Moreover, the slipping agents used in the invention may be dispersed in organic solvents by various methods. Examples of methods for dispersing the same in organic solvents include a method comprising dispersing a slipping agent in an organic solvent in the solid state using a ball mill or sand grinder; a method comprising dissolving a slipping agent in an organic solvent with heating and precipitating by cooling with stirring to disperse the agent in the organic solvent; a method comprising dissolving a slipping agent in an organic solvent with heating, adding the solution to an organic solvent maintained at ordinary temperature or cooled and cooling the mixture to separate out the agent and to thus disperse it in the organic solvent; or a method comprising emulsifying a slipping agent using two organic solvents incompatible with one another. Examples of dispersing devices may be any currently used one, in particular, ultrasonic dispersing devices and homogenizers.

The substrate for the light-sensitive material of the invention may be, for instance, those made from cellulose triacetate, cellulose diacetate, nitrocellulose, polystyrene, polyethylene terephthalate, baryta paper and polyethylene-coated paper.

These substrates may be subjected to a corona discharge treatment or may optionally be subjected to an undercoating treatment by any known method.

The present invention may likewise be applied to silver halide photographic light-sensitive materials comprising transparent magnetic recording layers. The conventional silver halide photographic light-sensitive material (hereinafter simply referred to as "light-sensitive material") simply provides image information during photographing and printing, but the application of a transparent magnetic recording layer to the whole surface of the light-sensitive layer, as disclosed in J.P. KOKAI Nos. Hei 4-68336 and Hei 4-73737, permits the input, to the material, of various information such as the photographing date and time, the weather, conditions for photographing such as reduction/expansion ratio, the reprint number, portions to be zoomed in, messages and conditions for development and printing in addition to images. Moreover, the foregoing information may likewise be inputted to image-reproducing apparatuses such as television and video tape recorder through the use of such magnetic recording layer. In this respect, it is desired to eliminate any effect of dust due to electrification, to improve the slipping properties of films and to eliminate any influence of curl of the film (including that of the substrate).

The transparent magnetic recording layer will further be detailed below.

Examples of magnetic particles usable in the present invention include ferromagnetic iron oxides (FeOx, $4/3 < x \leq 3/2$) such as $\gamma$-$Fe_2O_3$; Co-coated ferromagnetic iron oxides (FeOx, $4/3 < x \leq 3/2$) such as Co-coated $\gamma$-$Fe_2O_3$; Co-coated magnetite; other Co-containing ferromagnetic iron oxides; Co-containing magnetite; ferromagnetic chromium dioxide; ferromagnetic metals; ferromagnetic alloys; other ferrites such as hexagonal Ba-ferrite, Sr-ferrite, Pb-ferrite and Ca-ferrite; or solid solutions or ion-substituted bodies thereof, with Co-coated ferromagnetic iron oxides such as Co-coated $\gamma$-$Fe_2O_3$ whose $Fe^{2+}/Fe^{3+}$ ratio ranges from 0 to 10% being preferred because of their high permeability.

The shape of the ferromagnetic material may be needle-like, rice grain-like, spherical, cube-like and plate-like ones, but needle-like shape is preferred because of its high electromagnetic conversion characteristics. The needle-like ferromagnetic material preferably has a particle size ranging from 0.01 to 0.8 $\mu$m, more preferably 0.05 to 0.3 $\mu$m for the major axis and a major axis/minor axis ranging from 2 to 100 and more preferably 4 to 15. The specific surface area thereof is preferably not less than 20 $m^2/g$, in particular, not less than 30 $m^2/g$ as expressed in terms of $S_{BET}$.

The saturation magnetization ($\sigma s$) of the ferromagnetic material is preferably as high as possible, but preferably not less than 50 emu/g, more preferably not less than 70 emu/g and practically not more than 100 emu/g. In addition, the rectangularity ratio ($\sigma r/\sigma s$) of the ferromagnetic material is preferably not less than 40%, more preferably not less than 45%. If the coercive force (Hc) is too low, it is liable to be erased, while if it is too high, it is impossible to write depending on systems and therefore, the material should have a proper rectangularity ratio. It is thus not less than 200 Oe not more than 2000 Oe and more preferably not less than 650 Oe and not more than 950 Oe.

These ferromagnetic particles may be surface-treated with silica and/or alumina such as those disclosed in, for instance, J.P. KOKAI Nos. Sho 59-23505 and Hei 4-096052. Moreover, they may be surface-treated with inorganic and/or organic materials such as those disclosed in J.P. KOKAI Nos. Hei 4-195726, Hei 4-192116, Hei 4-259911 and Hei 5-081652. Further the surface of these ferromagnetic particles may be treated with a silane coupling agent or a titanium coupling agent.

The binder usable in the invention may be known thermoplastic resins, thermosetting resins, radiation-curable resins, reactive resins, acid-, alkali- or biodegradable polymers, naturally occurring polymers (such as cellulose derivatives and sugar derivatives) and mixture thereof, which have been used as binders for magnetic recording media. The foregoing resins preferably has a Tg value ranging from −40° C. to 300° C., a weight-average molecular weight ranging from 2000 to 1,000,000, preferably 5000 to 300,000.

Among these binders, preferred are cellulose di(or tri) acetate.

These binders may be used alone or in combination and may be hardened by addition of an epoxy, aziridine or isocyanate type known crosslinking agent and/or a radiation-curable vinyl monomer. Particularly preferred are isocyanate type crosslinking agents and examples thereof are tolylene diisocyanate, hexamethylene diisocyanate, xylylene diisocyanate, reaction products of these isocyanates with polyols (such as reaction product of 3 mole of tolylene diisocyanate with one mole of trimethylolpropane) and polyisocyanates prepared by condensing these isocyanates.

In addition, examples of crosslinking agents carrying epoxy groups are preferably trimethylolpropane, triglycidyl adducts and tetraglycidyl adducts of pentaerythritol. The radiation-curable vinyl monomers are compounds capable of being polymerized through irradiation with radiant rays and preferred examples thereof are (meth)acrylates of polyethylene glycol having two (meth)acryloyl groups such as diethylene glycol di(meth)acrylate and triethylene glycol di(meth)acrylate; trimethylolpropane tri(meth)acrylate; pentaerythritol tetra(meth)acrylate; dipentaerythritol penta (meth)acrylate; dipentaerythritol hexa(meth)acrylate; and reaction products of polyisocyanates with hydroxy(meth) acrylate compounds.

The amount of these crosslinking agents preferably ranges from 5 to 45% by weight based on the total amount of binder including the crosslinking agent.

The magnetic recording layer of the present invention may also comprise a hydrophilic binder such as water-soluble polymers, cellulose esters, latex polymers and water-soluble polyesters. Specific examples of water-soluble polymers include gelatin, gelatin derivatives, casein, agar, sodium alginate, starch, polyvinyl alcohol, acrylic acid copolymer and maleic anhydride copolymer, specific examples of cellulose esters are carboxymethyl cellulose and hydroxyethyl cellulose. Specific examples of latex polymers are vinyl chloride moiety-containing copolymers, vinylidene chloride moiety-containing copolymers, acrylate moiety-containing copolymers, vinyl acetate moiety-containing copolymers and butadiene moiety-containing copolymers. Among these, most preferred is gelatin.

The film-hardening agent for gelatin is, for instance, 2-hydroxy-4,6-dichloro-1,3,5-triazine, divinylsulfone, isocyanates disclosed in, for instance, U.S. Pat. No. 3,103,437, azilidine compounds disclosed in, for instance, U.S. Pat. Nos. 3,017,280 and 2,983,611, and carboxyl group-active type film-hardening agents disclosed in, for instance, U.S. Pat. No. 3,321,313. The amount of the film-hardening agent used in general ranges from 0.01 to 30% by weight, preferably 0.05 to 20% by weight based on the weight of the dry gelatin.

The foregoing magnetic material may be dispersed in the binder by various known means, preferably a kneader, a pin type mill and an annular type mill as well as a combination of a kneader and a pin type mill and a combination of a kneader and an annular type mill.

The thickness of the magnetic recording layer ranges from 0.1 to 10$\mu$, preferably 0.2 to 5$\mu$ and more preferably 0.3 to 3$\mu$.

The weight ratio of the magnetic particles to the binder preferably ranges from 0.5:100 to 60:100 and more preferably 1: 100 to 30:100.

The coated amount of the magnetic material ranges from 0.005 to 3 $g/m^2$, preferably 0.01 to 2 $g/m^2$ and more preferably 0.02 to 0.5 $g/m^2$.

The magnetic recording layer of the invention can be applied onto the back face of a substrate for photographs by coating or printing throughout the whole surface or in a striped pattern. The magnetic recording layer may be applied thereto by, for instance, air doctor coating, blade coating, air knife coating, squeeze coating, coating through impregnation, reverse roll coating, transfer roll coating, gravure coating, kiss-roll coating, cast coating, spray coating, dip coating, bar coating and extrusion coating as well as other methods. These methods are specifically described in "Coating Engineering", pp. 253–277, published by Asakura Shoten (Showa 46 (1971), March 20).

Various functions such as lubrication-improving properties, curl-controlling properties, antistatic properties, adhesion-inhibitory properties and head-polishing properties may be imparted to the magnetic recording layer or these functions may be imparted to the layer by applying a separate functional layer. A protective layer may, if necessary, be formed adjacent to the magnetic recording layer to improve the resistance to scratches thereto and it is preferred to add, to the protective layer, inorganic or organic fine particles (such as silica, $SiO_2$, $SnO_2$, $Al_2O_3$, $TiO_2$, crosslinked polymethyl methacrylate, barium carbonate and silicone fine particles).

Then a polyethylenearomatic dicarboxylate type polyester substrate will be detailed below, which is a substrate preferably used in the present invention.

The polyester is prepared using a diol and an aromatic dicarboxylic acid as essential components, but other dicarboxylic acids may be used in combination with the aromatic dicarboxylic acid. Examples of dibasic acids usable herein are terephthalic acid, isophthalic acid, phthalic acid, phthalic anhydride, naphthalene dicarboxylic acids (2,6-, 1,5-, 1,4- and 2,7-), diphenylene p,p'-dicarboxylic acid, tetrachlorophthalic anhydride, succinic acid, glutaric acid, adipic acid, sebacic acid, succinic anhydride, maleic acid, fumaric acid, maleic anhydride, itaconic anhydride, citraconic anhydride, tetrahydrophthalic anhydride, 3,6-endomethylenetetrahydrophthalic anhydride, 1,4-cyclohexane dicarboxylic acid, halogenated terephthalic acid, bis(p-carboxyphenol)ether, 1,1-dicarboxy-2-phenylethylene, 1,4-dicarboxymethylphenol, 1,3-dicarboxy-5-phenylphenol and sodium 3-sulfoisophthalate. The aromatic dicarboxylic acid as an essential component may be the foregoing dicarboxylic acids each of which has at least one benzene nucleus.

Specific examples of diols include ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 1,12-dodecanediol, 1,4-cyclohexanediol, 1,4-cyclohexanedimethanol, 1,3-cyclohexanediol, 1,1-cyclohexanedimethanol, catechol, resorcin, hydroquinone, 1,4-benzenedimethanol, dimethylolnaphthalene, p-hydroxyethyloxybenzene (PHBA) and bisphenol A.

Moreover, mono-functional or tri-functional or higher hydroxyl group-containing compounds or acid-containing compounds may be copolymerized. Moreover, in the polyester used in the invention, compounds each simultaneously carrying a hydroxyl and carboxyl groups (or esters thereof) in the molecule, such as salicylic acid, may be copolymerized.

Examples of the polymers thus formed are homopolymers such as polyethylene terephthalate, polyethylene naphthalate and polycyclohexane dimethanol terephthalate (PCT); and copolymers of terephthalic acid, naphthalenedicarboxylic acid and ethylene glycol (molar ratio of terephthalic acid to naphthalenedicarboxylic acid is preferably between 0.9:0.1 and 0.1:0.9 and more preferably between 0.8:0.2 and 0.2:0.8. Particularly preferred are polyesters comprising 2,6-naphthalenedicarboxylic acid moieties and more specifically, polyesters comprising 0.1 to 1.0 of 2,6-naphthalenedicarboxylic acid, with polyethylene 2,6-naphthalate being particularly preferred.

These homopolymers and copolymers can be synthesized by the conventionally known methods for preparing polyesters. For instance, they can be prepared in the light of the disclosure of "KOBUNSHI JIKKENGAKU (Experimental Methods for Polymers)", Vol. 5 "JUSHUKUGO To JUFUKA (Polycondensation and Polyaddition)", pp. 103–136, Kyoritsu Publishing Company (1980); and "GOSEI KOBUNSHI (Synthetic Polymers) V", pp. 187–286, Asakura Shoten (1971).

These polyesters preferably have an average molecular weight ranging from about 5000 to 200000.

Moreover, it is also possible to blend these polyesters with a minor amount of different kinds of polyesters, to incorporate moieties derived from monomers constituting other polyesters into these polyesters through copolymerization, to incorporate monomers having unsaturated bonds into these polyesters through copolymerization or to subject these polyesters to radical crosslinking, for the purpose of improving the adhesion thereof to the different polyesters.

Polymer blends of at least two polymers thus obtained can easily be formed by the methods disclosed in J.P. KOKAI Nos. Sho 49-5482, Sho 64-4325 and Hei 3-192718, and Research Disclosure Nos. 283,739-41, 284,779-82 and 294, 807-14.

The polyesters used in the invention each has a Tg value of not less than 50° C., but they are not always handled under strictly controlled conditions. They are often exposed to a temperature of up to 40° C., in particular, in the open air during midsummer and therefore, the Tg value thereof used in the invention is preferably not less than 55° C. for safety's sake. More preferably, the Tg value is not less than 60° C. and particularly preferably not less than 70° C. Moreover, it is preferably not less than 90° C. to aim at perfect. Moreover, the effect of eliminating curl due to the thermal treatment is disappeared if the polyester is exposed to a temperature of higher than the glass transition temperature thereof. For this reason, the polyester preferably has a Tg value of not less than the temperature during midsummer, i.e., 40° C. which is a severe condition encountered when the polyester is generally employed by the users.

Specific compounds of preferred polyesters usable in the invention will be listed below, but the present invention is not restricted to these specific examples.

Examples of Polyester Compounds

BP-0: terephthalic acid (TPA)/ethylene glycol (EG) (100/100) (PET); Tg=80° C.

BP-1: 2,6-naphthalene dicarboxylic acid (NDCA)/ethylene glycol (EG) (100/100) (PEN); Tg=119° C.

BP-2: terephthalic acid (TPA)/cyclohexanedimethanol (CHDM) (100/100); Tg=93° C.

BP-3: TPA/bisphenol A (BPA) (100/100); Tg=192° C.

BP-4: 2,6—NDCA/TPA/EG (50/50/100); Tg=92° C.

BP-5: 2,6—NDCA/TPA/EG (75/25/100); Tg=102° C.

BP-6: 2,6—NDCA/TPA/EG/BPA (50/50/75/25); Tg=112° C.

BP-7: TPA/EG/BPA (100/50/50); Tg=105° C.

BP-8: TPA/EG/BPA (100/25/75); Tg=135° C.

BP-9: TPA/EG/CHDM/BPA (100/25/25/50); Tg=115° C.

BP-10: isophthalic acid (IPA)/NDCA/TPA/EG (20/50/30/100); Tg=95° C.

BP-11: NDCA/neopentyl glycol(NPG)/EG (100/70/30); Tg=105° C.

BP-12: TPA/EG/bisphenol (BP) (100/20/80); Tg=115° C.

BP-13: PHBA/EG/TPA (200/100/100); Tg=125° C.

BP-14: PEN/PET (60/40); Tg=95° C.

BP-15: PEN/PET (80/20); Tg=104° C.

BP-16: polyacrylate (PAr)/PEN (50/50); Tg=142° C.

BP-17: PAr/polycyclohexanedimethanol terephthalate (PCT) (50/50); Tg=118° C.

BP-18: PAr/PET (60/40); Tg=101° C.

BP-19: PEN/PET/PAr (50/25/25); Tg=108° C.
BP-20: TPA/5-sulfoisophthalic acid (SIP)/EG (95/5/100); Tg=65° C.
BP-21: PEN/SIP/EG (99/1/100); Tg=115° C.

These substrates used in the invention each has a thickness of not less than 50 µm and not more than 300 µm. If it is less than 50 µm, the substrate cannot withstand the contraction stress generated in the light-sensitive layer during drying. On the other hand, if it exceeds 300 µm, this is contradict to the desired purpose of reducing the thickness for making the light-sensitive material compact. More preferably, it is preferably thick because of its firmness and thus the thickness ranges from 50 to 200 µm, more preferably 80 to 115 µm and particularly preferably 85 to 105 µm.

The polyester substrate used in the invention is then heat-treatment which should be carried out at a temperature of not less than 40° C. and not more than the glass transition temperature for 0.1 to 1500 hours and this treatment permits the formation of a film which seldom causes curling. More preferably, the heat-treatment is carried out at a temperature of not less than Tg-20° C. and less than Tg. The heat-treatment may be performed at a constant temperature falling within the range defined above or may be carried out while cooling the substrate. In this respect, the average cooling speed preferably ranges from −0.01 to −20° C./hr and more preferably −0.1 to −5° C./hr.

The time for the heat-treatment is not less than 0.1 hour and not more than 1500 hours, more preferably not less than 0.5 hr and not more than 200 hours. This is because if it is less than 0.1 hour, a sufficient effect cannot be expected, while if it exceeds 1500 hours, any further effect cannot be expected and the substrate may be liable to cause coloration and to become brittle.

To further improve the effect of eliminating the curling tendency, it is preferred that the substrate be heat-treated at a temperature of not less than Tg and less than the melting point thereof (the fusion temperature as determined by DSC) prior to the foregoing heat-treatment to thus eliminate the heat history of the substrate and thereafter the substrate is again heat-treated at a temperature of not less than 40° C. and less than Tg as discussed above.

Such a heat-treatment may be applied to a substrate in a roll-like shape or may be carried out while conveying web-like substrate. When a substrate in a roll-like shape is heat-treated, the substrate at room temperature is directly transferred to a thermostatic chamber to subject it to the heat-treatment or a web-like substrate is heated to a desired temperature during conveying the same, then wound up in a roll and finally heat-treated. In the heat-treatment of a roll-like substrate, the substrate suffers from various superficial defects due to heat-contraction stress generated during the heat-treatment such as formation of wrinkles due to firm winding and the impression by the cut end at the core portion. Therefore, some consideration is needed to eliminate these drawbacks. For instance, the surface of the substrate is made uneven (for instance, by coating the surface with conductive inorganic fine particles such as $SnO_2/Sb_2O_5$ or colloidal silica) to reduce or relieve the squeak and to thus prevent the formation of wrinkles due to firm winding or the thickness of the edge of the substrate is increased by fitting a knurling tool to the edge of the substrate to thus prevent the formation of any impression by the cut end at the core portion. The heat-treatment of the substrate in the form of a web requires very long post-heat-treating process, but this method can provides a substrate having excellent surface quality as compared with that obtained after the heat-treatment of the substrate in the roll-like shape.

These heat-treatments may be carried out at any stage, for instance, after the formation of substrate film, after a glow discharge treatment of the substrate, after the application of a backing layer (of antistatic agents, slipping agents or the like) or the application of an undercoating layer thereto. The heat-treatment is preferably carried out after the application of an antistatic agent. This permits the elimination of any adhesion of dust due to electrification during the heat-treatment which results in the formation of superficial defects.

Various additives are preferably added to the polyester serving as a substrate for photograph for further improvement of the functions of the substrate.

An ultraviolet light absorber may be incorporated into these polyester films to impart a fluorescence-inhibitory effect and storage stability to the films. The ultraviolet light absorber is preferably those which do not have any absorption band within the visible light range and the amount thereof to be added usually ranges from 0.01 to 20% by weight, preferably about 0.05 to 10% by weight based on the weight of the polyester film. Examples of ultraviolet light absorbers are benzophenone ultraviolet light absorbers such as 2,4-dihydroxybenzophenone, 2-hydroxy-4-methoxybenzophenone, 2-hydroxy-4-n-octoxybenzophenone, 4-dodecyloxy-2-hydroxybenzophenone, 2,2',4,4'-tetrahydroxybenzophenone and 2,2'-dihydroxy-4,4'-dimethoxybenzophenone; benzotriazole ultraviolet light absorbers such as 2-(2'-hydroxy-5-methylphenyl)benzotriazole, 2-(2'-hydroxy-3',5'-di-t-butylphenyl)benzotriazole and 2-(2'-hydroxy-3'-di-t-butyl-5'-methylphenyl)benzotriazole; and salicylic acid ultraviolet light absorbers such as phenyl salicylate and methyl salicylate.

Moreover, it is preferred to add inert inorganic particles and dyes to the substrate in order to eliminate any light-piping phenomenon. The dye used is not restricted to any specific one and the intended purpose can be achieved by admixing, with the substrate, commercially available dyes for polyesters such as Diaresin available from Mitsubishi Chemical Industries Ltd. and Kayaset available from Nippon Kayaku Co., Ltd. The staining density must be at least 0.01 expressed in terms of the color density in the visible light range as determined by a color densitometer available from Macbeth Company and more preferably it is not less than 0.03.

An ability of easy slipping may be imparted to the polyester film used in the invention depending on applications thereof and this can be performed by addition of inert inorganic particles such as $SiO_2$, $TiO_2$, $BaSO_4$, $CaCO_3$, talc and kaolin.

When these polyester films are used as substrates, they are preferably subjected to various surface-treatment to firmly adhere, to the substrates, photographic layer of a protective colloid mainly comprising gelatin (such as light-sensitive silver halide emulsion layer, intermediate layer and filter layer) since all of these polyester substrates have hydrophobic surfaces. Examples of such surface-treatments are surface activation treatments such as treatments with chemicals, mechanical treatments, corona discharge treatments, flame treatments, ultraviolet light-irradiation, radiofrequency treatments, glow discharge treatments, treatments with active plasma, laser treatments, treatments with mixed acid and ozone-oxidation treatments. After such a surface-treatment, an undercoating layer may be applied or a photographic emulsion layer may directly be applied to the polyester substrate.

Among these surface-treatments, preferred are ultraviolet light-irradiation, flame treatments, corona discharge treatments and glow discharge treatments.

First of all, the ultraviolet light-irradiation treatments will be detailed below. These treatments are preferably carried out using the methods as disclosed in J.P. KOKOKU Nos. Sho 43-2603, Sho 43-2604 and Sho 45-3828. A mercury lamp used as an ultraviolet source is preferably a high pressure mercury lamp comprising a quartz tube and capable of emitting ultraviolet rays whose wavelength falls within the range of from 180 to 320 nm. The ultraviolet irradiation may be performed during drawing a substrate, during thermal fixation thereof or after the thermal fixation of the same. If the quality of the substrate is not affected even when the surface temperature thereof increases up to about 150° C., a high pressure mercury lamp whose main wavelength of the emitted light rays is 365 nm can be used as the ultraviolet source. If the substrate requires a low temperature treatment, the ultraviolet source to be used is preferably a low pressure mercury lamp whose main wavelength of the emitted light rays is 254 nm. Moreover, it is also possible to use ozoneless type high pressure mercury lamps and low pressure mercury lamps.

The corona discharge treatment may be carried out by any conventionally known method such as those disclosed in J.P. KOKOKU Nos. Sho 48-5043 and Sho 47-51905 and J.P. KOKAI Nos. Sho 47-28067, Sho 49-83767, Sho 51-41770 and Sho 51-131576. The discharge frequency ranges from 50 Hz to 5000 KHz, preferably 5 KHz to several hundreds of KHz and, in particular, 10 KHz to 30 KHz. The intensity of treating the substrate usually ranges from 0.001 to 5 $KV \cdot A \cdot min/m^2$ and preferably 0.01 to 1 $KV \cdot A \cdot min/m^2$. The gap clearance between an electrode and a dielectric roll ranges from 0.5 to 2.5 mm and preferably 1.0 to 2.0 mm. Solid State Corona Treating Machine Model 6KVA available from Pillar Company can be used as an apparatus for the corona discharge treatment.

Moreover, in the flame treatment, a flame source such as natural gases and liquefied propane gas can be used and it is important to properly control the mixing ratio of these gases to air. A preferred gas/air mixing ratio (by volume) ranges from 1/14 to 1/22, more preferably 1/16 to 1/19 for propane; and 1/6 to 1/10, preferably 1/7 to 1/9 for natural gas.

The flame treatment is preferably carried out to an extent that 1 to 50 $Kcal/m^2$, more preferably 3 to 20 $Kcal/m^2$ is applied to the substrate. Moreover, it is more effective in the flame treatment to limit the distance between the tip of the inner flame and the substrate to be treated to less than 4 cm.

The glow discharge treatment can be carried out using any conventionally known method such as those disclosed in, for instance, J.P. KOKOKU Nos. Sho 35-7578, Sho 36-10336, Sho 45-22004, Sho 45-22005, Sho 45-24040 and Sho 46-43480; U.S. Pat. Nos. 3,057,792, 3,057,795, 3,179,482, 3,288,638, 3,309,299, 3,424,735, 3,462,335, 3,475,307 and 3,761,299; and U.K. Patent No. 997,093; and J.P. KOKAI No. Sho 53-129262.

Although there has been known a glow discharge treating method in which the treatment is carried out while introducing a variety of gases such as oxygen, nitrogen, helium or argon, but preferred is a glow discharge treatment performed in the presence of water vapor. The partial pressure of water vapor is preferably not less than 10% and not more than 100%, more preferably not less than 40% and not more than 90%. If the partial pressure is less than 10%, it is difficult to obtain a substrate having sufficient adhesion to the layers to be applied thereto. The gas atmosphere comprises, in addition to water vapor, air mainly comprising oxygen and nitrogen.

Further the film to be surface-treated is preferably heated to a temperature preferably not less than 50° C. and not more than Tg, more preferably not less than 70° C. and not more than Tg, in particular, not less than 90° C. and not more than Tg. The surface temperature of a substrate in a vacuum can be raised by, for instance, heating with an infrared heater and heating by bringing the substrate into contact with a hot roll.

The pressure during the glow discharge treatment preferably ranges from 0.005 to 20 Torr and more preferably 0.02 to 2 Torr. In addition, the voltage during the treatment is preferably between 500 and 5000 V, more preferably between 500 to 3000 V. The discharge frequency used ranges from the DC to several thousands of MHz, preferably 50 Hz to 20 MHz and more preferably 1 KHz to 1 MHz, like the conventional techniques.

The intensity of the discharge treatment of the substrate preferably ranges from 0.01 to 5 $KV \cdot A \cdot min/m^2$ and more preferably 0.15 to 1 $KV \cdot A \cdot min/m^2$ and thus a substrate exhibiting desired adhesion can be obtained.

It is preferred to immediately cool the substrate thus subjected to the glow discharge treatment using a cooling roll to reduce the temperature thereof.

The surface-treated substrate is then coated with an undercoating layer by the method detailed below. The undercoating layer may be formed by the single layer or multilayer coating method. A binder mainly comprising gelatin is preferably used for the coating materials for a secondary undercoating layer in the multilayer application method comprising various polymers such as copolymers derived from monomers selected from vinyl chloride, vinylidene chloride, butadiene, methacrylic acid, acrylic acid, itaconic acid and maleic anhydride, polyethyleneimine, epoxy resins, graft gelatin and nitrocellulose.

Polymers as materials for the undercoating layer used in the invention are, for instance, water-soluble polymers, cellulose esters, latex polymers and water-soluble polyesters. Specific examples of water-soluble polymers are gelatin, gelatin derivatives, casein, agar, sodium alginate, starch, polyvinyl alcohol, polyacrylic acid copolymer and maleic anhydride copolymer; examples of cellulose esters are carboxymethyl cellulose and hydroxyethyl cellulose. Examples of latex polymers include vinyl chloride moiety-containing copolymers, vinylidene chloride moiety-containing copolymers, acrylate moiety-containing copolymers, vinyl acetate moiety-containing copolymers and butadiene moiety-containing copolymers. Among these, most preferred is gelatin.

Examples of compounds capable of swelling the substrate used in the invention are resorcin, chlororesorcin, methylresorcin, o-cresol, m-cresol, p-cresol, phenol, o-chlorophenol, p-chlorophenol, dichlorophenol, trichlorophenol, monochloroacetic acid, dichloroacetic acid, trifluoroacetic acid, chloral hydrate, with resorcin and p-chlorophenol being preferred.

The undercoating layer used in the invention may comprise various kinds of gelatin-hardening agents.

Examples of gelatin-hardening agents are chromium salts (such as chrome alum), aldehydes (such as formaldehyde and glutaraldehyde), isocyanates, active halogen atom-containing compounds (such as 2,4-dichloro-6-hydroxy-S-triazine) and epichlorohydrin resins.

The undercoating layer used in the invention may comprise inorganic fine particles such as $SiO_2$, $TiO_2$ and matting agents or may comprise polymethyl methacrylate copolymer fine particles (particle size: 1 to 10 $\mu$m) as a matting agent.

The undercoating layer used in the invention can be applied to the substrate by any commonly known coating method such as dip coating, air knife coating, curtain coating, roller coating, wire bar coating, gravure coating or the extrusion coating method which makes use of a hopper as disclosed in U.S. Pat. No. 2,681,294. At least two layers may, if desired, be simultaneously coated according to the method disclosed in, for instance, U.S. Pat. Nos. 2,761,791, 3,508,947, 2,941,898 and 3,526,528 and Yuji HARASAKI, "Coating Engineerings", p. 253 (1973, published by Asakura Shoten).

In a preferred embodiment of the present invention, the substrate is made from polyethylene-2,6-naphthalene dicarboxylate which is heat-treated at a temperature ranging from 100 to 115° C. for 24 hours, which has a thickness ranging from 85 to 105 μm, whose surface is subjected to an ultraviolet-irradiation treatment or a glow discharge treatment; the light-insensitive hydrophilic layer, on the back face, is a gelatin layer having a thickness ranging from 1 to 7 μm and the light-insensitive hydrophilic layer, on the side of the emulsion layer, is a cellulose binder layer having a thickness ranging from 0.5 to 5 μm. In this respect, the weight ratio of the amount of gelatin in the light-insensitive hydrophilic layer, on the back face, to that in the emulsion layer on the opposite side preferably ranges from 0.1 to 0.5.

The image-forming method as the third aspect of the present invention will be detailed below.

The developer used for developing the light-sensitive material in the present invention may comprise currently used additives (such as a developing agent, an alkaline agent, a pH-buffering agent, a preservative, a chelating agent). In the development processing of the present invention, any known method may be used and any known developing liquid may be used.

The developing agents added to the developer usable in the invention are not restricted to specific ones, but preferably include, for instance, dihydroxybenzenes, with the combinations of dihydroxybenzenes with 1-phenyl-3-pyrazolidones and the combinations of dihydroxybenzenes with p-aminophenols being more preferred, because of their high developing ability.

Examples of the dihydroxybenzenes used in the invention are hydroquinone, chlorohydroquinone, isopropylhydroquinone, methylhydroquinone and hydroquinone monosulfonic acid salt, with hydroquinone being particularly preferred.

Examples of 1-phenyl-3-pyrazolidone or derivatives thereof used as the developing agent are 1-phenyl-3-pyrazolidone, 1-phenyl-4,4-dimethyl-3-pyrazolidone and 1-phenyl-4-methyl-4-hydroxymethyl-3-pyrazolidone.

Examples of p-aminophenolic developing agents used in the invention are N-methyl-p-aminophenol, p-aminophenol, N-(β-hydroxyethyl)-p-aminophenol and N-(4-hydroxyphenyl)glycine, with N-methyl-p-aminophenol being particularly preferred.

In general, the dihydroxybenzene type developing agent is preferably used in an amount ranging from 0.05 to 0.8 mole/l, in particular, 0.2 to 0.6 mole/l. If using combinations of dihydroxybenzenes with 1-phenyl-3-pyrazolidones or p-aminophenols, the amount of the former preferably ranges from 0.05 to 0.6 mole/l, more preferably 0.2 to 0.5 mole/l, while the amount of the latter is preferably not more than 0.06 mole/l and more preferably not more than 0.03 mole/l.

Examples of the preservatives used in the invention are sodium sulfite, potassium sulfite, lithium sulfite, ammonium sulfite, sodium hydrogen sulfite, potassium metabisulfite, formaldehyde sodium bisulfite. The sulfites are used in an amount of not less than 0.20 mole/l, in particular, not less than 0.3 mole/l, but the use thereof in an excess amount becomes a cause of the contamination of the developer with silver. Therefore, the upper limit thereof is desirably 1.2 mole/l. amount thereof particularly preferably ranges from 0.35 to 0.7 mole/l.

As the preservative for the dihydroxybenzene type developing agent, a small amount of ascorbic acid derivative may be used in combination with a sulfite. Examples of such ascorbic acid derivatives are ascorbic acid and erythorbic acid and alkali metal salts (such as sodium and potassium salts) thereof which are stereoisomers of ascorbic acid, with sodium erythorbate being preferably used because of low cost required for the material. The amount of the preservative to be added preferably ranges from 0.03 to 0.12 and particularly preferably 0.05 to 0.10 as expressed in terms of molar ratio with respect to the amount of the dihydroxybenzene type developing agent used. If an ascorbic acid derivative is used as the preservative, the developer is preferably free of any boron compound.

The term "a pH increase observed when 0.1 mole of sodium hydroxide per liter of the developer is not more than 0.25" used herein will be specifically defined below. The developer is one whose pH is not more than 10.75 observed when 0.1 mole of sodium hydroxide is added to one liter of the original developer having a pH of 10.5. The pH increase is more preferably limited to not more than 0.2.

Examples of alkaline agents used for establishing the desired pH value are usual water-soluble inorganic alkali metal salts (such as sodium hydroxide, potassium hydroxide, sodium carbonate and potassium carbonate).

Examples of additives other than those explained above are development inhibitors such as sodium bromide and potassium bromide; organic solvents such as ethylene glycol, diethylene glycol, triethylene glycol and dimethylformamide; alkanolamines such as diethanolamine and triethanolamine; development accelerators such as imidazole and derivatives thereof; and mercapto type compounds, imidazole type compounds, benzotriazole type compounds and benzimidazole type compounds as antifoggants or black pepper-inhibiting agents. Specific examples of such antifoggants are 5-nitroindazole, 5-p-nitrobenzoylaminoindazole, 1-methyl-5-nitroindazole, 6-nitroindazole, 3-methyl-5-nitroindazole, 5-nitrobenzimidazole, 2-isopropyl-5-nitrobenzimidazole, 5-nitrobenzotriazole, sodium 4-[(2-mercapto-1,3,4-thiadiazol-2-yl)thio]butanesulfonate, 5-amino-1,3,4-thiadiazole-2-thiol, methylbenzotriazole, 5-methylbenzotriazole and 2-mercaptobenzotriazole. The amount of these antifoggants in general ranges from 0.01 to 10 mM and preferably 0.1 to 2 mM per liter of the developer.

Moreover, the developer used in the invention may further comprise various kinds of organic and inorganic chelating agents. Examples of inorganic chelating agents are sodium tetrapolyphosphate and sodium hexametaphosphate.

On the other hand, examples of organic chelating agents mainly include organic carboxylic acids, aminopolycarboxylic acids, organic phosphonic acids, aminophosphonic acids and organic phosphonocarboxylic acids.

Examples of organic carboxylic acids are acrylic acid, oxalic acid, malonic acid, succinic acid, glutaric acid, adipic acid, pimelic acid, succinic acid, azelaic acid, sebacic acid, nonane dicarboxylic acid, decane dicarboxylic acid, undecane dicarboxylic acid, maleic acid, itaconic acid, malic acid, citric acid and tartric acid, but the present invention is not restricted to these specific acids.

Examples of aminopolycarboxylic acids are iminodiacetic acid, nitrilotriacetic acid, nitrilotripropionic acid, ethylenediaminemonohydroxyethyl triacetic acid, ethylenediaminetetraacetic acid, glycol ether tetraacetic acid, 1,2-diaminopropanetetraacetic acid diethylenetriaminepentaacetic acid triethylenetriaminehexaacetic acid, 1,3-diamino-2-propanoltetraacetic acid, glycol ether diaminetetraacetic acid and compounds such as those disclosed in, for instance, J.P. KOKAI Nos. Sho 52-25632, Sho 55-67747 and Sho 57-102624 and J.P. KOKOKU No. Sho 53-40900.

Examples of organic phosphonic acids are hydroxyalkylidene-diphosphonic acids disclosed in, for instance, U.S. Pat. Nos. 3,214,454 and 3,794,591 and DEOS No. 2,227,639; and compounds disclosed in, for instance, Research Disclosure, Vol. 181, Item 18170 (May, 1979).

Examples of aminophosphonic acids are amino-tris (methylene phosphonic acid), ethylenediaminetetramethylenephosphonic acid and aminotrimethylenephosphonic acid as well as compounds disclosed in, for instance, Research Disclosure 18170 described above, J.P. KOKAI Nos. Sho 57-208554, Sho 54-61125, Sho 55-29883 and Sho 56-97347.

Examples of organic phosphonocarboxylic acids are compounds disclosed in, for instance, J.P. KOKAI Nos. Sho 52-102726, Sho 53-42730, Sho 54-121127, Sho 55-4024, Sho 55-4025, Sho 55-126241, Sho 55-65955 and Sho 55-65956 and Research Disclosure 18170 described above.

These chelating agents may be used in the form of alkali metal salts or ammonium salts. The amount of these chelating agents preferably ranges from $1\times10^{-4}$ to $1\times10^{-1}$, more preferably $1\times10^{-3}$ to $1\times10^{-2}$ per liter of the developer.

In addition, the developer may further comprise, as inhibitors for silver-contamination, compounds disclosed in, for instance, J.P. KOKAI Nos. Sho 56-24347 and Hei 4-362942 and J.P. KOKOKU Nos. Sho 56-46585 and Sho 62-2849.

The developer of the invention may also comprise compounds disclosed in J.P. KOKAI No. Sho 62-212651 as uneven development-inhibiting agents; and compounds disclosed in J.P. KOKAI No. Sho 61-267759 as auxiliary agents for solubilization.

Moreover, the developer may comprise, if necessary, color tone-adjusting agents, surfactants, antifoamers, film-hardening agents or the like.

The developer used in the invention comprises, as buffering agents, boric acid as disclosed in J.P. KOKAI No. Sho 62-186259; sugars as disclosed in J.P. KOKAI No. Sho 60-93433 (such as saccharose); oximes (such as acetoxime); phenols (such as 5-sulfosalicylic acid); and tertiary phosphoric acid salts (such as sodium and potassium salts), with carbonates and boric acid being preferably used.

The pH value of the developer preferably ranges from 9.5 to 11.0, particularly preferably 9.8 to 10.7.

The developing temperature and time correlate to one another and are determined depending on the overall processing time. In general, the developing temperature ranges from about 20 to about 50° C., preferably 25 to 45° C. and the developing time ranges from 5 seconds to 2 minutes, preferably 7 seconds to 1 minute and 30 seconds.

When processing a silver halide monochromatic photographic light-sensitive material, the amount of the developer to be supplemented is not more than 225 ml and preferably not more than 180 ml per one square meter of the material.

It is preferred to concentrate processing solutions and to dilute them prior to practical use for the purposes of saving cost required for transportation and packing materials and for reducing the space required for storing. It is effective to use potassium salts as the salts components of the developer in order to concentrate the developer.

The fixing solution used in the fixing process of the present invention is an aqueous solution containing sodium thiosulfate, ammonium thiosulfate and, if necessary, tartaric acid, citric acid, gluconic acid, boric acid, iminodiacetic acid, 5-sulfosalicylic acid, glucoheptanoic acid, tiron, ethylenediaminetetraacetic acid, diethylenetriaminepentaacetic acid, nitrilotriacetic acid and/or salts thereof. The developer is preferably free of boric acid from the viewpoint of the recent environmental protection.

The fixing agents in the fixing solution used in the invention may be sodium thiosulfate and ammonium thiosulfate. Ammonium thiosulfate is preferred from the viewpoint of its fixing rate, but sodium thiosulfate may be used from the viewpoint of the recent environmental protection. The amount of these known fixing agents may properly be changed and in general ranges from about 0.1 to about 2 molesll, particularly preferably 0.2 to 1.5 mole/l.

The fixing solution may, if desired, comprise a film-hardening agent (such as a water-soluble aluminum compound), a preservative (such as a sulfite or bisulfite), a pH-buffering agent (such as acetic acid), a pH-adjusting agent (such as ammonia or sulfuric acid), a chelating agent, a surfactant, a wetting agent and/or a fixing accelerator.

Examples of surfactants are anionic surfactants such as sulfated and sulfonated products; polyethylene type surfactants; and amphoteric surfactants as disclosed in J.P. KOKAI No. Sho 57-6740. Moreover, a known antifoamer may be added to the fixing solution. Examples of wetting agents are alkanolamines and alkylene glycols. Examples of fixing accelerators are thiourea derivatives as disclosed in J.P. KOKOKU Nos. Sho 45-35754, Sho 58-122535 and Sho 58-122536; alcohols each carrying a triple bond in the molecule; thio ether compounds as disclosed in U.S. Pat. No. 4,126,459; and meso-ionic compounds as disclosed in J.P. KOKAI No. Hei 4-229860; as well as compounds as disclosed in J.P. KOKAI No. Hei 2-44355.

Moreover, examples of pH-buffering agents include organic acids such as acetic acid, malic acid, succinic acid, tartaric acid, citric acid, oxalic acid, maleic acid, glycolic acid and adipic acid; and inorganic buffering agents such as boric acid, phosphoric acid salts and sulfites, with acetic acid, tartaric acid and sulfites being preferred.

In this respect, the pH-buffering agent is used for preventing any increase in the pH of the fixing solution due to the developer brought into the fixing solution and the amount thereof to be used preferably ranges from 0.01 to 1.0 mole/l and more preferably 0.02 to 0.6 mole/l.

The pH value of the fixing solution preferably ranges from 4.0 to 6.5 and, in particular, 4.5 to 6.0.

The fixing solution may likewise comprise a dye-liquation accelerator such as those disclosed in J.P. KOKAI No. Sho 64-4739.

Examples of film-hardening agent in the fixing solution used in the invention are water-soluble aluminum compounds and chromium salts. Preferred examples thereof are water-soluble aluminum compounds such as aluminum chloride, aluminum sulfate and potassium alum. The added amount thereof preferably ranges from 0.01 to 0.2 mole/l and more preferably 0.03 to 0.08 mole/l.

The fixing temperature ranges from about 20 to about 50° C., preferably 25 to 45° C. and the fixing time ranges from 5 seconds to one minute and preferably 7 to 50 seconds.

The amount of the fixing solution to be supplemented is not more than 600 ml, in particular, not more than 500 ml per unit amount (1 m²) of the processed light-sensitive material.

After the developing and fixing treatments, the light-sensitive material is then washed with water or subjected to a stabilization treatment.

In the water-washing or stabilization treatment, the amount of required water is in general not more than 20 l per unit amount (1 m²) of the processed silver halide light-sensitive material or the treatment can be carried out while reducing the amount thereof to be supplemented to not more than 3 l (including 0, i.e., water-washing with saved up water). In other words, this permits the water-saving process and elimination of the need for piping works for establishing an automatic developing machine.

As a method for reducing the amount of washing-water, there has long been known a multistage countercurrent system (such as 2-stage and 3-stage systems). If the multistage countercurrent system is applied to the present invention, the light-sensitive material after the fixing treatment gradually moves towards the normal direction, i.e., stepwise comes in contact with the processing solution which is not contaminated with the fixing solution and thus the light-sensitive material is more effectively water-washed.

If the material is washed with a small amount of water, it is more preferred to provide washing baths for squeeze rollers and cross-over rollers such as those disclosed in J.P. KOKAI Nos. Sho 63-18350 and Sho 62-287252. Moreover, addition of various kinds of oxidizing agents and/or filtration through a filter may be combined with these means in order to reduce the degree of environmental pollution encountered when washing with a small amount of water.

A part or the whole of the overflow liquid from a water-washing or stabilization bath may be used in the processing liquid having an fixing ability in the preceding process as disclosed in J.P. KOKAI No. Sho 60-235133. In this respect, the overflow liquid is generated by supplementing water provided with a mildewproof means to the water-washing or stabilization bath in proportion to the quantity of processed light-sensitive material in the method of the present invention.

The washing liquid may comprise a water-soluble surfactant and/or an antifoamer in order to prevent the occurrence of uneven foaming which may often be caused during washing with a small amount of water and/or to prevent any transfer of the components of the processing agent, adhered to the squeeze rollers, to the processed film.

In addition, a dye-absorber as disclosed in J.P. KOKAI No. Sho 63-163456 can be added to the water-washing bath to prevent any contamination of the light-sensitive material with the dye released from the material.

The light-sensitive material may be subjected to a stabilization treatment subsequent to the foregoing water-washing. In this case, it is possible to use, for instance, a bath which comprises compounds as disclosed in J.P. KOKAI Nos. Hei 2-201357, Hei 2-132435, Hei 1-102553 and Sho 46-44446 as a final treating bath for the light-sensitive material.

The stabilization bath may optionally comprise an ammonium compound, a metallic compound of, for instance, Bi or Al, a fluorescent brightener, various kinds of chelating agents, a film pH-adjusting agent, a film-hardening agent, a bactericide, a mildewproofing agent, alkanolamine and/or a surfactant. Water used in the water-washing and/or stabilization processes may preferably be tap water, deionized water or water sterilized by the use of a halogen lamp, a UV bactericidal lamp or various oxidizing agents (such as ozone, hydrogen peroxide and chlorates), or may be washing water comprising compounds disclosed in J.P. KOKAI Nos. Hei 4-39652 and Hei 5-241309.

In the water-washing or stabilization process, the processing temperature and time preferably range from 0 to 50° C. and 5 seconds to 2 minutes, respectively.

The processing liquid used in the invention is preferably stored while packing in a low oxygen-permeable packing material disclosed in J.P. KOKAI No. Sho 61-73147.

If reducing the amount of the processing solution to be supplemented, it is preferred to prevent any evaporation of the processing solution and the oxidation thereof with air by reducing the contact area between the solution with the air in the processing bath. Roller-conveying automatic developing machines are disclosed in, for instance, U.S. Pat. Nos. 3,025,779 and 3,545,971 and are simply referred to as roller-conveying type processor in this specification. The roller-conveying type processor comprises four steps, i.e., developing, fixing, water-washing and drying steps and the method of the invention most preferably comprises these four steps although the use of other steps (such as stopping step) is not excluded. A stabilization step may be substituted for the water-washing step.

The solid processing agent used in the invention may be in any shape such as powder, tablet, granule, mass or paste, with the shape disclosed in J.P. KOKAI No. Sho 61-259921 or tablet being preferred. Tablets can be prepared by general methods disclosed in, for instance, J.P. KOKAI Nos. Sho 51-61387, Sho 54-155038 and Sho 52-88025 and U.K. Patent No. 1,213,808; granular processing agents can be prepared by general methods disclosed in, for instance, J.P. KOKAI Nos. Hei 2-109042, Hei 2-109043, Hei 3-39735 and Hei 3-39739; and powdery processing agent can be prepared by general methods disclosed in, for instance, J.P. KOKAI No. Sho 54-133332, U.K. Patent Nos. 725,892 and 729,862 and German Patent No. 3,733,861.

The bulk density of the solid processing agent preferably ranges from 0.5 to 6.0 g/cm$^3$, in particular, 1.0 to 5.0 g/cm$^3$ from the viewpoint of its solubility and the intended effect of the present invention.

In the passage "solid processing agent which comprises at least two mutually reactive particulate substances; these two reactive substances are arranged such that layers of these two reactive substances adjacent to one another are isolated through at least one interposed separating layer which comprises a substance inert to these layers of the reactive substances adjacent to one another; a bag allowing vacuum packaging is used as a packing material; and the solid processing agent is sealed in the exhausted bag", the term "inert" herein means that the substances do not undergo any reaction under the usual conditions in the package when these substances physically come in contact with one another, or that some reaction takes place, but they do not undergo any severe reaction. It is sufficient that the two reactive substances are inert in the intended applications due to the presence of the inert substance, irrespective of the fact that the latter is inert to these two substances reactive with one another. Moreover, the inert substance is a material simultaneously used along with these reactive two substances. For instance, hydroquinone and sodium hydroxide undergo a reaction when they directly come in contact with one another in a developer, but they can be stored over a long time period within a vacuum package through the use of, for instance, sodium sulfite as a layer for separating these hydroquinone and sodium hydroxide layers. Examples of packing materials used for vacuum-packaging these substances are bags made from inert plastic materials or a laminates of plastic materials and metal foils.

Various kinds of additives used in the light-sensitive material and the image-forming method of the invention are not restricted to specific ones and those disclosed in the related parts of the following articles can, for instance, preferably be used in the invention.

| Item | Related Passages |
|---|---|
| 1) Silver Halide Emulsion and Methods for Preparing the Same | J. P. KOKAI No. Hei 2-97937 (passage extending from the right lower column, line 12 on page 20 to the left lower column, line 14 on page 21); J. P. KOKAI No. Hei 2-12236 (passage extending from the right upper column, line 19 on page 7 to right lower column, line 12 on page 8); Japanese Patent Appln. Serial Nos. Hei 3-116573 and Hei 3-189532. |
| 2) Spectral Sensitizing Dyes | J. P. KOKAI No. Hei 2-55349 (passage extending from the left upper column, line 8 on page 7 to right lower column, line 8 on page 8); J. P. KOKAI No. Hei 2-39042 (passage extending from the right lower column, line 8 on page 7 to right lower column, line 5 on page 13); J. P. KOKAI No. Hei 2-12235 (passage extending from the left lower column, line 13 to right lower column, line 4 on page 8); J. P. KOKAI No. Hei 2-103536 (passage extending from the right lower column, line 3 on page 16 to left lower column, line 20 on page 17); J. P. KOKAI Nos. Hei 1-112235; Hei 2-124560 and Hei 3-7928 and Japanese Patent Appln. Serial Nos. Hei 3-189532 and Hei 3-411064. |
| 3) Surfactants & Antistatic agent | J. P. KOKAI No. Hei 2-12236 (passage extending from the right upper column, line 7 to right lower column, line 7 on page 9; J. P. KOKAI No. Hei 2-18542 (passage extending from the left lower column line 13, on page 2 to right lower column, line 18 on page 4 |
| 4) Compounds Having Acid Groups | J. P. KOKAI No. Hei 2-103536 (passage extending from the right lower column, line 6 on page 18 to left upper column, line 1 on page 19); and J. P. KOKAI No. Hei 2-55349 (passage extending from the right lower column, line 13 on page 8 to left upper column, line 8 on page 11. |
| 5) Antifoggants | thiosulfone compounds disclosed in J. P. KOKAI No. Hei 2-103536 (passage extending from the right lower column, line 19 on page 17 to right upper column, line 4 on page 18; and passage extending from the right lower column, lines 1 to 5 on page 18); and J. P. KOKAI No. Hei 1-237538. |
| 6) Polyhydroxybenzenes | J. P. KOKAI No. Hei 2-55349 (passage extending from left upper column, line 9 to right lower column, line 17 on page 11. |
| 7) Matting Agent, Slipping Agents and Plasticizers | J. P. KOKAI No. Hei 2-103536 (passage extending from the left upper column, line 15 to right upper column, line 15 on page 19. |
| 8) Film-Hardening Agents | J. P. KOKAI No. Hei 2-103536 (passage appearing in the right upper column, lines 5 to 17 on page 18). |
| 9) Dyes | Solid Dyes disclosed in J. P. KOKAI No. Hei 2-103536 (passage appearing in the right lower column, lines 1 to 18 on page 17); J. P. KOKAI No. Hei 2-39042 (passage extending from the right upper column, line 1 on page 4 to right upper column, line 5 on page 6); J. P. KOKAI No. Hei 2-294638 and Japanese Patent Appln. Serial No. Hei 3-185773. |
| 10) Tetrazolium Compounds | J. P. KOKAI No. Hei 2-39143 (passage extending from left lower column, line 8 on page 4 to left lower column, line 6 on page 6); J. P. KOKAI No. Hei 3-123346 (passage extending from right upper column, line 19 on page 3 to left upper column, line 20 on page 5). |
| 11) Redox Compounds | J. P. KOKAI No. Hei 2-301743 (compounds represented by the general formula (I) (in particular Compounds 1 to 50); J. P. KOKAI No. Hei 3-174143 (Compounds 1 to 75 represented by the general formulas (R-1), (R-2) and (R-3) appearing on page 3 to 20); and compounds disclosed in Japanese Patent Appln. Serial Nos. Hei 3-69466 and Hei 3-15648. |
| 12) Monomethine | J. P. KOKAI No. Hei 2-287532 (compounds represented by the general formula (II) (in particular, Compounds illustrated Compounds II-1 to II-26)). |
| 13) Colloidal Silica | J. P. KOKAI No. Hei 4-214551 (Compounds disclosed in Paragraph No. [0005]) |
| 14) Developers and Developing Methods | J. P. KOKAI No. Hei 2-103536 (passage extending from the right upper column, line 16 on page 19 to left upper column, line 8 on page 21); J. P. KOKAI No. Hei 2-55439 (passage extending from right lower column, line 1 on page 13 to left upper column, line 10 on page 16. |
| 15) Latex polymer | J. P. KOKAI No. Hei 2-103536 (passage appearing in the left lower column, lines 12 to 20 on page 18. |
| 16) Binders | J. P. KOKAI No. Hei 2-18542 (passage appearing in the right lower column, lines 1 to 20 on page 3. |
| 17) Hydrazine Nucleating Agents | J. P. KOKAI No. Hei 2-12236 (passage extending from right upper column, line 19 on page 2 to right upper column, line 3 on page 7); J. P. KOKAI No. Hei 3-174143 (passage extending from right lower column, line 1 on page 20 to right upper column, line 20 on page 27): general formula (II) and illustrated compounds II-1 to II-54. |
| 18) Hydrazine Nucleating Accelerators | J. P. KOKAI No. Hei 2-103536 (compounds represented by the general formula (II-m) to (II)-p and illustrated Compounds II-1 to II-22; Compounds disclosed in J. P. KOKAI No. Hei 1-179939. |
| 19) Black pepper Inhibitory Agent | Compounds disclosed in U.S. Pat. No. 4,956,257 and J. P. KOKAI No. Hei 1-118832. |
| 20) Dihydroxybenzenes | Compounds disclosed in J. P. KOKAI No. Hei 2-3-39948 and EP 452772A. |

The present invention will hereinafter be described in more detail with reference to the following non-limitative working Examples and the effects practically attained by the present invention will also be discussed in detail in comparison with Comparative Examples.

EXAMPLE 1

Preparation of Core (polybutadiene homopolymer)/Shell (styrene/2-acetoacetoxyethyl methacrylate (84/16)) Latex (core/shell ratio: 50/50) (Preparation of Illustrated Compound P-17)

To a 1 l volume three-necked flask equipped with a stirring machine and a reflux condenser, there were added 0.28 g of sodium hydrogen sulfite, 3.52 g of a 1 mole/l solution of sodium hydrogen carbonate and 454 g of distilled water, followed by dissolution with stirring, addition of 294.1 g of a polybutadiene latex (particle size: 112 nm; solid content: 34.3% by weight; available from Nippon Zeon Co., Ltd. under the trade name of LX-111J) and heating, with stirring, at 65° C. in a nitrogen gas stream.

After adding a solution prepared by dissolving 0.32 g of potassium persulfate in 20 g of distilled water, the dropwise addition of a mixed solution containing 84.0 g of styrene and 16.0 g of 2-acetoacetoxyethyl methacrylate and a solution of 0.16 g of potassium persulfate in 50 g of distilled water were initiated at a constant rate in such a manner that the dropwise addition of each solution was completed within 1.5 hour.

After completion of the dropwise addition, the reaction system was heated for one hour with stirring, followed by addition of a solution of 0.16 g of potassium persulfate in 20 g of distilled water and heating for additional 3 hours with stirring.

The reaction system was cooled to room temperature and then filtered to give 931.4 g of a desired core/shell latex (solid content: 21.2%; yield of solid content: 98.3%; averaged particle size as determined by Coulter Submicron Analyzer (available from Nikkaki Co., Ltd.): 138 nm). Moreover, a part of the resulting latex (100 g) was lyophilized to give 20.2 g of core/shell fine powder of the present invention.

EXAMPLE 2

Preparation of Core (polybutadiene homopolymer)/ Shell (n-butyl acrylate/2-acetoacetoxyethyl methacrylate (84/16)) Latex (core/shell ratio: 50/50) (Preparation of Illustrated Compound P-19)

To a 1 l volume three-necked flask equipped with a stirring machine and a reflux condenser, there were added 0.28 g of sodium hydrogen sulfite, 3.52 g of a 1 mole/l solution of sodium hydrogen carbonate and 454 g of distilled water, followed by dissolution with stirring, addition of 294.1 g of a polybutadiene latex (particle size: 112 nm; solid content: 34.3% by weight; available from Nippon Zeon Co., Ltd. under the trade name of LX-111J) and heating, with stirring, at 65° C. in a nitrogen gas stream.

After adding a solution prepared by dissolving 0.32 g of potassium persulfate in 20 g of distilled water, the dropwise addition of a mixed solution containing 84.0 g of n-butyl acrylate and 16.0 g of 2-acetoacetoxyethyl methacrylate and a solution of 0.16 g of potassium persulfate in 50 g of distilled water were initiated at a constant rate in such a manner that the dropwise addition of each solution was completed within 1.5 hour.

After completion of the dropwise addition, the reaction system was heated for one hour with stirring, followed by addition of a solution of 0.16 g of potassium persulfate in 20 g of distilled water and heating for additional 3 hours with stirring.

The reaction system was cooled to room temperature and then filtered to give 931.0 g of a desired core/shell latex (solid content: 21.0%; yield of solid content: 97.3%; particle size: 145 nm).

Figure 2:
FIG. 2 is an electron micrograph of the polymer P-19 of the present invention.
Figure 2:

Electron micrographs of the latex polymeres prepared in Examples 1 and 2 are shown in FIGS. 1 and 2 (FIG. 1 is an electron micrograph of the illustrated polymer P-17, while FIG. 2 shows that of the illustrated polymer P-19).

The magnifying factor of these micrographs is 100,000 and therefore, a length of 1 cm on the micrograph corresponds to 0.1 μm.

The light and shade contrast of the latex particles was made clear by staining (with osmium oxide) double bonds remaining on the butadiene polymer and the dark portion corresponds to the core polymer while the bright portion corresponds to the shell polymer.

As seen from FIGS. 1 and 2, it is clear that the conjugated diene polymer cores are certainly covered with the active methylene-carrying monomer moiety-containing shell polymer in both of the latexes, that the desired core/shell polymer is formed and that any separate particles comprising only the shell-forming polymer are not present at all.

EXAMPLE 3

Other core/shell latexes (the foregoing illustrated compounds P-1 to 33) were synthesized according to basically the same method used in Examples 1 and 2.

A part of these core/shell latexes were inspected for the particle size. The results thus obtained are listed in the following Table 1 along with the particle size of the original core latexes and the core/shell latex particle size theoretically predicted from the core/shell weight ratio.

TABLE 1

| Polymer | Core/Shell Ratio (by weight) | Particle Size (nm) | | |
|---|---|---|---|---|
| | | Core Polymer (found) | Core/Shell (found) | Core/Shell (calc.) |
| P-2 | 50/50 | 136 | 173 | 171 |
| P-3 | 50/50 | 136 | 168 | 171 |
| P-4 | 50/50 | 136 | 170 | 171 |
| P-6 | 67/33 | 136 | 156 | 150 |
| P-7 | 75/25 | 136 | 150 | 146 |
| P-12 | 50/50 | 136 | 168 | 171 |
| P-17 | 50/50 | 112 | 138 | 141 |
| P-19 | 50/50 | 112 | 165 | 141 |
| P-26 | 50/50 | 173 | 211 | 218 |
| P-29 | 50/50 | 197 | 239 | 248 |

Note: Each core/shell (calculated) value is determined by calculating the increase in the volume based on the core/shell weight ratio while assuming that the specific gravities of the core and shell polymers are identitical to one another. Therefore, if there is a difference in specific gravities, there may be a slight difference between the values calculated and found.

The data listed in Table 1 clearly indicate that each latex of the present invention shows an increase in the particle size almost identical to the calculated value, during the process for converting the core latex into the core/shell latex and this in turn indicates that the latex does not comprise any core latex free of the shell polymer and particles comprising only the shell polymer and that the latex has a desired core/shell latex structure and is almost free of, for instance, aggregation during the polymerization process.

EXAMPLE 4

To a 6% by weight gelatin solution obtained by dissolving gelatin at 40° C., there was added each latex polymer of the present invention listed in the following Table 2 such that the polymer content of the resulting mixture was 50 or 75% by weight on the basis of the solid content of the gelatin solution, followed by addition of 1,2-bis (vinylsulfonylacetamido)ethane as a film-hardening agent in an amount of 12 mM per 100 g of gelatin and sodium dodecylbenzenesulfonate as an auxiliary agent for coating in an amount of 1 g/one liter of the gelatin solution and addition of sodium polystyrenesulfonate as a thickener in such an amount that the the resulting gelatin solution has a viscosity of 30 cp to give a coating solution. The coating solution was applied onto the surface of a polyethylene terephthalate substrate (thickness: 100 μm) on which a subbing layer had been applied in a coated amount of 5 g/m² and then dried. After storing these samples at 25° C. and 55% RH for one week, the strength of each wet film was evaluated by the following method.

Method for Evaluating Strength of Wet Film

Each sample was immersed in distilled water maintained at 38° C. for 2 minutes, a sapphire needle having a radius of 0.3 mm was attached to the sample film surface under pressure, followed by continuously increasing the load applied to the needle while moving the needle at a speed of 10 mm/sec to determine the load (g) required for breaking the film. The results are listed in the following Table 2.

TABLE 2

| Polymer | Added Amount (wt %[1]) | Kind and Active Monomer | Content of Methylene (wt %[1]) | Strength of Wet Film (g) | Remarks |
|---|---|---|---|---|---|
| P-2 | 50 | M-1 | 2 | 120 | Invention |
| P-3 | 50 | M-1 | 4 | 155 | Invention |
| P-4 | 50 | M-1 | 8 | 220 | Invention |
| P-4 | 75 | M-1 | 8 | 210 | Invention |
| P-6 | 50 | M-1 | 5.3 | 205 | Invention |
| P-7 | 50 | M-1 | 4 | 170 | Invention |
| P-10 | 50 | M-1 | 8 | 170 | Invention |
| P-10 | 75 | M-1 | 8 | 155 | Invention |
| P-12 | 50 | M-3 | 8 | 175 | Invention |
| P-16 | 50 | M-8 | 8 | 170 | Invention |
| P-17 | 50 | M-1 | 8 | 210 | Invention |
| P-20 | 50 | M-2 | 8 | 195 | Invention |
| P-22 | 50 | M-18 | 8 | 180 | Invention |
| P-23 | 50 | M-1 | 1.6 | 135 | Invention |
| P-28 | 50 | M-7 | 9 | 200 | Invention |
| P-30 | 50 | M-1 | 10 | 185 | Invention |
| P-34 | 50 | yellow coupler | monomer 10 | 115 | Invention |
| A-1 | 50 | — | 0 | 80 | Comparison |
| A-2 | 50 | — | 0 | 78 | Comparison |
| A-3 | 50 | M-1 | 4 | 90 | Comparison |
| A-4 | 50 | M-1 | 8 | 120 | Comparison |
| A-5 | 50 | M-1 | 16 | 145 | Comparison |
| A-5 | 75 | M-1 | 16 | 128 | Comparison |
| A-6 | 50 | M-1 | 35 | 155 | Comparison |
| A-7 | 50 | M-1 | 8 | 125 | Comparison |
| A-8 | 50 | M-1 | 10 | 130 | Comparison |
| A-9 | 50 | yellow coupler | monomer 18 | 110 | Comparison |
| A-10 coupler | 50 | yellow coupler | monomer 10 | 100 | Comparison |
| Not Added | 0 | — | — | 180 | Comparison |

The comparative latex compounds used for proving the effects of the core/shell latexes of the present invention and the compound P-34 of the present invention were prepared as follows:

Comparative Compound A-1: polybutyl acrylate latex

Comparative Compound A-2: (styrene/butadiene (37/63)) latex copolymer

Comparative Compounds A-3 to A-8

The following latexes free of the core/shell structure (monolayer type ones) were synthesized according to the disclosure of J.P. KOKOKU No. Sho 45-5819.

A-3: butyl acrylate/2-acetoacetoxyethyl methacrylate (M-1) (96/4: weight ratio)

A-4: butyl acrylate/M-1 (92/8)

A-5: butyl acrylate/M-1 (88/16)

A-6: butyl acrylate/M-1 (65/35)

A-7: styrene/butadiene/M-1 (30/62/8)

A-8: butyl acrylate/M-1/acrylic acid (75/15/10)

The following core/shell type yellow polymer coupler latexes were synthesized according to the method disclosed in J.P. KOKAI No. Sho 58-42044.

Comparative Compounds A-9, 10: core butyl acrylate; shell:

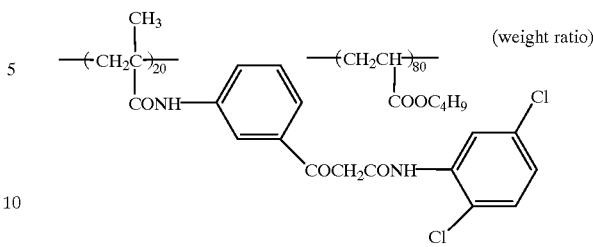

A-9: core/shell=9.1/90.9

A-10: core/shell=50/50

Compound P-34 of the Present Invention:
  core: styrene/butadiene (37/63) copolymer
  shell:

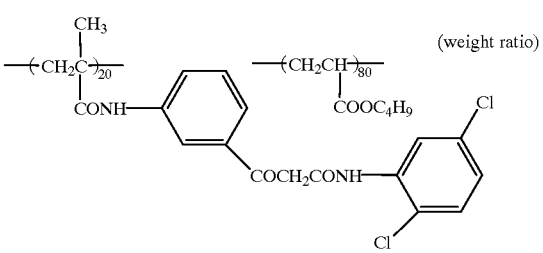

core/shell = 50/50

The results listed in Table 2 indicate that the polymer of the present invention having active methylene groups in the shell portion ensures film strength higher than that achieved by the non-core/shell type polymer having the same active methylene monomer content, irrespective of the added amount of the latexes and the comparison of P-34 with A-10 indicates that the latex of the present invention also ensures film strength higher than that achieved by the conventional latex due to the presence of the conjugated diene monomer in the core portion, although these latexes are the same core/shell type ones. These results clearly indicate that distinct core/shell structures are formed in the latex polymeres of the present invention and that the latex polymeres of the invention are quite useful.

EXAMPLE 5

Preparation of Core/Shell Latex (core: ethylene glycol dimethacrylate/n-butyl acrylate (20/80); shell: n-butyl acrylate/M-1 (84/16); core/shell ratio: 50/50) (Preparation of the illustrated compound P-51)

To a 2 l volume three-necked flask equipped with a stirring machine and a reflux condenser, there were added 0.576 g of sodium hydrogen sulfite, 1.50 g of sodium di-n-hexyl succinate monosulfonate, 30.0 g of ethylene glycol dimethacrylate, 120 g of n-butyl acrylate and 510 g of distilled water, followed by heating, with stirring, at 50° C. in a nitrogen gas stream.

After adding an initiator solution comprising 0.5 g of potassium persulfate, 3.7 g of 1N aqueous sodium hydrogen carbonate and 30 g of water and heating for 30 minutes with stirring, an initiator solution comprising 1.0 g of potassium persulfate, 7.4 g of a 1N aqueous sodium hydrogen carbonate and 60 g of water was added followed by heating, with stirring, at 50° C. for 2 hours and then at 90° C. for 3 hours to give a core latex (averaged particle size as determined by Coulter Submicron Analyzer (available from Nikkaki Co., Ltd.): 126 nm).

To the resulting core latex, there was added a solution of 0.65 g of sodium hydrogen sulfite in 250 g of distilled water and then the temperature of the contents of the flask was adjusted to 70° C. A mixed solution comprising 126 g of n-butyl acrylate and 24 g of 2-acetoacetoxyethyl methacrylate and an aqueous solution comprising 1.125 g of potassium persulfate, 8.25 g of a 1N aqueous sodium hydrogen carbonate solution and 150 g of distilled water were prepared and they were dropwise added to the core latex solution at a constant rate so that the dropwise addition was completed within one hour. After completion of the dropwise addition, the reaction system was heated to 70° C. for one hour with stirring, followed by addition of a solution of 0.375 g of potassium persulfate in 50 g of distilled water and heating, with stirring, at 85° C. for 3 hours.

The reaction solution was cooled and filtered to give 1355 g of an intended latex, P-51, of the present invention. The resulting latex had a solid content concentration of 21.30% (yield of solid content: 96.2%) and a particle size of 159 nm.

EXAMPLE 6

Preparation of Core/Shell Latex (core: n-dodecyl methacrylate; shell: styrene/M-1 (84/16); core/shell ratio: 50/50) (Preparation of the illustrated compound P-41)

To a 2 l volume three-necked flask equipped with a stirring machine and a reflux condenser, there were added 150 g of n-dodecyl methacrylate, 3.0 g of sodium di-n-hexyl succinate monosulfonate, 14.8 g of a 1N aqueous sodium hydrogen carbonate, 510 g of distilled water and 200 ml of methanol and the mixture was heated, with stirring, at 80° C. in a nitrogen gas stream.

To the mixture, there were added, four times, an initiator solution comprising 0.5 g of potassium persulfate and 30 g of distilled water at intervals of 2 hours to carry out emulsion polymerization. After completing the addition of the final initiator solution, the methanol was distilled off over 3 hours to give a core latex (particle size: 263 nm).

To the resulting core latex, there was added a solution of 0.65 g of sodium hydrogen sulfite in 300 g of distilled water and then the temperature of the contents of the flask was adjusted to 70° C. A mixed solution comprising 126 g of styrene and 24 g of 2-acetoacetoxyethyl methacrylate and an aqueous solution comprising 1.125 g of potassium persulfate, 8.25 g of a 1N aqueous sodium hydrogen carbonate solution and 150 g of distilled water were prepared and they were dropwise added to the core latex solution at a constant rate such that the dropwise addition was completed within one hour. After completion of the dropwise addition, the reaction system was heated to 70° C. for one hour with stirring, followed by addition of a solution of 0.375 g of potassium persulfate in 50 g of distilled water and heating, with stirring, at 85° C. for 3 hours.

The reaction solution was cooled and filtered to give 1375 g of an intended latex, P-41, of the present invention. The resulting latex had a solid content concentration of 21.45% (yield of solid content: 98.3%) and a particle size of 336 nm.

Moreover, a part of the resulting latex (100 g) was lyophilized to give 20.7 g of powder comprising core/shell fine particles.

Other illustrated compounds could be prepared by methods according to those used in Example 5. In Example 5, the particle size of the core latex and that of the core/shell latex are in good agreement with those predicted on the basis of the weight ratio of the core and shell polymers and this clearly indicates that the resulting latexes are substantially free of any aggregation and formation of particles other than the core/shell type ones.

EXAMPLE 7

A conductive layer and a backing layer each having the following composition were simultaneously coated on one side of a biaxially oriented polyethylene terephthalate substrate (thickness: 100 μm) provided with undercoating layers on both sides thereof.

[Conductive Layer]

| | |
|---|---|
| $SnO_2$/Sb (9/1 (weight ratio); average particle size: 0.25μ) | 200 mg/m$^2$ |
| gelatin ($Ca^{++}$ content: 3000 ppm) | 77 mg/m$^2$ |
| Compound-6 | 7 mg/m$^2$ |
| sodium dodecylbenzenesulfonate | 10 mg/m$^2$ |
| sodium dihexyl-α-sulfosuccinate | 40 mg/m$^2$ |
| sodium polystyrenesulfonate | 9 mg/m$^2$ |

[Backing Layer]

| | |
|---|---|
| gelatin ($Ca^{++}$ content: 30 ppm) | 2.82 g/m$^2$ |
| poly(methyl methacrylate) fine particles (average particle size: 4.0 μm) | 20 mg/m$^2$ |
| Compound-1 | 3 mg/m$^2$ |
| Compound-2 | 40 mg/m$^2$ |
| Compound-3 | 40 mg/m$^2$ |
| Compound-4 | 80 mg/m$^2$ |
| Compound-5 | 150 mg/m$^2$ |
| sodium dodecylbenzenesulfonate | 75 mg/m$^2$ |
| sodium dihexyl-α-sulfosuccinate | 20 mg/m$^2$ |
| Compound-6 | 5 mg/m$^2$ |
| sodium sulfate | 50 mg/m$^2$ |
| sodium acetate | 85 mg/m$^2$ |
| 1,2-bis(vinylsulfonylacetamide)ethane | 150 mg/m$^2$ |

Compound-1

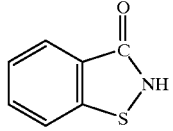

Compound-2

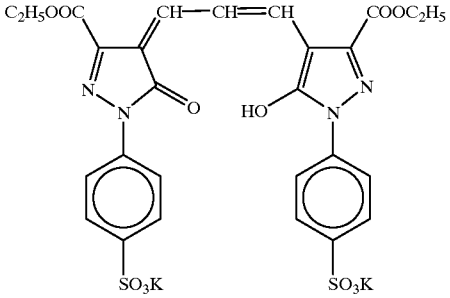

-continued

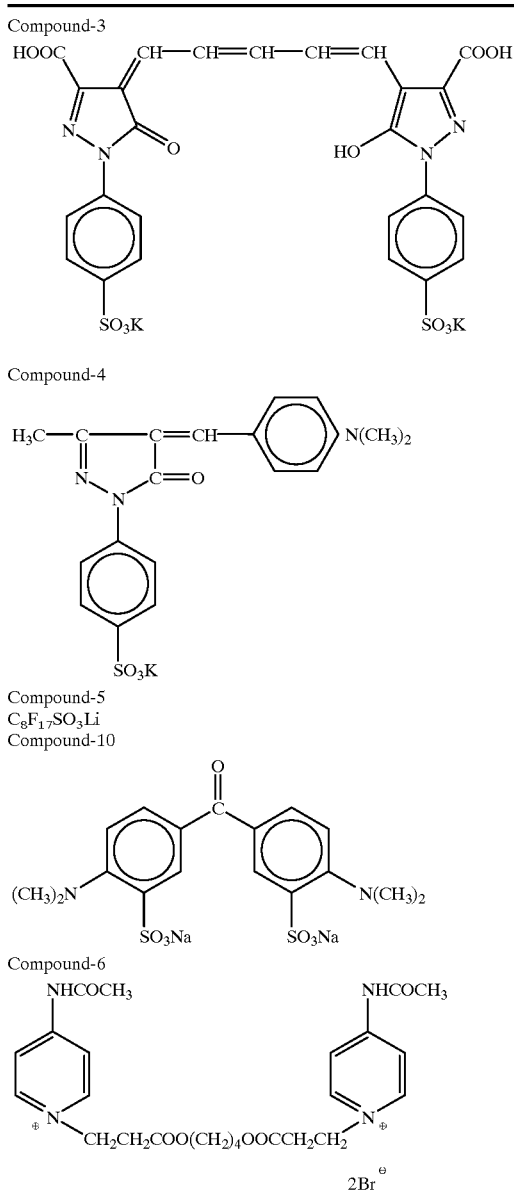

Compound-3

Compound-4

Compound-5
$C_8F_{17}SO_3Li$
Compound-10

Compound-6

Then the following emulsion layer and upper and lower protective layers were simultaneously applied to the opposite face of the substrate.

[Emulsion Layer]

To an aqueous gelatin solution maintained at 40° C. and containing 5,6-cyclopentane-4-hydroxy-1,3,3a,7-tetrazaindene ($5\times10^{-3}$ mole per mole of silver), there were simultaneously added an aqueous silver nitrate solution and an aqueous sodium chloride solution containing $(NH_4)_2Rh(H_2O)Cl_5$ in an amount of $4\times10^{-5}$ mole per mole of silver over 7 minutes, while controlling the voltage to 95 mV during the addition to prepare core particles having a particle size of 0.12 μm. Thereafter, there were added, to the foregoing reaction system, an aqueous silver nitrate solution and an aqueous sodium chloride solution containing $(NH_4)_2Rh(H_2O)Cl_5$ in an amount of $1.2\times10^{-4}$ mole per mole of silver over 14 minutes, while controlling the voltage to 95 mV during the addition to prepare silver chloride cubic particles having an average particle size of 0.15 μm.

To the resulting emulsion, there were added 50 mg/m² of the compound represented by the formula: $C_{16}H_{33}O(CH_2CH_2O)_{25}H$, 24 mg/m² of 5,6-cyclopentane-4-hydroxy-1,3,3a,7-tetrazaindene, 5 mg/m² of 5-methyltriazole, 3 mg/m² of Compound-6, a latex polymer (kinds and amounts are listed in the following Table 3) and 126 mg/m² of 2-bis(vinylsulfonylacetamide)ethane as a film-hardening agent and the resulting emulsion was applied to the substrate in such an amount that the coated amounts of silver and gelatin were 3.0 mg/m² and 1.1 g/m², respectively.

| [Lower Protective Layer] | |
|---|---|
| gelatin | 0.7 g/m² |
| 5-nitroindazole | 5 mg/m² |
| lipoic acid | 8 mg/m² |
| $C_2H_5SO_2Na$ | 6 mg/m² |
| hydroquinone | 50 mg/m² |
| 1-hydroxy-2-benzaldoxime | 15 mg/m² |
| latex polymer | (see Table 3) |
| [Upper Protective Layer] | |
| gelatin | 0.5 g/m² |
| $SiO_2$ fine particles (average particle size: 3.5 μm) | 55 mg/m² |
| colloidal silica (average particle size: 0.02 μm) | 135 mg/m² |
| sodium dodecylbenzenesulfonate | 25 mg/m² |
| Na salt of polyoxyethylene nonylphenyl ether sulfuric acid ester (degree of polymerization: 5) | 20 mg/m² |
| K salt of N-perfluorooctanesulfonyl-N-propyl-glycine | 3 mg/m² |

After the resulting samples were stored in an atmosphere of 25° C., 50% RH over one week, they were inspected for the following properties.

1) Sensitivity and γ Value

Each sample was exposed to light through an optical wedge using Bright Room Printer P-627FM (light source: mercury lamp) and then processed under developing conditions of a temperature of 38° C. and a developing time of 20 seconds using SR-D2 and GR-F1 available from Fuji Photo Film Co., Ltd. as the developer and fixing solution respectively and Automatic Developing Machine FG-680AG (available from Fuji Photo Film Co., Ltd.).

The sensitivity of each sample was determined in terms of a logarithmic number of the exposure value required for achieving the density of 3.0 relative to that observed for Sample No. 15 which was assumed to be 100.

The γ value represents an average gradient of the characteristic curve within the density ranging from 0.3 to 3.0 and is expressed in terms of a value obtained by dividing 2.7 by Δ logE (the difference between the logarithmic number of the exposure value required for achieving the density of 3.0 and that required for achieving the density of 0.3). The higher the γ value, the higher the contrast of the resulting image.

2) Wet Film Strength

Each sample was immersed in distilled water maintained at 25° C. for 5 minutes, a sapphire needle having a radius of 0.3 mm was attached to the sample film surface under pressure, followed by continuously increasing the load applied to the needle while moving the needle at a speed of 10 mm/sec to determine the load (g) required for breaking the film.

3) Brittleness

After each sample was allowed to stand in an atmosphere of 25° C., 10% RH for 2 hours, an average of the points at which crack was initially formed on the side of the silver halide emulsion layer was determined by the same method defined in ISO6077 "Wedge Brittleness Test".

The results thus obtained are listed in the following Table 3. The data listed in Table 3 clearly indicate that the samples of the present invention exhibit excellent photographic properties, are considerably improved in the wet film strength and good brittleness although the amount of the active methylene monomer used is small. Moreover, the same excellent results were also obtained when the total amounts of gelatin present in the emulsion layer and the protective layers are controlled to 3 g and 4 g respectively.

TABLE 3

| Sample No. | Emulsion Layer | | Lower Protective Layer | |
|---|---|---|---|---|
| | Latex Polymer | Added Amount | Latex Polymer | Added Amount |
| 1 | P-3 | 0.85(g/m²) | P-3 | 0.35(g/m²) |
| 2 | P-4 | 0.85 | P-4 | 0.35 |
| 3 | P-10 | 0.85 | P-10 | 0.35 |
| 4 | P-11 | 0.85 | P-11 | 0.35 |
| 5 | P-12 | 0.85 | P-12 | 0.35 |
| 6 | P-36 | 0.85 | P-36 | 0.35 |
| 7 | P-21 | 0.85 | P-21 | 0.35 |
| 8 | P-41 | 0.85 | P-41 | 0.35 |
| 9 | P-47 | 0.85 | P-47 | 0.35 |
| 10 | P-51 | 0.85 | P-51 | 0.35 |
| 11 | P-54 | 0.85 | P-54 | 0.35 |
| 12 | P-63 | 0.85 | P-63 | 0.35 |
| 13 | Comp. Compound 1 | 0.85 | Comp. Compound 1 | 0.35 |
| 14 | Comp. Compound 2 | 0.85 | Comp. Compound 2 | 0.35 |
| 15 | Comp. Compound 3 | 0.85 | Comp. Compound 3 | 0.35 |
| 16 | Comp. Compound 4 | 0.85 | Comp. Compound 4 | 0.35 |
| 17 | Comp. Compound 5 | 0.85 | Comp. Compound 5 | 0.35 |
| 18 | — | — | — | — |

| Sample No. | Relative Sensitivity | γ Value | Wet Film Strength | Brittleness |
|---|---|---|---|---|
| 1 | 100 | 9 | 200(g) | 2(mm) |
| 2 | 100 | 9 | 220 | 2 |
| 3 | 100 | 9 | 220 | 2 |
| 4 | 98 | 9 | 210 | 2 |
| 5 | 102 | 9 | 210 | 2 |
| 6 | 100 | 9 | 215 | 2 |
| 7 | 98 | 9 | 210 | 2 |
| 8 | 102 | 9 | 170 | 2 |
| 9 | 100 | 9 | 165 | 2 |
| 10 | 100 | 9 | 170 | 2 |
| 11 | 100 | 9 | 160 | 2 |
| 12 | 100 | 9 | 170 | 2 |
| 13 | 100 | 9 | 60 | 2 |
| 14 | 98 | 9 | 85 | 10 |
| 15 | 100 | 9 | 120 | 3 |
| 16 | 102 | 9 | 130 | 2 |
| 17 | 100 | 9 | 110 | 12 |
| 18 | 100 | 9 | 190 | 13 |

Comp. Compound 1: ethyl acrylate (100 (% by weiqht))
Comp. Compound 2: ethyl acrylate/methyl methacrylate/styrene (50/15/35)
Comp. Compound 3: methl acrylate/2-acrylamido-2-methylpro-panoic acid/2-acetoacetoxyethyl methacrylate (88/5/7)
Comp. Compound 4: ethyl acrylate/acrylic acid/2-acetoaceto-xyethyl methacrylate (86/4/16)
Comp. Compound 5 (Polymer coupler disclosed in J.P. KOKAI No. Sho 58-42044)
core: poly(n-butyl acrylate)
shell:

TABLE 3-continued

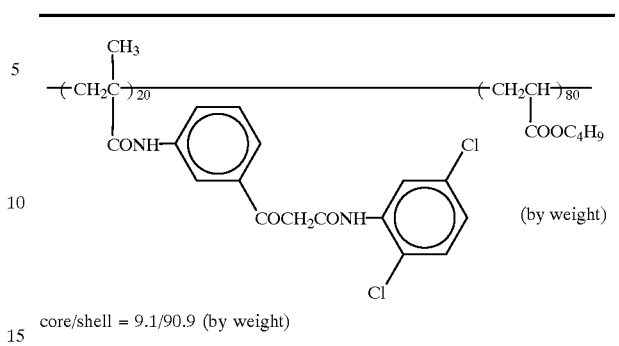

core/shell = 9.1/90.9 (by weight)

EXAMPLE 8

A conductive layer and a backing layer each having the following composition were simultaneously coated on one side of a biaxially oriented polyethylene terephthalate substrate (thickness: 100 μm) provided with undercoating layers on both sides thereof.

| [Conductive Layer] | |
|---|---|
| SnO₂/Sb (9/1 (weight ratio); average particle size: 0.25 μ) | 200 mg/m² |
| gelatin (Ca⁺⁺ content: 3000 ppm) | 77 mg/m² |
| Compound-(1) | 7 mg/m² |
| sodium dodecylbenzenesulfonate | 10 mg/m² |
| sodium dihexyl-α-sulfosuccinate | 40 mg/m² |
| sodium polystyrenesulfonate | 9 mg/m² |

The surface resistivity of the conductive layer as determined at 25° C., 20% RH was found to be $3.0 \times 10^9$ Ω.

| [Backing Layer] | |
|---|---|
| gelatin (Ca⁺⁺ content: 30 ppm) | 2.82 g/m² |
| Compound-(1) | 3 mg/m² |
| poly(methyl methacrylate) fine particles (average particle size: 3.4 μm) | 50 mg/m² |
| Compound-(2) | 40 mg/m² |
| Compound-(3) | 40 mg/m² |
| Compound-(4) | 80 mg/m² |
| Na dodecylbenzenesulfonate | 75 mg/m² |
| Na dihexyl-α-sulfosuccinate | 20 mg/m² |
| Compound-(5) | 5 mg/m² |
| K N-perfluorooctanesulfonyl-N-propyl glycine | 7 mg/m² |
| sodium sulfate | 50 mg/m² |
| sodium acetate | 85 mg/m² |
| 1,2-bis (vinylsulfonylacetamide)ethane | 150 mg/m² |

Compound-(1)

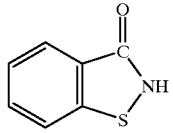

-continued

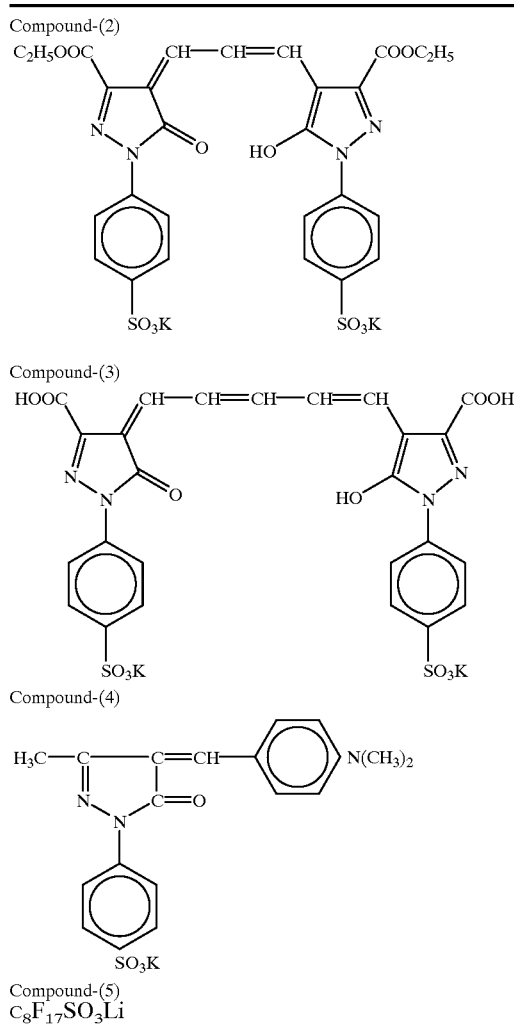

Compound-(5)
$C_8F_{17}SO_3Li$

Then the following emulsion layer and upper and lower protective layers each having the composition given below were simultaneously coated on the opposite face of the substrate.

| [Emulsion Layer]: Preparation of Emulsion | |
|---|---|
| Liquid I: | |
| water | 1000 ml |
| gelatin | 20 g |
| sodium chloride | 20 g |
| sodium 1,3-dimethylimidazolidine-2-thion | 20 g |
| sodium benzenesulfonate | 6 mg |
| Liquid II: | |
| water | 400 ml |
| silver nitrate | 100 g |

| [Emulsion Layer]: Preparation of Emulsion | |
|---|---|
| Liquid III | |
| water | 400 ml |
| sodium chloride | 30.5 g |
| potassium bromide | 14 g |
| potassium hexachloroiridate (III) (0.001% aq. soln.) | 15 ml |
| ammonium hexabromorhodate (III) (0.001% aq. soln.) | 1.5 ml |

To Liquid I maintained at 38° C. and a pH of 4.5, there were simultaneously added Liquid II and Liquid III over 10 minutes with stirring to give fine particles having a particle size of 0.16 μm. Then the following Liquid IV and Liquid V were added to the reaction system over 10 minutes. Further 0.15 g of potassium iodide was added to the mixture to finish the formation of grains.

| Liquid IV: | |
|---|---|
| water | 400 ml |
| silver nitrate | 100 g |
| Liquid V: | |
| water | 400 ml |
| sodium chloride | 30.5 g |
| potassium bromide | 14 g |
| $K_4Fe(CN)_6$ | $1 \times 10^{-5}$ mole/mole Ag |

Thereafter the product was treated by the usual method, i.e., washed by the flocculation method and then 40 g of gelatin was added.

The pH and pAg values of the resulting emulsion were adjusted to 5.3 and 7.5 respectively, followed by addition of 5.2 mg of sodium thiosulfate, 10.0 mg of chloroauric acid and 2.0 mg of N,N-dimethylselenourea thereto, addition of 8 mg of sodium benzenesulfonate, 2.0 mg of sodium benzenesulfonate, chemical sensitization such that the optimum sensitivity was attained at 55° C. to thus finally give an enulsion comprising silver iodochlorobromide cubic grains which comprised 80 mole % of silver chloride and had an average particle size of 0.20 μm.

Then the following sensitizing dye ① was added in an amount of 100 mg per mole of Ag to thus panchromatically sensitize the emulsion. Moreover, there were added, to the emulsion, hydroquinone and 1-phenyl-5-mercaptotetrazole as antifoggants in amounts of 2.5 g and 50 mg per mole of Ag respectively, colloidal silica (Snow Tex C available from Nissan Chemical Industries, Ltd.; average particle size: 0.015 μm) in an amount of 30% by weight based on the amount of gelatin, a latex polymer (the amounts and kinds are listed in the following Table 4) as a plasticizer and 100 mg/m² of 1,1'-bis(vinylsulfonyl)methane as a film-hardening agent.

The resulting coating liquid was applied to the substrate in such an amount that the coated amounts of Ag and gelatin were 3.3 g/m² and 1.5 g/m², respectively.

Sensitizing dye ①

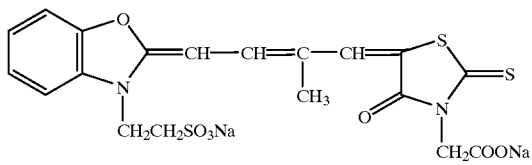

[Formulation of Lower Protective Layer]

| | |
|---|---|
| gelatin | 0.5 g/m² |
| sodium benzenesulfonate | 4 mg/m² |
| 1,5-dihydroxy-2-benzaldoxime | 25 mg/m² |
| latex polymer | (see Table 4) |

[Formulation of Upper Protective Layer]

| | |
|---|---|
| gelatin | 0.25 g/m² |
| poly(methyl methacrylate) fine particles (average particle size: 2.7 μm) | 40 mg/m² |
| Compound-(6) (dispersion of slippinq agent in gelatin) | 30 mg/m² |
| colloidal silica (Snow Tex C available from Nissan Chemical Industries, Ltd.) | 30 mg/m² |
| Compound-(7) | 5 mg/m² |
| sodium dodecylbenzenesulfonate | 22 mg/m² |

Compound-(6)

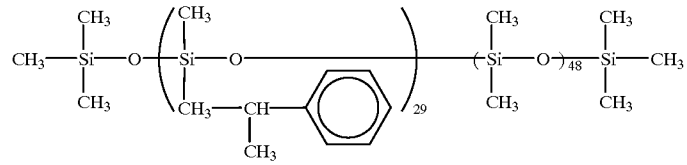

Compound-(7)
$C_8F_{17}SO_2N(C_3H_7)-CH_2COOK$

The resulting samples each was exposed to xenon flash light having an emission time of $10^{-6}$ sec through an interference filter having a peak at 633 nm and a continuous density wedge, then developed using an automatic developing machine FG-680AS available from Fuji Photo Film Co., Ltd. and inspected for the sensitivity and the γ value in the same manner used in Example 7.

The development was carried out at 38° C. for 11 seconds using SR-D2 and SR-F1 available from Fuji Photo Film Co., Ltd. as the developer and the fixing solution.

The determination of the wet film strength and the brittleness of each sample was performed in the same manner used in Example 7.

The results thus obtained are listed in the following Table 4. As seen from the results listed in Table 4, the samples of the present invention do not show any reduction in the wet film strength even when the content of the latex polymer is increased and exhibit very excellent quality.

TABLE 4

| Sample No. | Emulsion Layer | | Lower Protective Layer | |
|---|---|---|---|---|
| | Latex Polymer | Added Amount | Latex Polymer | Added Amount |
| 19 | P-4 | 0.37 (g/m²) | P-4 | 0.25 (g/m²) |
| 20 | P-4 | 0.75 | P-4 | 0.25 |
| 21 | P-4 | 1.50 | P-4 | 0.25 |
| 22 | P-4 | 2.00 | P-4 | 0.25 |
| 23 | P-10 | 0.37 | P-10 | 0.25 |
| 24 | P-10 | 0.75 | P-10 | 0.25 |
| 25 | P-10 | 1.50 | P-10 | 0.25 |
| 26 | P-10 | 2.00 | P-10 | 0.25 |
| 27 | P-18 | 0.37 | P-18 | 0.25 |
| 28 | P-18 | 0.75 | P-18 | 0.25 |
| 29 | P-18 | 1.50 | P-18 | 0.25 |
| 30 | P-18 | 2.00 | P-18 | 0.25 |
| 31 | Comp. Compound 4 | 0.75 | Comp. Compound 4 | 0.25 |
| 32 | Comp. Compound 4 | 1.50 | Comp. Compound 4 | 0.25 |
| 33 | — | — | — | — |

| Sample No. | Relative Sensitivity* | γ Value | Wet Film Strength | Brittleness |
|---|---|---|---|---|
| 19 | 100 | 7 | 170 (g) | 3 (mm) |
| 20 | 100 | 7 | 175 | 2 |
| 21 | 100 | 7 | 170 | 2 |
| 22 | 100 | 7 | 170 | 2 |
| 23 | 100 | 7 | 168 | 3 |
| 24 | 100 | 7 | 170 | 2 |
| 25 | 100 | 7 | 170 | 2 |
| 26 | 100 | 7 | 170 | 2 |
| 27 | 100 | 7 | 175 | 3 |
| 28 | 100 | 7 | 170 | 2 |
| 29 | 100 | 7 | 170 | 2 |
| 30 | 100 | 7 | 165 | 2 |
| 31 | 100 | 7 | 110 | 3 |
| 32 | 100 | 7 | 90 | 2 |
| 33 | 100 | 7 | 170 | 14 |

*The value relative to that observed for Sample No. 33 which is assumed to be 100.

EXAMPLE 9

The latex polymer compound P-4 of the present invention was substituted for the latex polymer in the emulsion layer and the lower protective layer used in Example 1 disclosed in J.P. KOKAI No. Hei 4-340951; the latex polymer present in the backing layer, the first and second emulsion layers and the lower protective layer used in Example 2, the latex polymer present in the light-insensitive layer and the emulsion layer used in Example 6, the latex polymer present in the UL layer, EM layer and PC layer used in Example 7, the latex polymer present in the emulsion layer used in Example 8, the latex polymer present in the lowermost layer, first emulsion layer, intermediate layer and second emulsion layer used in Example 11 disclosed in J.P. KOKAI No. Hei 7-234478; and the latex polymer present in the emulsion layer used in Example 1 disclosed in J.P. KOKAI No. Hei 6-27590, and the resulting light-sensitive materials were evaluated in the same manner used in Example 7 and it was found that the materials exhibited excellent film characteristic properties while holding the photographic properties.

EXAMPLE 10

The same effects observed in Examples 7 and 8 of the present invention could be achieved when preparing coating samples according to Examples 1 and 2 of J.P. KOKAI No. Hei 6-167781 and subjecting them to the same treatments.

EXAMPLE 11

The same effects observed in Examples 7 and 8 of the present invention could be achieved when preparing coating samples according to Examples 1, 2 and 3 of J.P. KOKAI No. Hei 6-250314 and subjecting them to the same treatments.

EXAMPLE 12

Emulsion-A

To a 1.5% gelatin aqueous solution, maintained at 40° C. having a pH of 2.0 and containing sodium chloride and sodium benzenethiosulfonate in an amount of $3 \times 10^{-5}$ mole per mole of silver, there were simultaneously added an aqueous solution of silver nitrate and an aqueous sodium chloride solution containing $(NH_4)Rh(H_2O)Cl_5$ in an amount of $3.5 \times 10^{-5}$ mole per mole of silver by the double-jet method at a voltage of 95 mV for 3 minutes and 30 seconds so that the amount of the silver was a half of the final amount of silver to prepare core particles having a particle size of 0.12 $\mu$m. Thereafter an aqueous solution of silver nitrate and an aqueous sodium chloride solution containing $(NH_4)_2Rh(H_2O)Cl_5$ in an amount of $10.5 \times 10^{-5}$ mole per mole of silver were added thereto over 7 minutes in the same manner used above to give silver halide cubic grains having an average gain size of 0.15 $\mu$m (coefficient of variation: 12%).

Then 4-hydroxy-6-methyl-1,3,3a,7-tetrazaindene was added to the resulting emulsion in an amount of $1.5 \times 10^{-5}$ mole per mole of silver.

Thereafter the product was washed with water by the flocculation method well-known in this art to remove the soluble salts, followed by addition of gelatin, and addition of 50 mg (per mole of silver) each of Compound-A and phenoxyethanol as preservatives and 4-hydroxy-6-methyl-1,3,3a,7-tetrazaindene in an amount of $3.0'10^{-3}$ mole per mole of silver, without carrying out any chemical ripening (in the final grains, pH 5.7; pAg 7.5; Rh $7 \times 10^{-5}$ mole/mole Ag).

[Preparation of Coating Solution for Emulsion Layer and Application Thereof]

The following compounds were added to the resulting emulsion and the coating solution was applied to the following substrate provided with an undercoating layer such that the coated amount of gelatin was 1.1 g/m² and that of silver was 2.5 g/m² to give a silver halide emulsion layer.

| | |
|---|---|
| 4-hydroxy-6-methyl-1,3,3a,7-tetrazaindene | 10 mg/m² |
| sodium salt of N-oleyl-N-methyl taurine | 35 mg/m² |
| Compound-B | 10 mg/m² |
| Compound-C | 20 mg/m² |
| Compound-D (film-hardening agent) | 150 mg/m² |
| Compound-E (hydrazine derivative) | $1.9 \times 10^{-3}$ mole/mole Ag |
| Compound-F (nucleation accelerator) | $1.7 \times 10^{-3}$ mole/mole Ag |

Moreover, the latex polymer of the present invention was added (the kinds and amounts are summarized in the following Table 6).

Upper and lower emulsion protective layers were coated on the emulsion layer.

[Preparation of Coating Solution for Lower Emulsion Protective Layer and Application Thereof]

The following compounds were added to a gelatin aqueous solution and the resulting solution was coated such that the coated amount of gelatin was 0.7 g/m².

| | |
|---|---|
| gelatin (Ca⁺⁺ content: 2700 ppm) | 0.7 g/m² |
| Compound-A | 5 mg/m² |
| Compound-G | 10 mg/m² |
| Compound-H | 20 mg/m² |

[Preparation of Coating Solution for Upper Emulsion Protective Layer and Application Thereof]

The following compounds were added to a gelatin aqueous solution and the resulting solution was coated such that the coated amount of gelatin was 0.8 g/m².

| | |
|---|---|
| gelatin (Ca⁺⁺ content: 2700 ppm) | 0.8 g/m² |
| amorphous silica matting agent (average particle size: 2.5 $\mu$m; fine pore diameter: 17 nm; surface area: 300 m²) | 10 mg/m² |
| K N-perfluorooctanesulfonyl-N-propyl glycine | 5 mg/m² |
| Na dodecylbenzenesulfonate | 30 mg/m² |
| Compound-A | 5 mg/m² |
| solid dispersed dye-I | 100 mg/m² |
| solid dispersed dye-J | 50 mg/m² |

Then the following conductive layer and backing layer were simultaneously coated on the opposite face of the substrate.

[Preparation of Coating Solution for Conductive Layer and Application Thereof]

The following compounds were added to a gelatin aqueous solution and the resulting solution was coated such that the coated amount of gelatin was 77 mg/m².

| | |
|---|---|
| SnO₂/Sb(9/1 (weight ratio); average particle size: 0.25 $\mu$m | 200 mg/m² |
| gelatin (Ca⁺⁺ content: 3000 ppm) | 77 mg/m² |
| Na dodecylbenzenesulfonate | 10 mg/m² |
| Na dihexyl-α-sulfosuccinate | 40 mg/m² |

-continued

| | |
|---|---|
| Na polystyrenesulfonate | 9 mg/m² |
| Compound-A | 7 mg/m² |

[Preparation of Coating Solution for Backing Layer and Application Thereof]

The following compounds were added to a gelatin aqueous solution and the resulting solution was coated such that the coated amount of gelatin was 2.92 g/m².

| | |
|---|---|
| gelatin (Ca⁺⁺ content: 30 ppm) | 2.92 g/m² |
| poly(methyl methacrylate) fine particles (average particle size: 3.4μ) | 54 mg/m² |
| Compound-K | 140 mg/m² |
| Compound-L | 140 mg/m² |
| Compound-M | 40 mg/m² |
| Na dodecylbenzenesulfonate | 75 mg/m² |
| Na dihexyl-α-sulfosuccinate | 20 mg/m² |
| Compound-N | 5 mg/m² |
| K N-perfluorooctanesulfonyl-N-propyl glycine | 5 mg/m² |
| sodium sulfate | 50 mg/m² |
| sodium acetate | 85 mg/m² |

[Substrate and Undercoating Layer]

First and second undercoating layers each having the following composition were applied to both side of a binary oriented polyethylene terephthalate substrate (thickness: 100 μm).

| [First Undercoating Layer] | |
|---|---|
| core/shell type vinylidene chloride copolymer ① | 15 g |
| 2,4-dichloro-6-hydroxy-S-triazine | 0.25 g |
| polyethylene fine particles (average particle size: 3μ) | 0.05 g |
| Compound-O | 0.20 g |
| colloidal silica (Snow Tex ZL: particle size: 70 to 100μ; available from Nissan Chemical Industries, Ltd.) | 0.12 g |
| water | ad. 100 g |

Moreover, 10% by weight KOH was added to control the pH value to 6 and the resulting coating solution was applied such that the thickness of the resulting dried film (drying temp. 180° C. for 2 minutes) was 0.9μ.

| [Second Undercoating Layer] | |
|---|---|
| gelatin | 1 g |
| methyl cellulose | 0.05 g |
| Compound-P | 0.02 g |
| C₁₂H₂₅O(CH₂CH₂O)₁₀H | 0.03 g |
| Compound-A | 3.5 × 10⁻³ g |
| acetic acid | 0.2 g |
| water | ad. 100 g |

The coating solution was applied such that the dried film thickness (drying temp. 170° C. for 2 minutes) was 0.1μ. Samples 1 to 19 were prepared in the same manner used above.

Compound-A

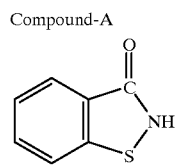

Sulfur compound S

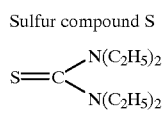

Compound-B

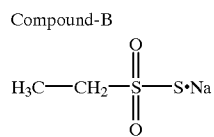

Compound-C

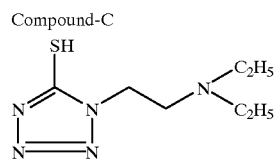

Compound-D

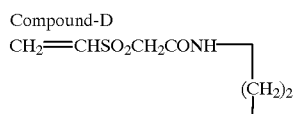

Compound-E

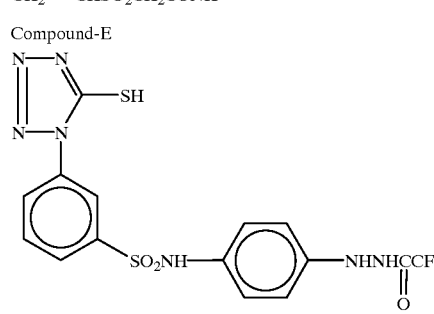

Compound-F

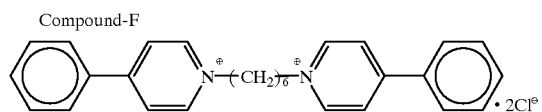

Compound-G

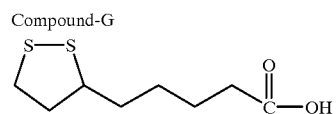

Compound-H

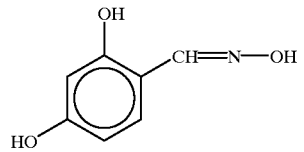

Solid dispersed dye-I

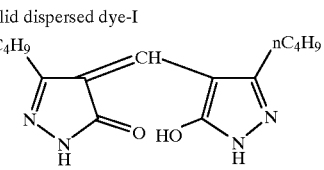

-continued

Solid dispersed dye-J

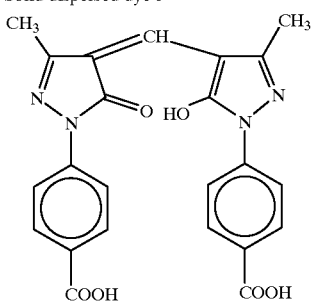

Compound-K

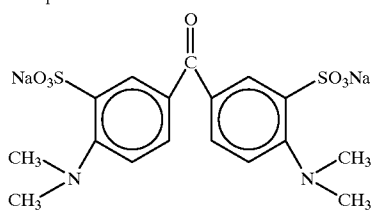

Compound-L

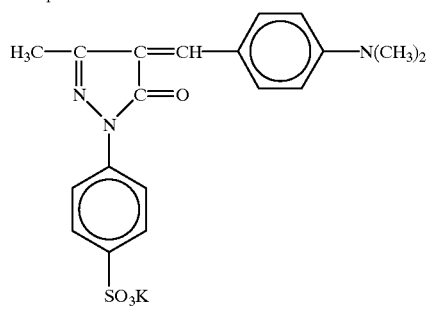

Compound-M

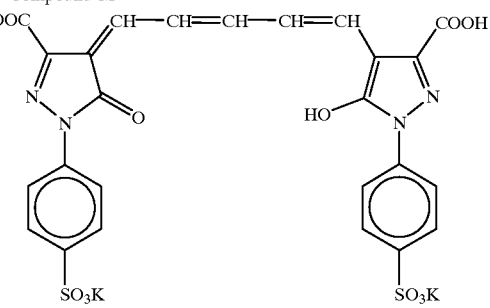

Compound-N

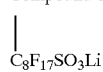

C$_8$F$_{17}$SO$_3$Li core/shell type vinylidene chloride copolymer

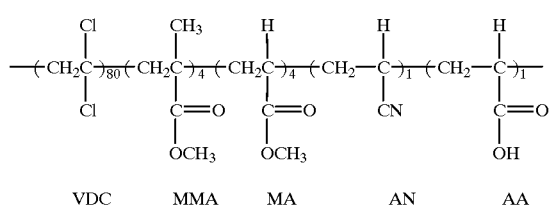

| VDC | MMA | MA | AN | AA |

Core: VDC/ MMA/ MA (80 wt.%)
Shell: VDC/ AN/ AA (20 wt.%)
Average particle size: 70 nm -continued Compound-O

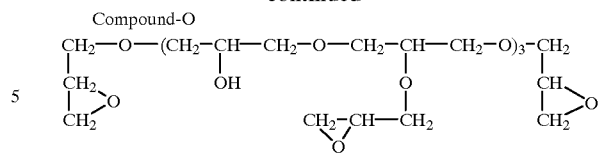

Compound-P

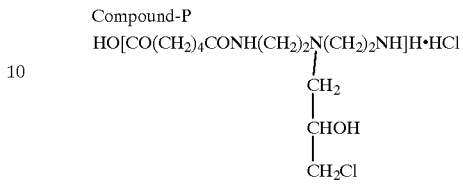

Developers each having the formulation detailed in the following Table 5 were prepared.

TABLE 5

| Developer Components | Developer No. & Composition | | | |
| --- | --- | --- | --- | --- |
| | D-1* | D-2 | D-3 | D-4* |
| potassium hydroxide | 35 (g) | 35 (g) | 35 (g) | 35 (g) |
| diethylenetriaminepentaacetic acid | 2.0 | 2.0 | 2.0 | 2.0 |
| potassium carbonate | 40 | 100 | 85 | 70 |
| potassium bromide | 3 | 3 | 3 | 3 |
| 5-methylbenzotriazole | 0.08 | 0.08 | 0.08 | 0.08 |
| Na 2-mercaptobenzimidazole-5-sulfonate | 0.15 | 0.15 | 0.15 | 0.15 |
| 2,3,5,6,7,8-hexahydro-2-dioxo-4-(1H)-quinazoline | 0.03 | 0.03 | 0.03 | 0.03 |
| sodium metabisulfite | 44 | 54 | 62 | 44 |
| 4-hydroxymethyl-4-methyl-1-phenyl-3-pyrazolidone | 0.45 | 0.45 | 0.45 | 0.45 |
| hydroquinone | 23.3 | 30.0 | 35.0 | 23.3 |
| sodium erythorbate | 3.0 | 3.0 | 3.0 | 3.0 |
| water | (ad. one liter) | | | |
| pH | 10.5 | 10.5 | 10.5 | 10.5 |
| pH increase when 0.1 mole of NaOH was added to one liter of developer | 0.5 | 0.23 | 0.24 | 0.3 |

*Comparative Example

The formulation of the fixing solution used in the invention was as follows.

| [Formulation of Fixing Solution] | |
| --- | --- |
| ammonium thiosulfate | 360 g |
| 2Na ethylenediaminetetraacetate · 2 H$_2$O | 2.3 g |
| sodium thiosulfate · 5 H$_2$O | 33.0 g |
| sodium sulfite | 75.0 g |
| sodium hydroxide | 37.0 g |
| glacial acetic acid | 87.0 g |
| tartaric acid | 8.8 g |
| sodium gluconate | 6.6 g |
| aluminum sulfate | 25.0 g |
| water | ad. 3 liter |
| pH (adjusted by addition of H$_2$SO$_4$ or NaOH) | 4.85 |

[Evaluation]

Each sample thus applied to the substrate was exposed to light through an optical wedge using P-627FM Printer available from Dainippon Screen Co., Ltd. and then subjected to a running test using an automatic developing machine FG-680A available from Fuji Photo Film Co., Ltd. The running test comprised 6 rounds each comprising running for 6 days and rest for one day. In the operation, the film A of a large paper sheet (50.8 cm×60.1 cm) was processed in a rate of 40 sheets per day. In the test, the amount of the developer supplemented was 180 ml/m², the developing time was 30 seconds and the developing temperature was set at 35° C.

These samples each was inspected for the following properties:
1) Sensitivity (S1.5): the logarithmic value of exposure required for achieving a density of 1.5 (the smaller the value, the higher the sensitivity).
2) γ value: (1.5–0.1)/{log(exposure required for achieving a density of 1.5)–log(exposure required for achieving a density of 0.1}
3) Contamination with Silver: Each sample was visually observed and evaluated according to 5 stage-evaluation criteria. The condition in which the film, the developing tank and the rollers are not contaminated with silver is rated to be "5", while the condition in which the whole surface of the film is contaminated with silver and the developing tank and the rollers are severely contaminated with silver is rated to be "1". The rank "4" means that the film is not contaminated, but the developing tank and the rollers are slightly contaminated to a practically acceptable level. The rank "3" or lower is accompanied by problems practically unacceptable or cannot practically be acceptable.

The results of photographic quality thus examined are summarized in the following Table 6.

mole aqueous silver nitrate solution and an aqueous halide solution containing 0.19 mole of potassium bromide and 0.47 mole of sodium chloride were likewise added thereto over 20 minutes using the double jet method. Thereafter, a KI solution having a concentration of $1 \times 10^{-3}$ mole per mole of silver was added to perform conversion followed by water-washing by flocculation according to the usual method, addition of 40 g of gelatin, control of pH and pAg to 6.5 and 7.5 respectively, addition of sodium benzenethiosulfonate, sodium thiosulfate and chloroauric acid in amounts of 7 mg, 5 mg and 8 mg per mole of silver, heating at 60° C. for 45 minutes, subjecting the emulsion to chemical sensitization and addition of 150 mg of 4-hydroxy-6-methyl-1,3,3a,7-tetrazaindene as a stabilizer and Proxel as a preservative. The resulting particles were silver chlorobromide cubic grains having an average particle size of 0.28 μm and a silver chloride content of 70 mole % (coefficient of variation: 9%).

Emulsion-C

To Liquid 1 listed in Table 2 maintained at 38° C. and a pH of 4.5, there were simultaneously added Liquid 2 and Liquid 3 with stirring over 24 minutes to form particles having a particle size of 0.18 μm. Subsequently, Liquid 4 and Liquid 5 listed in Table 1 were added over 8 minutes, followed by addition of 0.15 g of potassium iodide to thus complete the particle-formation.

TABLE 6

| | | | | Latex Polymer | | Photographic Quality | | | | Contamination with Ag | Remaining Color Stain |
|---|---|---|---|---|---|---|---|---|---|---|---|
| | | | | | | Fresh Liquid | | Fatigued Liquid | | | |
| Exp. No. | Sample No. | Developer | Emulsion | Compound | Added Amount(g/m²) | $S_{1.5}$ | γ | $S_{1.5}$ | γ | | |
| 1* | 1 | D-1 | B | — | — | 1.00 | 22.5 | 0.93 | 11.3 | 2 | 5 |
| 2* | 1 | D-2 | B | — | — | 1.00 | 21.8 | 0.94 | 12.0 | 3 | 3 |
| 3* | 1 | D-3 | B | — | — | 1.00 | 21.7 | 0.94 | 11.3 | 3 | 3 |
| 4* | 1 | D-4 | B | — | — | 1.00 | 22.0 | 0.93 | 11.7 | 2 | 3 |
| 5* | 2 | D-1 | B | P-4 | 0.5 | 1.01 | 21.9 | 0.99 | 19.3 | 2 | 5 |
| 6 | 2 | D-2 | B | P-4 | 0.5 | 1.02 | 22.3 | 1.00 | 19.5 | 4 | 5 |
| 7 | 2 | D-3 | B | P-4 | 0.5 | 1.01 | 22.9 | 1.01 | 20.0 | 4 | 5 |
| 8* | 2 | D-4 | B | P-4 | 0.5 | 1.01 | 22.0 | 1.00 | 19.7 | 2 | 3 |
| 9* | 3 | D-1 | C | P-4 | 0.5 | 1.02 | 21.3 | 1.01 | 19.0 | 2 | 5 |
| 10 | 3 | D-2 | C | P-4 | 0.5 | 1.01 | 21.8 | 1.00 | 19.3 | 4 | 5 |
| 11 | 3 | D-3 | C | P-4 | 0.5 | 1.01 | 21.9 | 0.99 | 19.5 | 4 | 5 |
| 12* | 3 | D-4 | C | P-4 | 0.5 | 1.02 | 22.2 | 1.00 | | 2 | 3 |

*: Comparative Example

Experiment Nos. 6, 7, 10 and 11 corresponding to the image-forming method of the present invention exhibited only low variations in the sensitivity and the γ value observed during the running test and these samples were only slightly contaminated with silver.

EXAMPLE 13

Emulsion-B

To an aqueous gelatin solution containing sodium chloride and 1,3-dimethyl-2-imidazolinethion, there were simultaneously added a 0.37 mole aqueous solution of silver nitrate and an aqueous halide salt solution containing (NH$_4$)$_3$RhCl$_6$, KIrCl$_6$, potassium bromide and sodium chloride in amounts of $1.0 \times 10^{-7}$ mole, $2 \times 10^7$ mole, 0.11 mole and 0.27 mole per mole of silver in the final emulsion, respectively at 45° C. for 12 minutes with stirring using the double jet method to form silver chlorobromide particles having an average particle size of 0.20 μm and a silver chloride content of 70 mole % and to thus perform nucleation. Then a 0.63

Then the particles were washed with water by flocculation according to the usual method, followed by addition of gelatin, control of pH and pAg to 5.2 and 7.5 respectively, addition of 4 mg of sodium thiosulfate, 2 mg of N,N-dimethylselenourea, 10 mg of chloroauric acid, 4 mg of sodium benzenethiosulfonate and 1 mg of sodium benzenethiosulfinate and chemical sensitization such that the emulsion exhibited optimum sensitivity at 55° C. Further, 50 mg of 2-methyl-4-hydroxy-1,3,3a,7-tetrazaindene as a stabilizer was added and phenoxyethanol as a preservative was added to a concentration of 100 ppm to thus finally give silver iodochlorobromide cubic grains having a silver chloride content of 80 mole % and an average particle size of 0.20 μm (coefficient of variation: 9%).

Coating solutions were applied to a substrate of a polyethylene terephthalate film (150 μm) provided with an undercoating layer (0.5 μm) of a vinylidene chloride copolymer in such a layer structure that UL, EM, ML and PC were arranged in this order from the side of the substrate. The method for preparing each layer and the coated amount thereof will be detailed below.

(UL)

To 10 g of gelatin, there were added, based on the amount of gelatin, 50 wt % of polyethyl acrylate latex and 3.5 wt % of compound (i) followed by addition of water in an amount such that the final volume was equal to 250 ml. This coating solution was applied such that the coated amount of gelatin was 0.4 g/m$^2$.

(EM)

The foregoing emulsions B and C were dissolved together with gelatin at 40° C., followed by addition of $3.2\times10^{-4}$ mole/mole Ag of a sensitizing dye compound (i), $2.7\times10^{-4}$ mole/mole Ag of a sensitizing dye compound (ii), $3.4\times10^{-3}$ mole/mole Ag of KBr, $3.2\times10^{-4}$ mole/mole Ag of a compound (iii), $7.4\times10^{-4}$ mole/mole Ag of a compound (iv), $9.7\times10^{-3}$ mole/mole Ag of hydroquinone, $8.0\times10^{-3}$ mole/mole Ag of phosphoric acid, $4.5\times10^{-4}$ mole/mole Ag of a compound (v), $5.3\times10^{-4}$ mole/mole Ag of a compound (vi) and $3\times10^{-4}$ mole/mole Ag of a compound (vii), and addition of poly(ethyl acrylate) in an amount of 15 wt % based on the amount of gelatin, the latex polymer of the present invention as shown in Table 3 and a compound (viii) in an amount of 4 wt % based on the amount of gelatin to give a coating solution. The solution was applied such that the coated amount of Ag was 3.3 g/m$^2$.

(ML)

To a gelatin solution, there were added 7 mg/m$^2$ of Compound F, poly(ethyl acrylate) in an amount of 15 wt % based on the amount of gelatin and a compound (viii) in an amount of 3.5 wt % based on the amount of gelatin to give a coating solution. The solution was applied such that the coated amount of gelatin was 0.5 g/m$^2$.

(PC)

To a gelatin solution, there were added 40 mg/m$^2$ of amorphous SiO$_2$ matting agent having an average particle size of 3.5 μm, 20 mg/m$^2$ of silicone oil and 5 mg/m$^2$ of a compound (ix) and 25 mg/m$^2$ of sodium dodecylbenzenesulfonate as coating aids to give a coating solution and the solution was applied. The coated amount of gelatin was found to be 0.3 g/m$^2$.

Additives for the Light-sensitive Material of Example 13

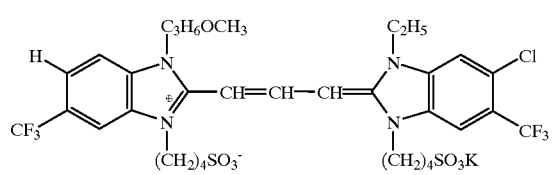

Compound i

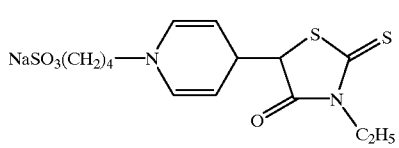

Compound ii

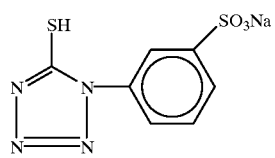

Compound iii

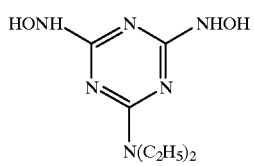

Compound iv

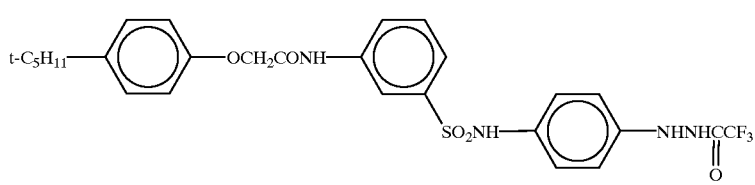

Compound v

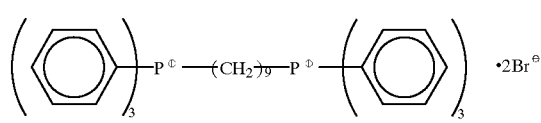

Compound vi

-continued

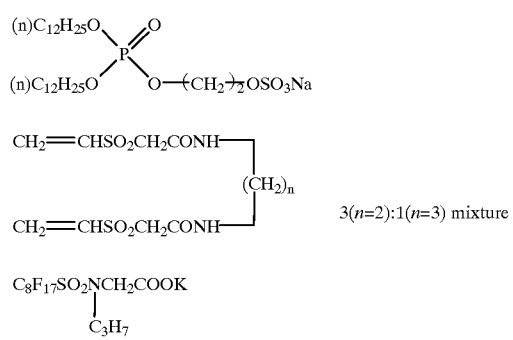

$3(n=2):1(n=3)$ mixture $C_8F_{17}SO_2NCH_2COOK$
 |
 $C_3H_7$

Moreover, a backing layer and a back-protective layer having the following formulations were coated.

[Backing Layer Formulation]

| | |
|---|---|
| gelatin | 3 g/m² |
| latex: poly(ethyl acrylate) | 2 g/m² |
| surfactant: sodium p-dodecylbenzenesulfonate | 40 mg/m² |
| compound (viii) | 110 mg/m² |
| SiO₂/Sb(weight ratio: 90/10; average particle size: 0.20 μm) | 200 mg/m² |
| dye: mixture of dyes (a), (b) and (c) | |
| dye (a) | 70 mg/m² |
| dye (b) | 100 mg/m² |
| dye (c) | 50 mg/m² |
| gelatin | 0.8 mg/m² |
| poly(methyl methacrylate) fine particles (average particle size: 4.5 μm) | 30 mg/m² |
| sodium dihexyl-α-sulfosuccinate | 15 mg/m² |
| sodium p-dodecylbenzenesulfonate | 15 mg/m² |
| sodium acetate | 40 mg/m² |

Dye (a)

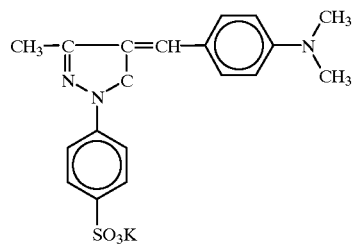

Dye (b)

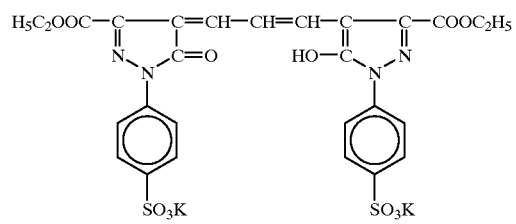

Compound vii

Compound viii

Compound ix

-continued

[Backing Layer Formulation]

Dye (c)

Samples thus prepared each was exposed to light emitted from xenon flash light rays having an emission time of $10^{-5}$ sec through an interference filter having a peak at 488 nm and a continuous wedge. Then their photographic properties in a fresh liquid and a fatigued liquid through running were evaluated in the same manner used in Example 12. In addition to the properties evaluated in Example 12, they were also inspected for the remaining color stain by the following method.

Remaining Color Stain:

Each film processed in a fresh developer was visually observed and evaluated according to 5 stage evaluation criteria. A film completely free of remaining color stain is rated to be "5" and a film exhibiting considerably high remaining color stain is rated to be "1". The rank "4" means that the film exhibits slight remaining color stain, but is practically acceptable. The rank "3" or lower is accompanied by problems practically unacceptable or can not practically be acceptable.

The results of photographic quality observed by the foregoing running tests are summarized in the following Table 7.

TABLE 7

| Exp. No. | Sample No. | Developer | Latex Polymer Compound | Latex Polymer Added Amount (g/m$^2$) | Photographic Quality Fresh Liquid $S_{1.5}$ | Photographic Quality Fresh Liquid $\gamma$ | Photographic Quality Fatigued Liquid $S_{1.5}$ | Photographic Quality Fatigued Liquid $\gamma$ | Contamination with Ag |
|---|---|---|---|---|---|---|---|---|---|
| 13* | 4 | D-1 | — | — | 1.00 | 21.0 | 0.94 | 12.1 | 2 |
| 14* | 4 | D-2 | — | — | 1.00 | 20.8 | 0.93 | 19.1 | 3 |
| 15* | 4 | D-3 | — | — | 1.00 | 21.2 | 0.94 | 19.3 | 2 |
| 16* | 4 | D-4 | — | — | 1.00 | 22.0 | 0.95 | 11.5 | 2 |
| 17* | 5 | D-1 | P-4 | 0.5 | 1.01 | 21.9 | 1.00 | 15.3 | 2 |
| 18 | 5 | D-2 | P-4 | 0.5 | 1.02 | 22.3 | 1.02 | 20.1 | 4 |
| 19 | 5 | D-3 | P-4 | 0.5 | 1.02 | 22.5 | 1.01 | 19.7 | 4 |
| 20* | 5 | D-4 | P-4 | 0.5 | 1.02 | 20.9 | 1.01 | 14.3 | 2 |
| 21* | 6 | D-1 | Q-1 | 0.5 | 1.02 | 21.7 | 1.01 | 16.0 | 2 |
| 22 | 6 | D-2 | Q-1 | 0.5 | 1.02 | 21.8 | 1.00 | 20.3 | 4 |
| 23 | 6 | D-3 | Q-1 | 0.5 | 1.03 | 22.1 | 1.01 | 19.3 | 4 |
| 24* | 6 | D-4 | Q-1 | 0.5 | 1.02 | 21.3 | 1.00 | 15.2 | 2 |

*: Comparative Example

Experiment Nos. 18, 19, 22 and 23 corresponding to the image-forming method of the present invention exhibited only low variations in the sensitivity and the γ value observed during the running test and these samples were only slightly contaminated with silver.

EXAMPLE 14

The same running tests used in Example 13 were performed except that the following developers were substituted for the developer used in Example 13 to thus evaluate the film-forming methods.

The developers were prepared from processing agents stored in solid and liquid conditions. The formulation of the developers used and the storage conditions thereof are listed in the following Table 8.

The solid processing agent was prepared by packing solid developing agents in a bag comprising a plastic material coated with aluminum, in layers. The solid agents were laminated in the following order from the side of the top layer.

| first layer | hydroquinone |
|---|---|
| second layer | other components |
| third layer | sodium bisulfite |
| fourth layer | potassium carbonate |

The bag was exhausted by the usual method and sealed under vacuum.

The liquid processing agent was stored in the form of a concentrate having a formulation of 1.5 time (degree of dilution=2:1) that of the processing solution practically used.

The solid and liquid processing agents were used in the running tests after storing at 50° C. for 60 days.

The development was carried out at 35° C. for 30 seconds. The fixing process was carried out at 37° C. using GR-F1 as a fixing solution while supplementing the fixing solution at a rate of 120 ml/m$^2$. The results obtained and conditions for experiments are summarized in the following Table 9. The photographic properties were evaluated in the same manner used in Example 13 and the uneven processing was evaluated by outputting a 90% flat net at 100 lines to each sample using Color Scanner SG708 equipped with an argon light source available from Dainippon Screen Co., Ltd. and visually evaluating the degree of uneven processing. The unevenness was rated according to 5-stage evaluation by sensory testing. In the evaluation of the uneven processing, each sample was processed after completion of the running test.

TABLE 8

| | Developer No. & Composition | | | |
|---|---|---|---|---|
| Developer Components | D-5* | D-6* | D-7 | D-8 |
| potassium hydroxide | 35(g) | 35(g) | 35(g) | 35(g) |
| diethylenetriaminepentaacetic acid | 2.0 | 2.0 | 2.0 | 2.0 |
| potassium carbonate | 40 | 40 | 100 | 100 |
| potassium bromide | 3 | 3 | 3 | 3 |
| 5-methylbenzotriazole | 0.08 | 0.08 | 0.08 | 0.08 |
| Na 2-mercaptobenzimidazole-5-sulfonate | 0.15 | 0.15 | 0.15 | 0.15 |
| 2,3,5,6,7,8-hexahydro-2-dioxo-4-(1H)-quinazoline | 0.03 | 0.03 | 0.03 | 0.03 |
| sodium metabisulfite | 44 | 44 | 54 | 54 |
| 4-hydroxymethyl-4-methyl-1-phenyl-3-pyrazolidone | 0.45 | 0.45 | 0.45 | 0.45 |
| hydroquinone | 23.3 | 23.3 | 30.0 | 30.0 |
| sodium erythorbate | 3.0 | 3.0 | 3.0 | 3.0 |
| water | (ad. one liter) | | | |
| pH | 10.5 | 10.5 | 10.5 | 10.5 |
| Storage Condition of Developer | liquid | solid | liquid | solid |
| pH increase when 0.1 mole of NaOH was added to one liter of developer | 0.5 | 0.5 | 0.23 | 0.23 |

*: Comparative Example

TABLE 9

| Exp. No. | Sample No. | Developer | Emulsion | Latex Polymer Compound | Latex Polymer Added Amount(g/m²) | Photographic Quality Fresh Liquid $S_{1.5}$ | Photographic Quality Fresh Liquid $\gamma$ | Photographic Quality Fatigued Liquid $S_{1.5}$ | Photographic Quality Fatigued Liquid $\gamma$ | Contamination with Ag | Uneven Processing |
|---|---|---|---|---|---|---|---|---|---|---|---|
| 25* | 3 | D-5 | C | P-4 | 0.5 | 1.00 | 21.3 | 0.89 | 12.1 | 2 | 2 |
| 26* | 3 | D-6 | C | — | — | 1.00 | 21.4 | 0.88 | 13.0 | 3 | 3 |
| 27 | 3 | D-7 | C | — | — | 1.00 | 21.5 | 0.95 | 19.8 | 4 | 4 |
| 28 | 3 | D-8 | C | — | — | 1.00 | 21.9 | 0.96 | 19.5 | 4 | 5 |

*: Comparative Example

Experiment Nos. 27 and 28 corresponding to the image-forming method of the present invention exhibited only low variations in the sensitivity and the γ value observed during the running test and these samples showed only slight contamination with silver and a low degree of uneven processing. In particular, in the image-forming method (Experiment No. 28) which makes use of the developer D-8 prepared from a solid processing agent, the method is excellent in processing stability and free of any uneven processing.

What is claimed is:

1. A latex polymer of fine particles having a heterogeneous phase structure comprising a core consisting of a polymer having repeating units derived from a conjugated diene monomer and a shell consisting of a polymer having repeating units derived from at least one ethylenically unsaturated monomer carrying an active methylene group.

2. The latex polymer fine particles of claim 1 wherein the weight ratio of the core polymer to the shell polymer ranges from 20/80 to 95/5.

3. The latex polymer fine particles of claim 1 wherein the ethylenically unsaturated monomer carrying an active methylene group is a monomer represented by the following general formula (I):

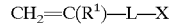

wherein $R^1$ represents a hydrogen atom, an alkyl group having 1 to 4 carbon atoms or a halogen atom; L represents a single bond or a bivalent coupling group; X represents an active methylene group selected from the group consisting of $R^2COCH_2COO$—, $NC$—$CH_2COO$—, $R^2COCH_2CO$—, $NC$—$CH_2CO$— (wherein $R^2$ represents a substituted or unsubstituted alkyl group having 1 to 12 carbon atoms, a substituted or unsubstituted aryl or aryloxy group having 6 to 20 carbon atoms, an alkoxy group having 1 to 12 carbon atoms, an amino group or a substituted amino group having 1 to 12 carbon atoms) and $R^9$—$CO$—$CH_2CON(R^6)$— (wherein $R^6$ represents a hydrogen atom or a substituted or unsubstituted alkyl group having 1 to 6 carbon atoms and $R^9$ represents a substituted or unsubstituted, primary or secondary alkyl group having 1 to 12 carbon atoms, an alkoxy group having 1 to 12 carbon atoms, an amino group or a substituted amino group having 1 to 12 carbon atoms), provided that if L is not a single bond, L is bonded to X in the form of an alkylene, aralkylene or arylene.

* * * * *